United States Patent
Yamada

(12) 
(10) Patent No.: US 10,351,090 B2
(45) Date of Patent: Jul. 16, 2019

(54) AIRBAG DEVICE FOR PASSENGER SEAT

(71) Applicant: TOYODA GOSEI CO., LTD., Kiyosu-shi, Aichi-ken (JP)

(72) Inventor: Ikuo Yamada, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 153 days.

(21) Appl. No.: 15/686,208

(22) Filed: Aug. 25, 2017

(65) Prior Publication Data

US 2018/0056922 A1 Mar. 1, 2018

(30) Foreign Application Priority Data

Aug. 29, 2016 (JP) .................................. 2016-167349

(51) Int. Cl.
*B60R 21/205* (2011.01)
*B60R 21/235* (2006.01)
(Continued)

(52) U.S. Cl.
CPC .......... *B60R 21/205* (2013.01); *B60R 21/233* (2013.01); *B60R 21/235* (2013.01);
(Continued)

(58) Field of Classification Search
CPC .... B60R 2021/0009; B60R 2021/0048; B60R 2021/23308; B60R 2021/23324; B60R 2021/23386; B60R 21/205; B60R 21/233; B60R 21/2338; B60R 21/235
USPC ...................................................... 280/743.1
See application file for complete search history.

(56) References Cited

U.S. PATENT DOCUMENTS 4,772,045 A * 9/1988 Kawaguchi ............. B60R 21/23
280/728.1
6,877,772 B2 * 4/2005 Fischer ................. B60R 21/205
280/730.1
(Continued)

FOREIGN PATENT DOCUMENTS

JP 2016-020116 2/2016
JP 2016-049882 A 4/2016
WO 2015/156088 A1 10/2015

*Primary Examiner* — Arti Singh-Pandey
(74) *Attorney, Agent, or Firm* — Posz Law Group, PLC

(57) ABSTRACT

An airbag has an occupant protection portion at a rear face when inflation is completed. The occupant protection portion includes a frontal collision restriction face and an oblique collision restriction face which protrudes rearward from the frontal collision restriction face on the left or right sides of the frontal collision restriction face. A restriction recessed portion for allowing a head of an occupant to enter and to be restricted is formed between the frontal collision restriction face and the oblique collision restriction face. A slip portion having excellent sliding properties compared to those of other regions of the frontal collision restriction face is disposed in a region from a surface side of the frontal collision restriction face to a surface side of an inner wall portion in the restriction recessed portion. The slip portion has sliding properties by which the received head can be guided toward the inside of the restriction recessed portion when the head of the occupant who moves obliquely forward comes into contact with the frontal collision restriction face.

13 Claims, 28 Drawing Sheets

(51) Int. Cl.
  *B60R 21/233*  (2006.01)
  *B60R 21/2338* (2011.01)
  *B60R 21/00*   (2006.01)
(52) U.S. Cl.
  CPC .. *B60R 21/2338* (2013.01); *B60R 2021/0009* (2013.01); *B60R 2021/0048* (2013.01); *B60R 2021/23308* (2013.01); *B60R 2021/23324* (2013.01); *B60R 2021/23386* (2013.01)

(56) References Cited

U.S. PATENT DOCUMENTS

| | | | |
|---|---|---|---|
| 7,914,038 B2* | 3/2011 | Koyama | B60R 21/205 |
| | | | 280/730.1 |
| 8,414,019 B2* | 4/2013 | Naganawa | B60R 21/203 |
| | | | 280/730.1 |
| 9,248,799 B2 | 2/2016 | Schneider et al. | |
| 2007/0205591 A1* | 9/2007 | Bito | B60R 21/233 |
| | | | 280/743.2 |
| 2015/0166002 A1* | 6/2015 | Fukawatase | B60R 21/233 |
| | | | 280/730.1 |
| 2015/0307052 A1* | 10/2015 | Jaradi | B60R 21/231 |
| | | | 280/743.2 |
| 2016/0288756 A1* | 10/2016 | Ishiguro | B60R 21/203 |
| 2017/0028955 A1* | 2/2017 | Ohno | B60R 21/207 |
| 2017/0028956 A1* | 2/2017 | Ohno | B60R 21/231 |
| 2017/0129439 A1* | 5/2017 | Taguchi | B60R 21/205 |
| 2017/0166159 A1* | 6/2017 | Shin | B60R 21/2176 |
| 2018/0236962 A1* | 8/2018 | Ohno | B60R 21/207 |

* cited by examiner

Sectional View at line A-A (A)

(B)

AIRBAG DEVICE FOR PASSENGER SEAT

CROSS REFERENCE TO RELATED APPLICATIONS

The Present application claims priority from Japanese Patent Application No. 2016-167349 of Yamada, filed on Aug. 29, 2016, the entire disclosure of which is incorporated herein by reference.

BACKGROUND OF THE INVENTION

Field of the Invention

The invention relates to an airbag device for a passenger seat including an airbag which is configured to be folded and stored at a storage part provided in an instrument panel disposed in front of an occupant seated in a passenger seat, to inflate and protrude toward a rear side of a vehicle by allowing inflation gas to flow to the inside thereof, and thereby protecting the occupant.

Background Art

In the related art, as an airbag device for a passenger seat, as described in JP-A-2016-49882, an airbag includes: a main body portion that covers a front part of an occupant seated in a passenger seat when inflation is completed; and a protrusion portion which protrudes rearward from the vicinity of the left and right end portions on a rear end side of the main body portion, and slip fabric is disposed to cover from a rear face side of the main body portion or a rear face of the main body portion to a side face adjacent to the main body portion in the protrusion portion. In the airbag device for a passenger seat, the slip fabric is set to have a smaller friction resistance than that of the base fabric that configures the airbag, and brings a head of the occupant who moves forward into contact with the slip fabric, and accordingly, rotation of the head of the occupant is suppressed and the head of the occupant is protected.

However, in the airbag device for a passenger seat of the related art, the rotation of the head of the occupant can be suppressed by the slip fabric, and the head of the occupant is protected by the main body portion and the protrusion portion disposed to protrude, having a large step difference with respect to the main body portion. Therefore, as the head of the occupant is restricted in a planar manner by the protrusion portion and the main body portion which are disposed to be substantially orthogonal to each other, there is room for improvement from the viewpoint of gently receiving the head of the occupant.

SUMMARY OF THE INVENTION

An object of the invention is to provide an airbag device for a passenger seat which can protect an occupant smoothly, who moves obliquely forward with an airbag which has been inflated.

The object of the invention can be achieved by the airbag device for a passenger seat.

According to an aspect of the invention, there is provided an airbag device for a passenger seat including: an airbag which is configured to be folded and stored at a storage part provided in an instrument panel disposed in front of an occupant seated in a passenger seat, to inflate and protrude toward a rear side of a vehicle by allowing inflation gas to flow to the inside thereof, and thereby protecting the occupant, in which a rear face of the airbag when inflation is completed is an occupant protection portion which is capable of protecting the occupant, in which the occupant protection portion includes a frontal collision restriction face which is capable of protecting a head of the occupant who moves forward when frontal collision of a vehicle occurs, an oblique collision restriction face which is formed to protrude rearward from the frontal collision restriction face on at least one of the left and right sides of the frontal collision restriction face to be capable of protecting the head of the occupant who moves obliquely forward when oblique collision or offset collision of the vehicle occurs, and a restriction recessed portion which is formed to be recessed forward for allowing the head of the occupant to enter and to be restricted between the frontal collision restriction face and the oblique collision restriction face, in which a slip portion having excellent sliding properties compared to those of other regions of the frontal collision restriction face is disposed in a region from a surface side of the frontal collision restriction face in a region on the restriction recessed portion side to a surface side that becomes the frontal collision restriction face side in an inner wall portion of the restriction recessed portion, in the airbag when the inflation is completed, and in which the slip portion has sliding properties capable of guiding the received head toward the inside of the restriction recessed portion when the head of the occupant who moves obliquely forward comes into contact with the frontal collision restriction face at the time of the oblique collision or the offset collision of the vehicle.

In the airbag device for a passenger seat of the invention, in the occupant protection portion, the restriction recessed portion for allowing the head of the occupant to enter and to be restricted is formed to be recessed forward between the frontal collision restriction face and the oblique collision restriction face formed to protrude rearward from the frontal collision restriction face. Therefore, it is possible to restrict the head of the occupant who moves obliquely forward by allowing the head to enter the inside of the restriction recessed portion while guiding the head to the oblique collision restriction face at the time of oblique collision or offset collision of the vehicle. In addition, in the airbag device for a passenger seat of the invention, the slip portion having excellent sliding properties compared to those of other regions of the frontal collision restriction face is disposed in a region from a surface side of the frontal collision restriction face in a region on the restriction recessed portion side to a surface side that becomes the frontal collision restriction face side in an inner wall portion of the restriction recessed portion, in the airbag when the inflation is completed, and the slip portion has sliding properties capable of guiding the received head toward the inside of the restriction recessed portion when the head of the occupant who moves obliquely forward comes into contact with the frontal collision restriction face at the time of the oblique collision or the offset collision of the vehicle. Therefore, when the oblique collision or the offset collision of the vehicle occurs, even in a case where the head of the occupant who moves obliquely forward does not come into contact with the oblique collision restriction face and comes into contact with the region on the restriction recessed portion side on the frontal collision restriction face, the head of the occupant slides by the slip portion, and in a state where rotation is suppressed such that the face is oriented toward a center side of the frontal collision restriction face, it is possible to guide the head of the occupant to the restriction recessed portion side, and to allow the head to smoothly enter the inside of the restriction recessed portion.

In addition, in the airbag device for a passenger seat of the invention, when the head of the occupant enters the restriction recessed portion, at least a part of the head of the occupant enters the restriction recessed portion while pushing and opening the restriction recessed portion from side to side. At this time, the head of the occupant is received from the front side to both of the left and right sides by a wide restriction face configured of surfaces (inner side surfaces) of an outer wall portion and an inner wall portion which oppose each other on both of the left and right sides of the restriction recessed portion. In other words, a state where the head of the occupant is inserted into the outer wall portion and the inner wall portion of the restriction recessed portion from both of the left and right sides is achieved, that is, the outer wall portion and the inner wall portion of the restriction recessed portion come into contact with each other on both of the left and right sides of the head. Therefore, the rotation in the leftward-and-rightward direction is suppressed, it is possible to contribute to receiving the head, and it is possible to smoothly receive the head of the occupant when the oblique collision or the offset collision occurs, by the restriction recessed portion.

Therefore, in the airbag device for a passenger seat of the invention, it is possible to smoothly protect the occupant who moves obliquely forward by the airbag which has been inflated.

Specifically, in the airbag device for a passenger seat of the invention, it is preferable that the slip portion is configured of a sheet body of which a friction resistance of the surface is set to be smaller than that of a base material which configures the airbag, includes a front end side that is linked to a tip end side of a recess of the restriction recessed portion, and includes a rear end side that is temporarily coupled to the frontal collision restriction face by temporary coupling means, and the temporary coupling means is configured to be capable of releasing a coupled state with the frontal collision restriction face when the head of the occupant who moves to the restriction recessed portion side is brought into contact with the surface of the outer slip portion.

With such a configuration of the airbag device for a passenger seat, when receiving the head of the occupant, the slip portion releases the coupled state with the frontal collision restriction face by the temporary coupling means on the rear end side, and only the front end side is linked to the airbag, and thus, it is possible to allow the slip portion itself which has received the head of the occupant to slide with respect to the frontal collision restriction face in the airbag. Therefore, in a state where the rotation is suppressed such that the face of the head of the occupant is oriented toward the center side of the frontal collision restriction face, it is possible to smoothly and largely move the slip portion with respect to the airbag. As a result, it is possible to allow the head of the occupant to smoothly slide with respect to the frontal collision restriction face of the airbag made of a base material, and to guide the head of the occupant into the restriction recessed portion by the slip portion.

In addition, as the airbag device for a passenger seat, the slip portion may be configured of a sheet body of which a friction resistance of the surface is set to be smaller than that of a base material that configures the airbag, include a front end side that is linked to a tip end side of a recess of the restriction recessed portion and a rear end side that is linked to the frontal collision restriction face, and a separation distance between a front linking part linked to the restriction recessed portion side and a rear linking part linked to the frontal collision restriction face side may be set to be greater than a membrane length from the front linking part to the rear linking part in the base material of the airbag when inflation is completed. In the configuration, it is also possible to smoothly move the slip portion itself which has received the head of the occupant with respect to the airbag by allowing the slip portion itself to slide with respect to the base material that configures the airbag, and further, the slip portion itself can also allow the head of the occupant to slide. Therefore, it is possible to allow the head of the occupant to smoothly slide with respect to the frontal collision restriction face of the airbag made of the base material, and to guide the head into the restriction recessed portion by the slip portion.

Furthermore, as the airbag device for a passenger seat, the slip portion may be configured of a sheet body of which a friction resistance of the surface is set to be smaller than that of a base material that configures the airbag, include both terminals that are linked to a tip end side of a recess of the restriction recessed portion, so that an airbag when inflation is completed forms in a substantially loop shape in a state of being viewed from an upward-and-downward direction side, and include a front part disposed on the frontal collision restriction face side and a rear part disposed on the occupant side, the front part may be configured such that a separation distance between a front linking part linked to the restriction recessed portion side and a rear linking part linked to the frontal collision restriction face side is set to be substantially the same as a membrane length from the front linking part to the rear linking part in the base material of the airbag when the inflation is completed, as a configuration in which the area around the rear end is linked to the frontal collision restriction face side, and a separation distance between the front linking part and the rear linking part at the rear part may be set to be greater than a membrane length from the front linking part to the rear linking part in the base material of the airbag when inflation is completed.

With such a configuration of the airbag device for a passenger seat, when the inflation of the airbag is completed, in the slip portion, the rear part which has received the head of the occupant moves to slide with respect to the front part of which a friction resistance of the surface is set to be smaller than that of the base material that configures the airbag. Therefore, it is possible to smoothly move the rear part of the slip portion which has received the head of the occupant with respect to the airbag by allowing the rear part to slide with respect to the front part, and further, the rear part itself can also allow the head of the occupant to slide. As a result, compared to a case where the slip portion which has received the head slides on the base material that configures the airbag, it is possible to allow the head of the occupant to more smoothly slide by the rear part.

Furthermore, in the airbag device for a passenger seat of the invention, it is preferable that an outer slip portion having excellent sliding properties compared to those of other regions of the frontal collision restriction face is disposed in a region from a surface side of the oblique collision restriction face in the airbag when inflation is completed to a surface side of an outer wall portion that becomes the oblique collision restriction face side in the restriction recessed portion, and the outer slip portion is configured to have sliding properties by which the received head is guided toward the inside of the restriction recessed portion when the head of the occupant who moves obliquely forward comes into contact with the oblique collision restriction face at the time of oblique collision or offset collision of the vehicle.

With such a configuration of the airbag device for a passenger seat, when the oblique collision or the offset collision of the vehicle occurs, even when the head of the occupant who moves obliquely forward comes into contact with the region separated rearward from the restriction recessed portion on the oblique collision restriction face, the head of the occupant is allowed to slide by the outer slip portion, and in a state where the rotation is suppressed such that the face is oriented toward the rear end side of the oblique collision restriction face, it is possible to guide the head to the restriction recessed portion side. Therefore, it is possible to allow the head to smoothly enter the inside of the restriction recessed portion.

Specifically, similar to the above-described slip portion, the outer slip portion may be configured of a sheet body of which a friction resistance of the surface is set to be smaller than that of a base material that configures the airbag, and include a rear end side that is temporarily coupled to the oblique collision restriction face by outer temporary coupling means, and a separation distance between an outer front linking part of which a front end side is linked to a tip end side of a recess of the restriction recessed portion and an outer rear linking part of which a rear end side is linked to an oblique collision restriction face may be set to be greater than a membrane length from the outer front linking part to the outer rear linking part in the airbag when inflation is completed.

Furthermore, the outer slip portion may also have an outer part disposed on the oblique collision restriction face side and an inner part disposed on the occupant side by linking both of the terminals to the tip end side of the recess of the restriction recessed portion and by making the airbag, when the inflation is completed, in a substantially loop shape in a state of being viewed from the upward-and-downward direction side, may be configured such that a separation distance between an outer front linking part linked to the restriction recessed portion side and an outer rear linking part linked to the oblique collision restriction face side is set to be substantially the same as a membrane length from the outer front linking part to the outer rear linking part in the base material of the airbag when the inflation is completed, as a configuration in which the area around the rear end of the outer part is linked to the oblique collision restriction face side, and a separation distance between the outer front linking part and the outer rear linking part at the inner part may be set to be greater than a membrane length from the outer front linking part to the outer rear linking part in the base material of the airbag when inflation is completed.

Furthermore, in the airbag device for a passenger seat having the configuration, a case where the rear end side of the restriction recessed portion is configured to be widened and open to the frontal collision restriction face side, is preferable since it is possible to allow the head of the occupant to more smoothly enter the inside of the restriction recessed portion when the head of the occupant who moves obliquely forward comes into contact with the frontal collision restriction face.

DETAILED DESCRIPTION OF THE INVENTION

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
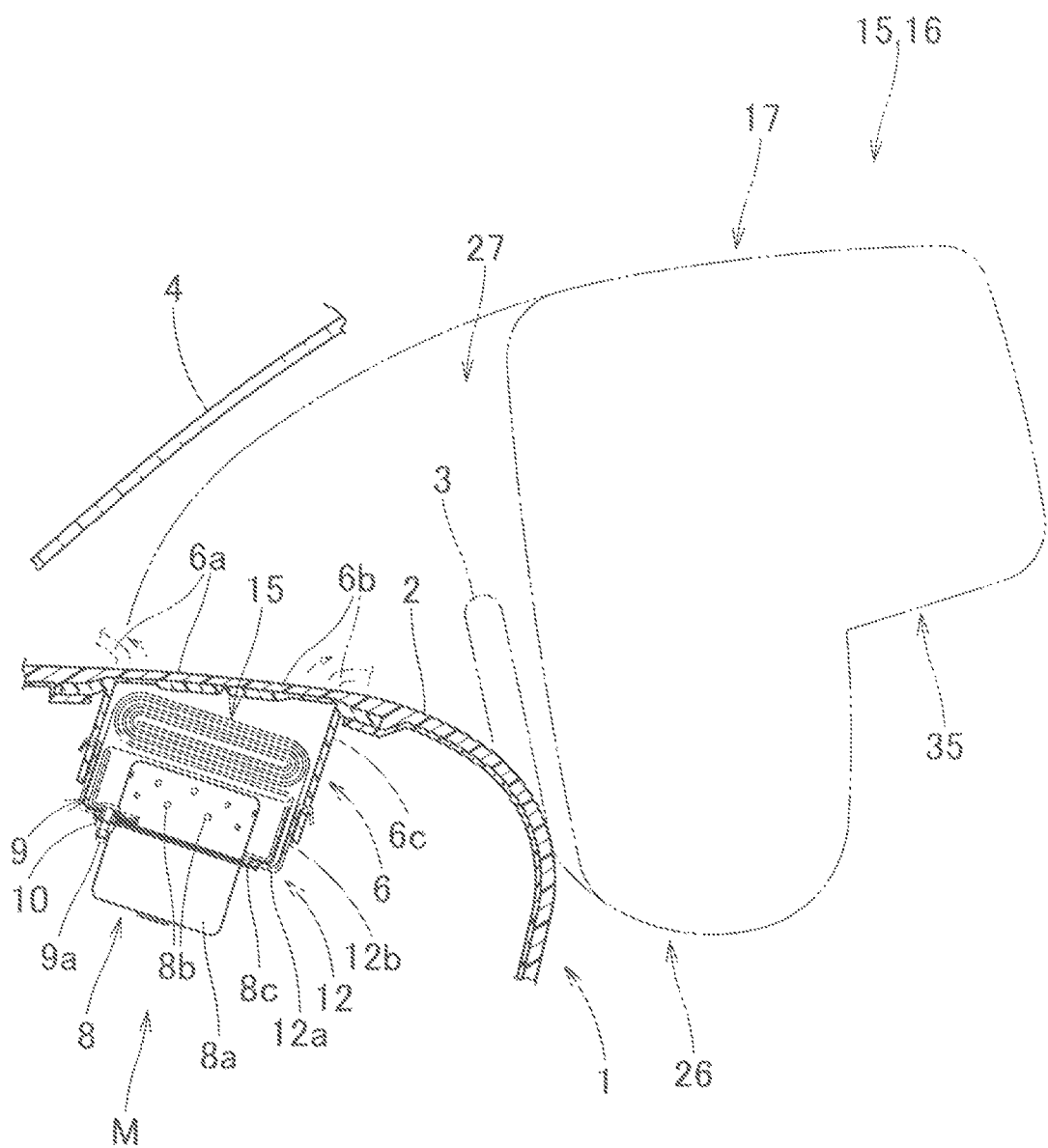
FIG. 1 is a schematic longitudinal sectional view illustrating a state where an airbag device for a passenger seat which is an embodiment of the invention is loaded in a vehicle.
Figure 2:
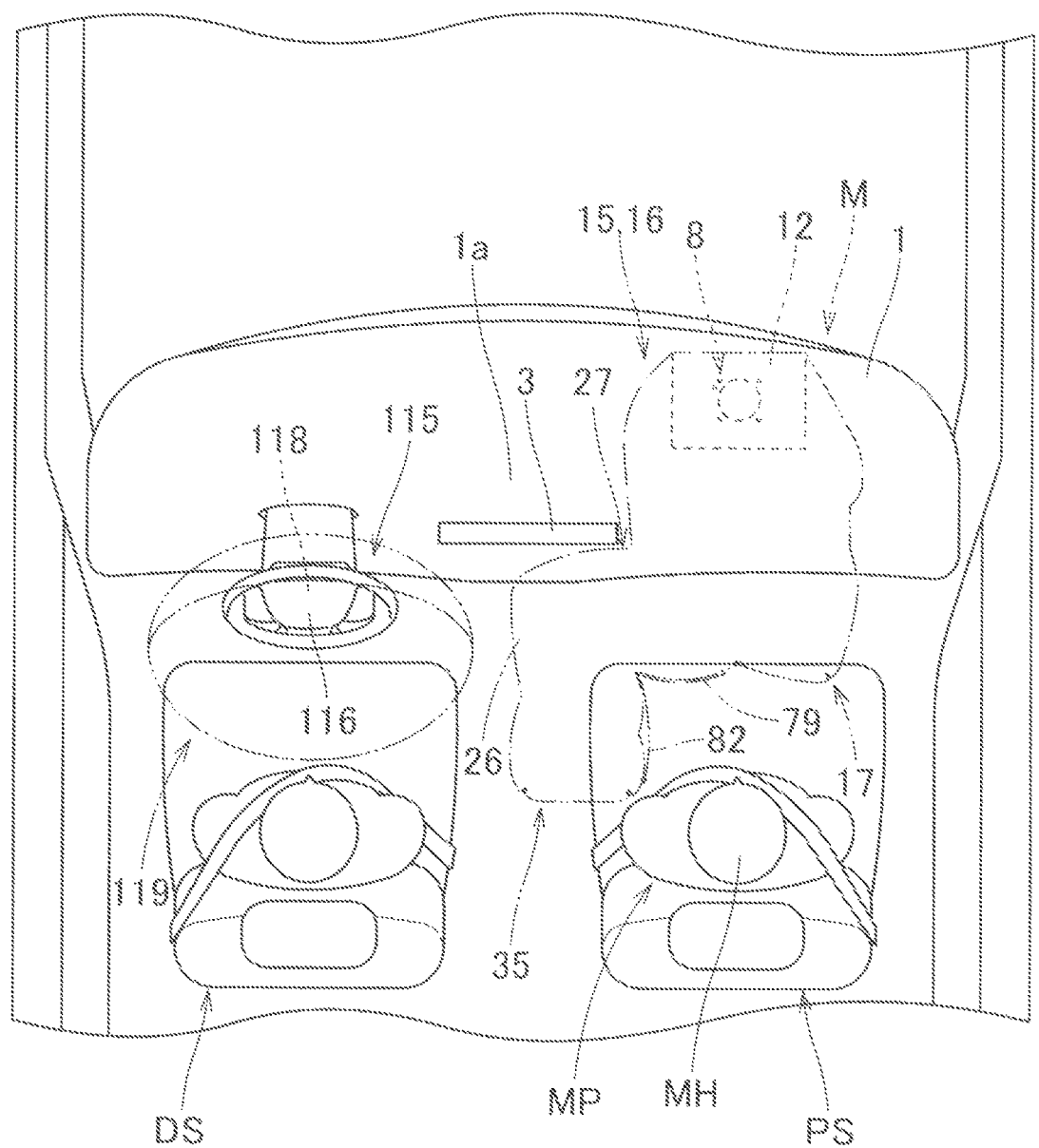
FIG. 2 is a schematic plan view of a state where the airbag device for a passenger seat of the embodiment is loaded in the vehicle.

Hereinafter, one embodiment of the invention will be described based on the drawings. As illustrated in FIGS. 1 and 2, an airbag device M for a passenger seat of the embodiment is a top-mount type which is disposed on the inside of an upper surface 2 of an instrument panel 1 in front of a passenger seat PS in a vehicle V. In addition, in the instrument panel 1 of the vehicle V in which the airbag device M for a passenger seat of the embodiment is loaded, as illustrated in FIGS. 1 and 2, a monitor 3 of a car navigation system is installed to protrude upward from the upper surface 2. Specifically, the monitor 3 is installed in the vicinity of a rear end of a center side part 1a which is a left side (which is a center side in a vehicle width direction of the vehicle V and a front region of a part between a driver seat DS and the passenger seat PS) of a case 12 which serves as a storage part. In other words, in the instrument panel 1 of the embodiment, the monitor 3 is installed to partially protrude to the center side part 1a. In the embodiment, the forward-and-rearward, upward-and-downward, and leftward-and-rightward directions are not particularly limited, and are identical to the forward-and-rearward, upward-and-downward, and leftward-and-rightward directions of the vehicle V.

As illustrated in FIG. 1, the airbag device M for a passenger seat of the embodiment includes: a folded airbag 15; an inflator 8 which supplies inflation gas to the airbag 15; the case 12 which serves as a storage part at which the airbag 15 and the inflator 8 are stored and held; a retainer 9 for attaching the airbag 15 and the inflator 8 to the case 12; and an airbag cover 6 which covers the folded airbag 15.

The airbag cover 6 is configured to be formed to be integrated with the instrument panel 1 made of a synthetic resin, and to open two front and rear door portions 6a and 6b being pressed to the airbag 15 when developing and inflating the airbag 15. In addition, a linking wall portion 6c linked to the case 12 is formed around the door portions 6a and 6b in the airbag cover 6.

As illustrated in FIG. 1, the inflator 8 includes: a substantially columnar main body portion 8a having a plurality of gas discharge ports 8b; and a flange portion 8c for attaching the inflator 8 to the case 12. In a case of the embodiment, the inflator 8 is configured to be operated when frontal collision, oblique collision, and offset collision of the vehicle V occur.

The case 12 which serves as a storage part is formed in a shape of a rectangular parallelepiped made of a sheet metal having a rectangular shape on an upper end side, and as illustrated in FIG. 1, includes a bottom wall portion 12a, and a circumferential wall portion 12b which extends upward from an outer circumferential edge of the bottom wall portion 12a. The bottom wall portion 12a is a member which inserts and attaches the inflator 8 from below, and has a shape of a rectangular sheet. The circumferential wall portion 12b is a part which locks the linking wall portion 6c of the airbag cover 6. In a case of the embodiment, the airbag 15 and inflator 8 are attached to the bottom wall 12a of the case 12 by locating the retainer 9 inside the airbag 15 such that bolts (fixing means) 9a of the retainer 9 go through the periphery of a later-described gas inlet port 21 of the airbag 15, the bottom wall 12a of the case 12 and flange 8c of the inflator 8 and by fastening the bolts 9a with nuts 10. In addition, in the bottom wall portion 12a of the case 12, a bracket which is not illustrated and is linked to a body side of the vehicle V is installed.

In a case of the embodiment, as illustrated in FIGS. 3 to 13, the airbag 15 includes: a bag main body 16 which allows the inflation gas to flow to the inside and inflate; tethers 50, 54, 55, 57, 67, 68, 70, 72, and 75 which are disposed in the bag main body 16, and regulate a shape obtained by finishing inflation of the bag main body 16; and a slip member 79 and an outer slip member 82 which serve as a slip portion and an outer slip portion which are disposed on the surface (outer surface) side of the bag main body 16. The slip member 79 and the outer slip member 82 are respectively separated from the bag main body 16.

The bag main body 16 has a shape of a bag formed of a sheet body having flexibility, and in a case of the embodiment, as illustrated in FIGS. 3 to 6, the bag main body 16 includes a main body inflation portion 17 and a protrusion inflation portion 35 disposed to protrude rearward from the rear face of the main body inflation portion 17 when the inflation is completed.

Figure 3:
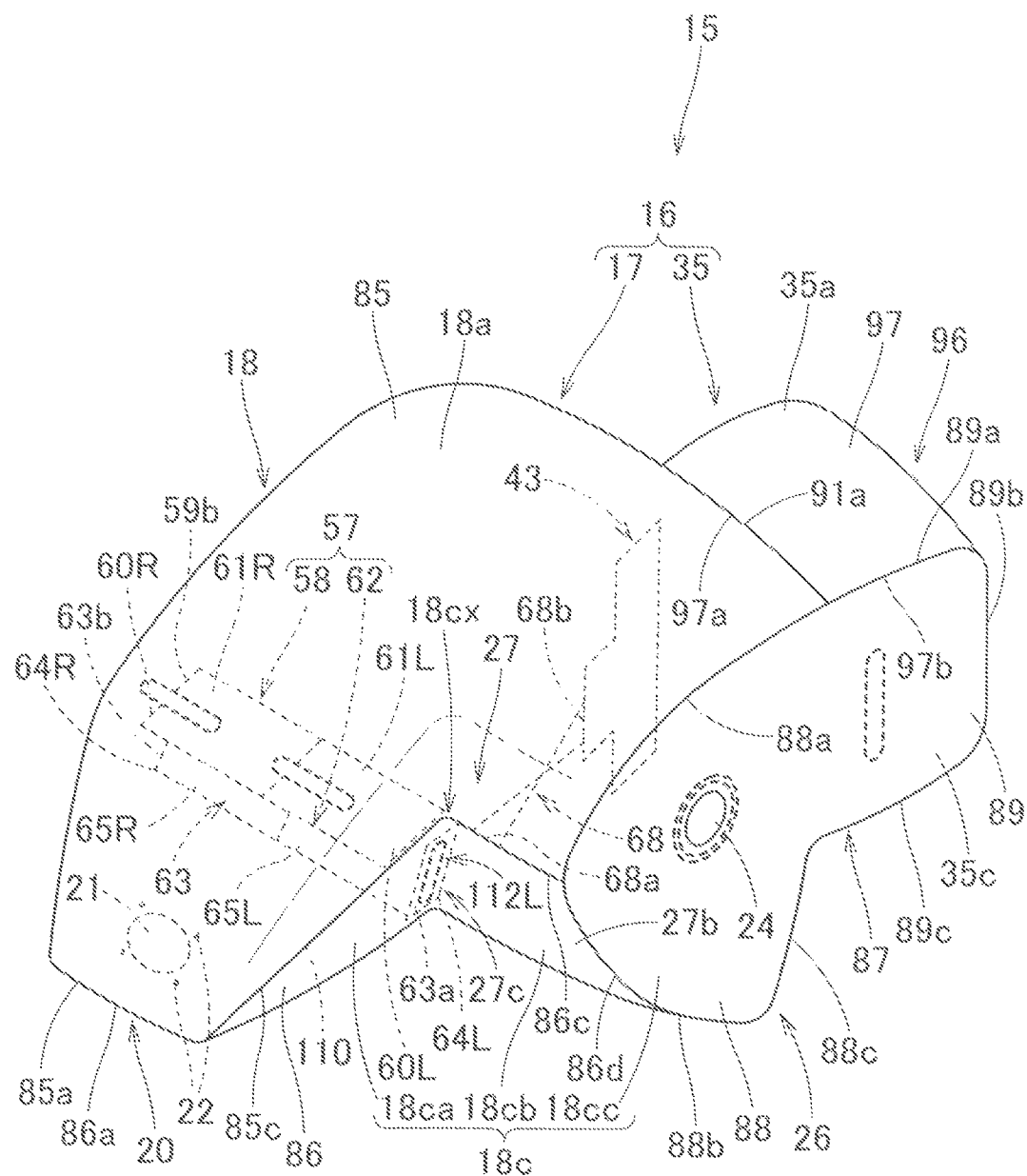
FIG. 3 is a perspective view of a state where an airbag to be used in the airbag device for a passenger seat of the embodiment is inflated as a single body, as viewed from a left front side.
Figure 4:
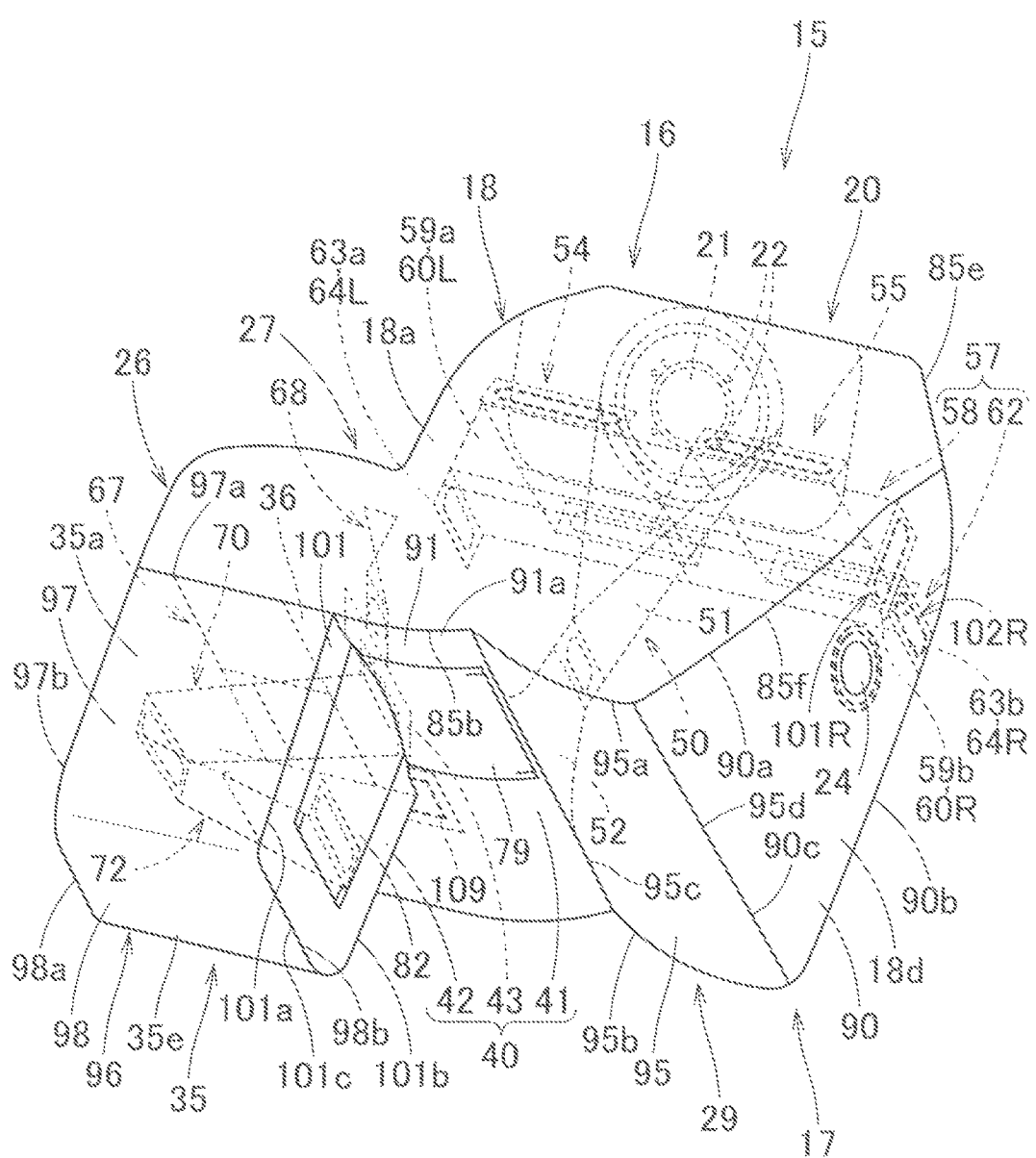
FIG. 4 is a perspective view of a state where the airbag of FIG. 3 is inflated as a single body, as viewed from an upper right rear side.

As illustrated by two-dot chain line of FIG. 1, the main body inflation portion 17 is configured to be capable of being disposed to cover a part between the upper surface 2 of the instrument panel 1 and a windshield 4 above the instrument panel 1 when the inflation is completed. Specifically, as illustrated in FIGS. 3 and 4, the shape of the main body inflation portion 17 when the inflation is completed is a shape of a substantially trigonal prism of which a shaft direction is substantially along the leftward-and-rightward direction, and a part on a right front end side when the inflation is completed is an attachment portion 20 attached to the case 12. The main body inflation portion 17 is configured to be disposed to largely overhang to the left side (center side in the vehicle width direction) that becomes the driver seat DS side, when the inflation is completed. In addition, the main body inflation portion 17 includes: a rear wall portion 29 disposed on the rear face side on an occupant MP side when the inflation is completed; and a circumferential wall portion 18 which extends forward from the circumferential edge of the rear wall portion 29. The circumferential wall portion 18 has a tapered shape which is restricted such that a width dimension in the upward-and-downward direction decreases to the front end side.

Figure 5:
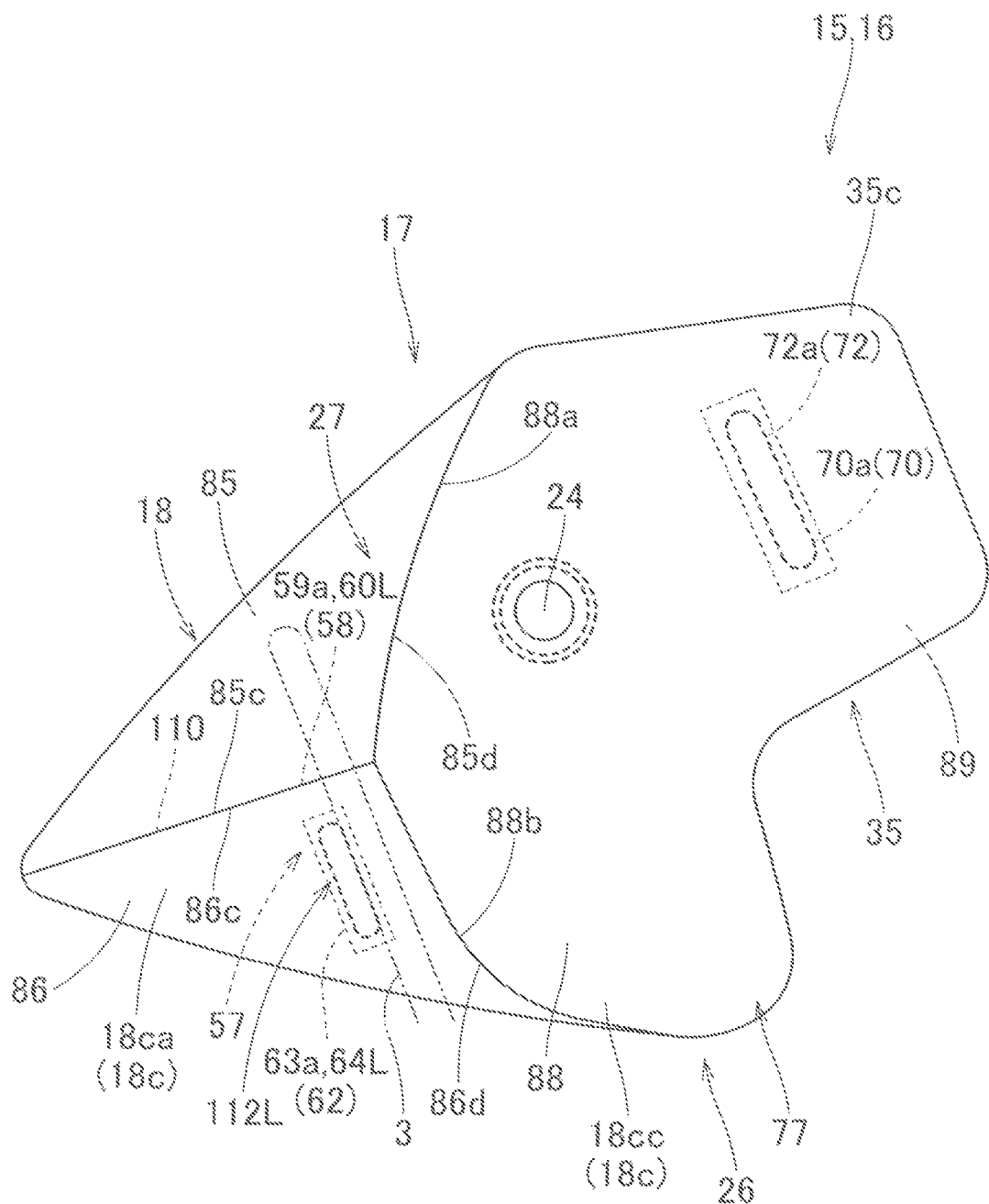
FIG. 5 is a left surface view illustrating a state where the airbag of FIG. 3 is inflated as a single body.
Figure 10:
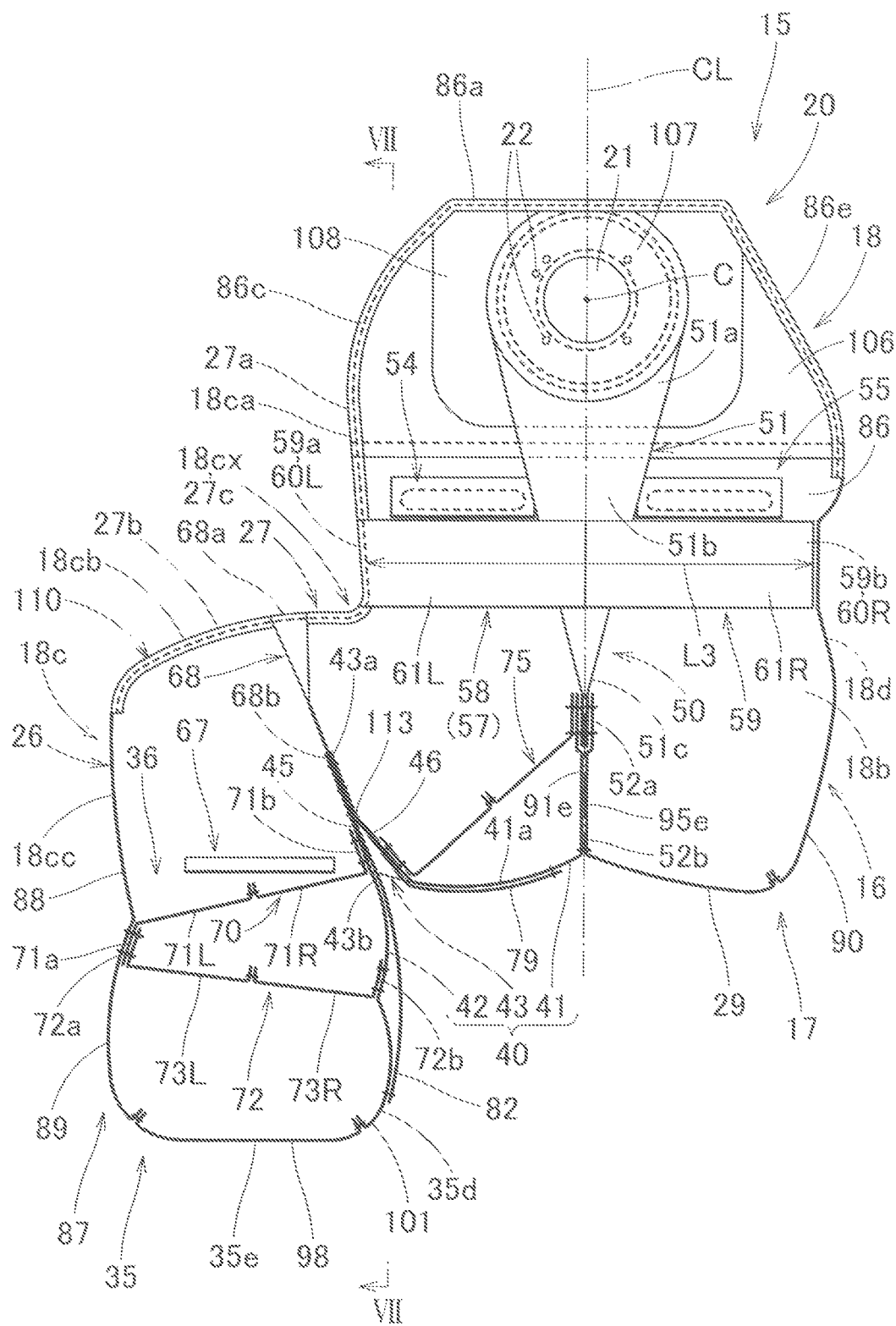
FIG. 10 is a schematic cross sectional view of the airbag of FIG. 3.

The circumferential wall portion 18 is a part disposed to mainly cover the part between the upper surface 2 of the instrument panel 1 and the windshield 4 above the instrument panel 1, when the inflation of the airbag 15 is completed. The circumferential wall portion 18 includes: an upper wall portion 18*a* and a lower wall portion 18*b* which are disposed substantially along the leftward-and-rightward direction to oppose each other on both of the upper and lower sides; and a left wall portion 18*c* and a right wall portion 18*d* which are disposed to oppose each other on both of the left and right sides. The right wall portion 18*d* is disposed to be substantially along the forward-and-rearward direction when inflation of the airbag 15 is completed. The left wall portion 18*c* is a part which configures the left surface side of a support inflation portion 26 provided with a detour recessed portion 27 which will be described. As illustrated in FIGS. 3, 5, and 10, the left wall portion 18*c* includes: a front part 18*ca* which is disposed substantially along the forward-and-rearward direction on the front end side; a rear part 18*cc* which is disposed at a position on the left side of the front part 18*ca* on the rear end side substantially along the forward-and-rearward direction; and an intermediate part 18*cb* which links the front part 18*ca* and the rear part 18*cc* to each other. The intermediate part 18*cb* is disposed substantially along the leftward-and-rightward direction and substantially along the upward-and-downward direction.

In the airbag 15 of the embodiment, a part on the front right end side when the inflation is completed in the circumferential wall portion 18, is the attachment portion 20 for attaching the airbag 15 to the case 12 (refer to FIGS. 3 and 10). The attachment portion 20 is disposed in the case 12 when the inflation of the airbag 15 is completed. On the lower face side (lower wall portion 18*b* side) when the inflation is completed in the attachment portion 20, the gas inflow port 21 which is open in a substantially circular shape and through which the inflation gas flows to the inside, and of which a circumferential edge is attached to the case 12, is installed. In the circumferential edge of the gas inflow port 21, a plurality of (four in a case of the embodiment) attachment holes 22 for inserting the bolts 9*a* of the retainer 9 thereinto and attaching the circumferential edge of the gas inflow port 21 to the bottom wall portion 12*a* of the case 12 is formed. In addition, in a case of the embodiment, the airbag 15 is attached to the case 12 and is loaded in the vehicle V considering the center of the gas inflow port 21 as an attachment center C (refer to FIG. 10) such that the attachment center C is identical to the center of the passenger seat PS in the leftward-and-rightward direction (refer to FIG. 16). In addition, a vent hole 24 for exhausting the excessive inflation gas that flows to the inside is formed in the left wall portion 18*c* and the right wall portion 18*d* (refer to FIGS. 3 and 4). As illustrated in FIGS. 3 and 5, the vent hole 24 on the left wall portion 18*c* is disposed at the rear part 18*cc* which configures the part of the support inflation portion 26.

In addition, as illustrated in FIG. 10, the main body inflation portion 17 of the embodiment is configured to set a protrusion amount to the left side (center side in the vehicle width direction) of a region (support inflation portion 26) positioned further on the left side than a center line CL along the forward-and-rearward direction passing through the attachment center C to be greater than a protrusion amount to a right side (outer side in the vehicle width direction) of a region positioned further on the right side than the center line CL, when the inflation is completed, and to largely protrude to the left side (driver seat DS side). In addition, in the embodiment, when the inflation is completed, the main body inflation portion 17 is configured such that the region on the left front side when the inflation is completed, is recessed to detour the above-described monitor 3 (refer to FIGS. 3 and 10). In other words, the main body inflation portion 17 is configured as the support inflation portion 26 which can support the front side of the protrusion inflation portion 35 while the region on the left side that largely overhangs to the driver seat DS side when the inflation is completed is disposed on the front side of the protrusion inflation portion 35. In addition, the support inflation portion 26 installs the region on the front end side as the detour recessed portion 27 which can detour the monitor 3 that serves as a protrusion disposed to protrude partially upward from the instrument panel 1. The main body inflation portion 17 is configured such that the region on the left front side when the inflation is completed is recessed across the entire region in the upward-and-downward direction. In other words, as illustrated in FIGS. 3, 5, and 10, the detour recessed portion 27 is formed across the entire region in the upward-and-downward direction of the main body inflation portion 17.

In addition, in a case of the embodiment, when the inflation of the airbag 15 is completed, the front part 18*ca* of the left wall portion 18*c* which configures a right surface 27*a*, and the intermediate part 18*cb* of the left wall portion 18*c* which configures a rear surface 27*b* intersect with each other to be substantially orthogonal to each other. In other words, the detour recessed portion 27 includes an angle portion 27*c* (intersection part 18*cx* between the front part 18*ca* and the intermediate part 18*cb*) between the right surface 27*a* and the rear surface 27*b* (refer to FIGS. 3 and 10). In addition, in the embodiment, when the inflation is completed, an airbag 119 for a steering wheel which inflates to cover a steering wheel 115 disposed in front of the driver seat DS approaches the left wall portion 18*c* (specifically, rear part 18*cc* which configures the left surface of the support inflation portion 26) of the circumferential wall portion 18 that becomes the driver seat DS side in the main body inflation portion 17. In addition, in the embodiment, when the inflation of the airbag 15 is completed, the front part 18*ca* of the left wall portion 18*c* of the circumferential wall portion 18 substantially match a right wall portion 35*d* of the protrusion inflation portion 35 and the position on the leftward-and-rightward direction side to each other (refer to FIG. 10).

Figure 6:
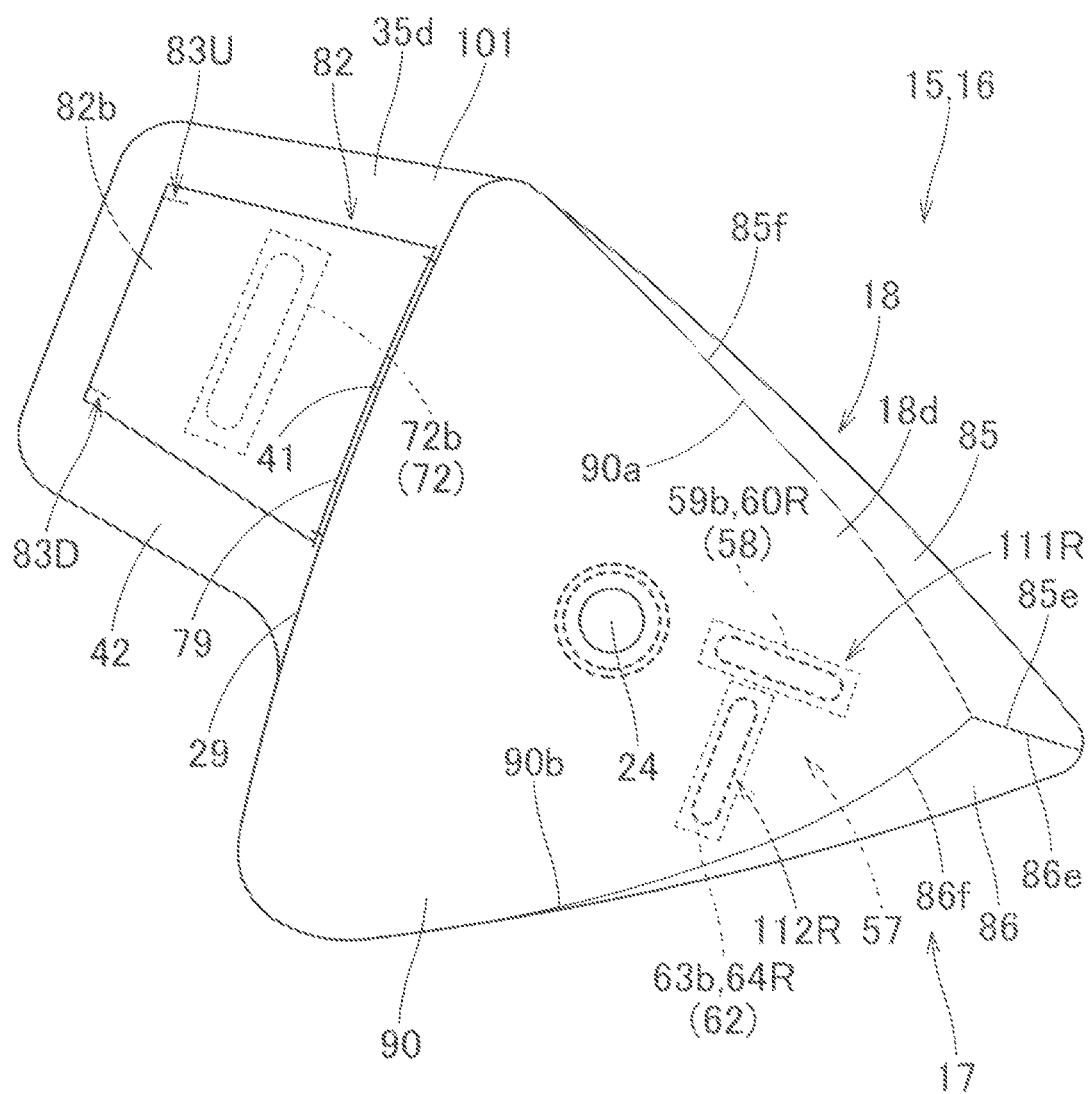
FIG. 6 is a right surface view illustrating a state where the airbag of FIG. 3 is inflated as a single body.
Figure 7:
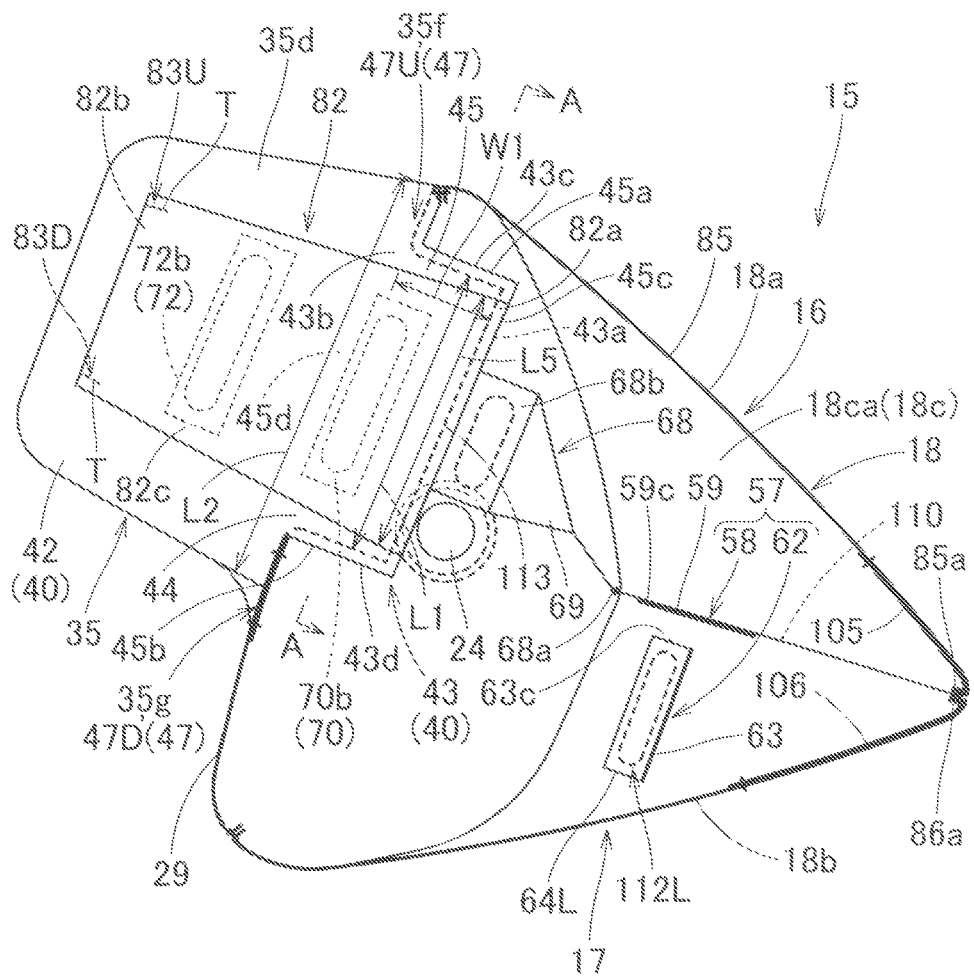
FIG. 7 is a schematic longitudinal sectional view of the airbag of FIG. 3, and corresponds to a part VII-VII of FIG. 10.
Figure 7:
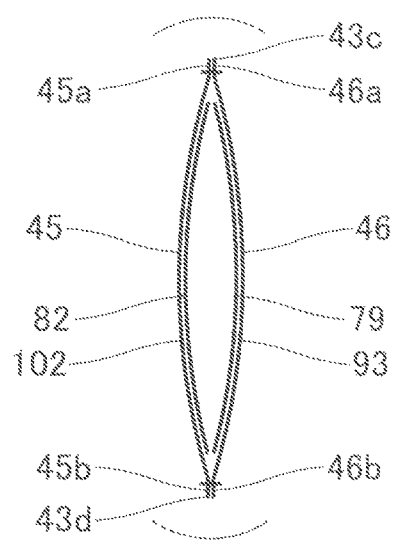
Figure 8:
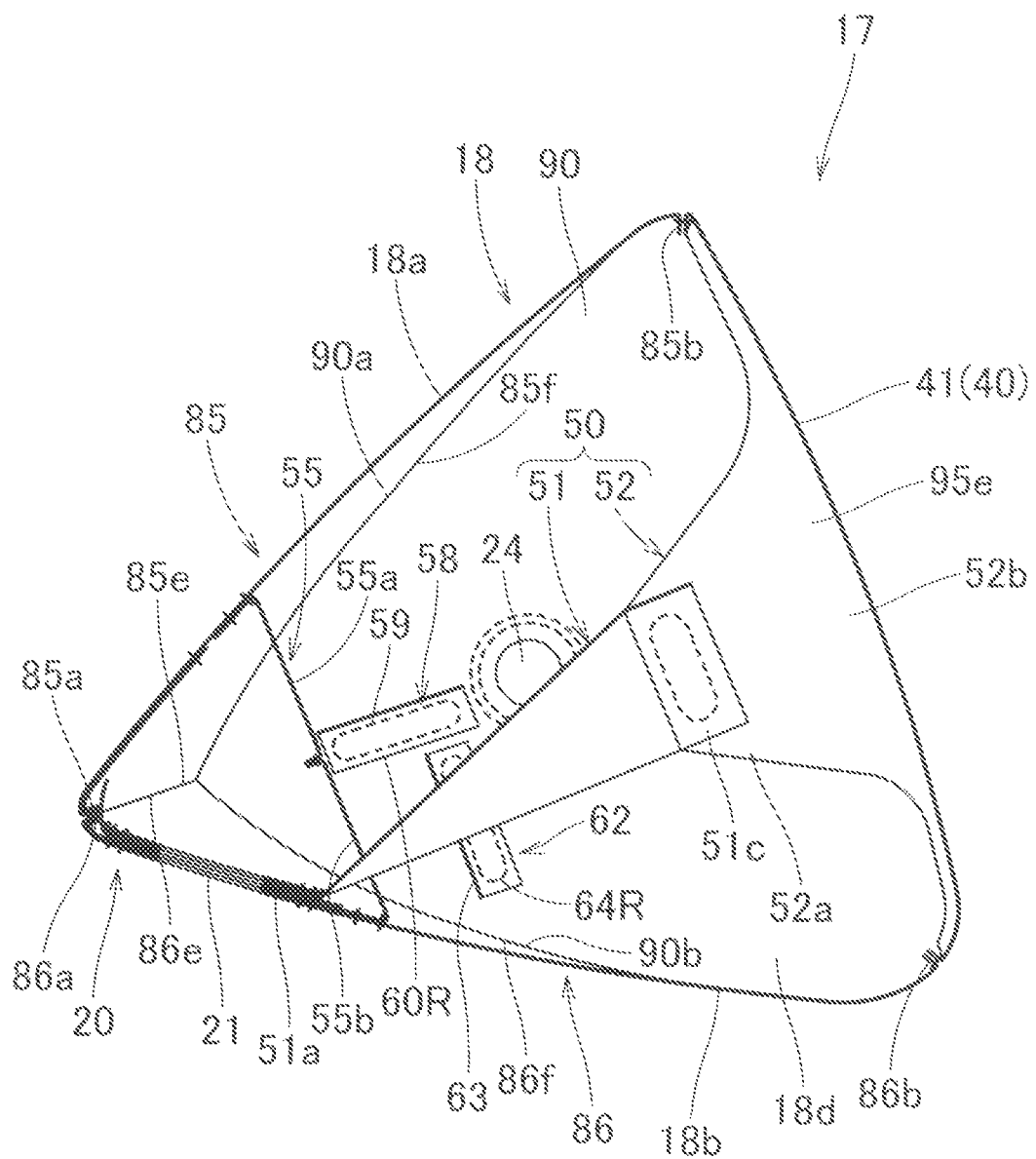
FIG. 8 is a schematic longitudinal sectional view of the airbag of FIG. 3, and is a sectional view at a part of a front and rear tether.

When the inflation of the airbag 15 is completed, on the rear face side which becomes the occupant MP side, the rear wall portion 29 is disposed to be along the upward-and-downward direction. In a case of the embodiment, as illustrated in FIGS. 6 to 8, the rear wall portion 29 is slightly inclined with respect to the upward-and-downward direction so as to make the lower end side oriented rearward. In addition, the rear wall portion 29 is disposed to be substantially along the leftward-and-rightward direction on a cross sectional view along the forward-and-rearward direction when the inflation of the airbag 15 is completed. Furthermore, in the region further on the left side than the center (center line CL) in the leftward-and-rightward direction in the rear wall portion 29, the protrusion inflation portion 35 which inflates to protrude rearward when the inflation of the airbag 15 is completed, is disposed (refer to FIG. 10).

Specifically, in the rear wall portion 29, since the protrusion inflation portion 35 is formed at a part on the left upper side when the inflation is completed, when the inflation of the airbag 15 is completed, the protrusion inflation portion 35 is disposed at a position which is obliquely left front side of a head MH of the occupant MP seated in the passenger seat PS. In addition, in the airbag 15 of the embodiment, when the inflation of the airbag 15 is completed, the protrusion inflation portion 35 is disposed at a position that becomes a rear side of the monitor 3. In other words, in the airbag 15 of the embodiment, a configuration in which, when the inflation is completed, the support inflation portion 26 and the protrusion inflation portion 35 are disposed to overlap each other on the forward-and-rearward direction side behind the monitor 3 to detour the monitor 3 by the detour recessed portion 27, is employed (refer to FIG. 16).

Figure 11:
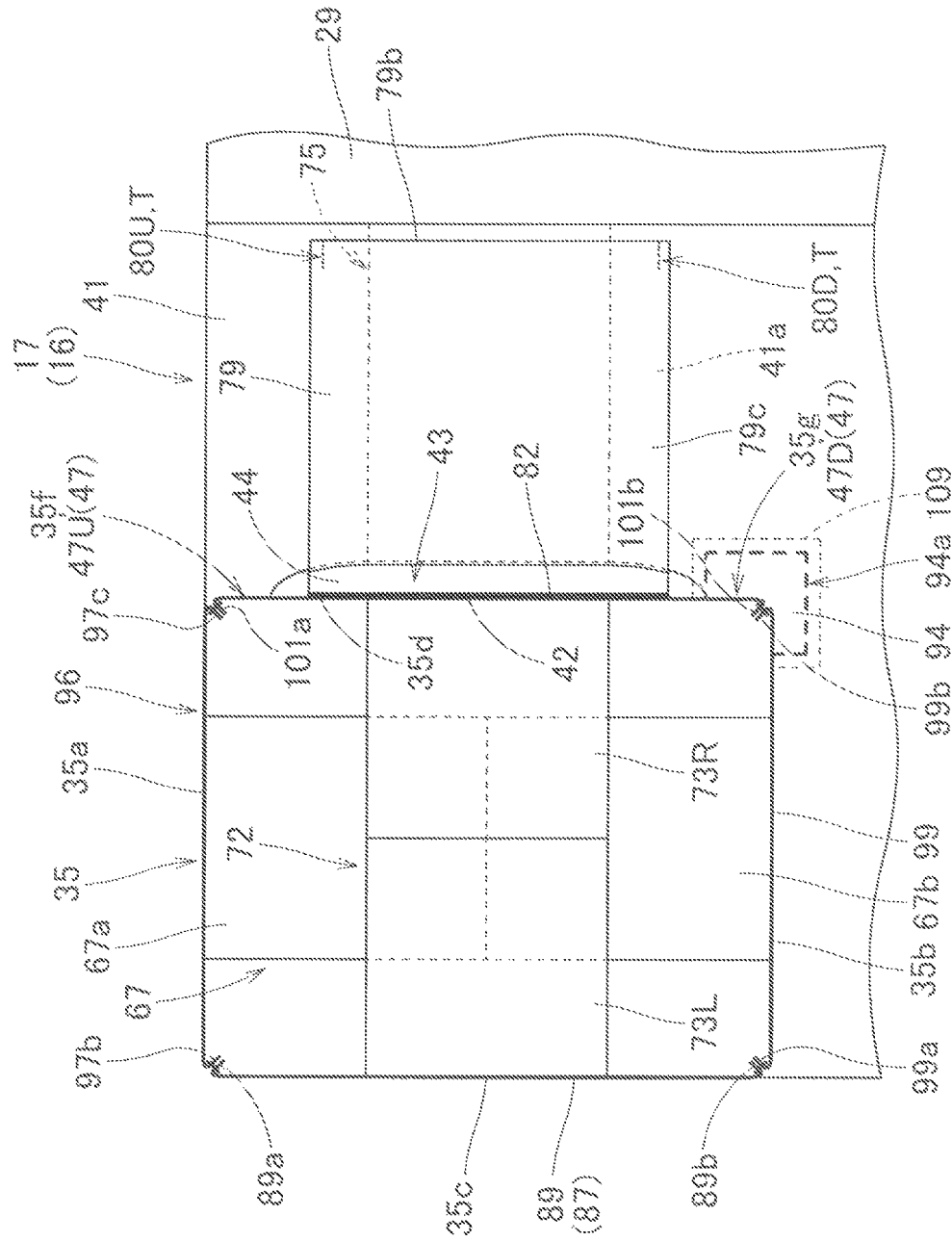
FIG. 11 is a sectional view illustrating a part XI-XI of FIG. 9.

The protrusion inflation portion 35 communicates with the support inflation portion 26 of the main body inflation portion 17 on the front end side when the inflation is completed, and is configured to allow the inflation gas to flow to the inside from the main body inflation portion 17 via a communication portion 36 on the front end side (refer to FIGS. 10 and 11). The protrusion inflation portion 35 includes: an upper wall portion 35a and a lower wall portion 35b which are disposed substantially along the leftward-and-rightward direction on both of the upper and lower sides; a left wall portion 35c and the right wall portion 35d which are disposed substantially along the forward-and-rearward direction on both of the left and right sides; and a rear wall portion 35e which is disposed substantially along the upward-and-downward direction on the rear side. In a case of the embodiment, the left wall portion 35c is configured to be linked from the left wall portion 18c (specifically, the rear part 18cc that configures the left surface of the support inflation portion 26) of the circumferential wall portion 18 in the main body inflation portion 17 (refer to FIGS. 10 and 12).

The protrusion inflation portion 35 is formed in a region further on a left side (the center side in the vehicle width direction, the driver seat DS side) than the center line CL along the forward-and-rearward direction passing through the attachment center C, on a lateral section along the forward-and-rearward direction when the inflation of the airbag 15 is completed (refer to FIG. 10). In a case of the embodiment, a width dimension on the leftward-and-rightward direction side of the protrusion inflation portion 35 when the inflation is completed is set to be approximately ⅖ of a width dimension on the leftward-and-rightward direction side at a part in the vicinity of the rear wall portion 29 when the inflation of the main body inflation portion 17 is completed. In addition, the width dimension on the upward-and-downward direction side of the protrusion inflation portion 35 when the inflation is completed is set to be a dimension by which the head MH of the occupant MP who moves obliquely leftward and forward can be accurately protected when the oblique collision or the offset collision of the vehicle V occurs. Specifically, a width dimension L2 on the upward-and-downward direction side of the protrusion inflation portion 35 is set to be greater than a length dimension L1 (refer to FIG. 7) on the upward-and-downward direction side of a restriction recessed portion 43 which will be described later. The width dimension L2 on the upward-and-downward direction side of the protrusion inflation portion 35 is set to be approximately ⅗ of the width dimension in the upward-and-downward direction when the inflation is completed at the part in the vicinity of the rear wall portion 29 in the main body inflation portion 17. In addition, in a case of the embodiment, when the inflation of the airbag 15 is completed, the protrusion inflation portion 35 protrudes further rearward than the airbag 119 for a steering wheel which has been inflated, and is disposed (refer to a two-dot chain line of FIG. 2).

In addition, in the airbag 15 of the embodiment, the protrusion inflation portion 35 disposed on the rear face side when the inflation is completed and the rear wall portion 29 in the main body inflation portion 17 configure an occupant protection portion 40 which can protect the occupant MP when the inflation of the airbag 15 is completed. The occupant protection portion 40 includes: a frontal collision restriction face 41 which can protect the head MH of the occupant MP who moves forward when the frontal collision of the vehicle V occurs; an oblique collision restriction face 42 which can protect the head MH of the occupant MP who moves obliquely forward when the oblique collision or the offset collision of the vehicle V occurs; and the restriction recessed portion 43 which is formed between the frontal collision restriction face 41 and the oblique collision restriction face 42. The restriction recessed portion 43 is a part for allowing the head MH of the occupant MP to enter and to be restricted.

In a case of the embodiment, the frontal collision restriction ace 41 is configured of a region on the upper side of the rear wall portion 29 which is a part on the rear face side when the inflation is completed in the main body inflation portion 17. Specifically, in the airbag 15 when the inflation is completed, the frontal collision restriction face 41 is configured of a region disposed on the right side of the protrusion inflation portion 35. In other words, in a case of the embodiment, the frontal collision restriction face 41 includes a region which extends to the left side (driver seat DS side) exceeding the center line CL along the forward-and-rearward direction passing through the attachment center C, and is configured to be capable of protecting the head MH of the occupant MP who moves forward when the frontal collision occurs without fail. In a case of the embodiment, the frontal collision restriction face 41 is configured such that the area around the center in the leftward-and-rightward direction that becomes the center line CL are slightly recessed forward on a lateral section substantially along the forward-and-rearward direction when the inflation of the airbag 15 is completed (refer to FIG. 10).

In the protrusion inflation portion 35, the oblique collision restriction face 42 is configured of a part of the right wall portion 35d which protrudes rearward being linked from the rear face (rear wall portion 29) of the main body inflation portion 17. In a case of the embodiment, the oblique collision restriction face 42 is disposed to be substantially along the forward-and-rearward direction when the inflation of the airbag 15 is completed. In addition, in the airbag 15 of the embodiment, the region on the lower side in the rear wall portion 29 mainly receives a chest portion of the occupant MP when the head MH of the occupant MP who moves forward is restricted by the occupant protection portion 40 when the frontal collision occurs.

In a case of the embodiment, as illustrated in FIGS. 10 to 13, the restriction recessed portion 43 which is formed between the frontal collision restriction face 41 and the oblique collision restriction face 42 is formed to be substantially along the upward-and-downward direction at a boundary part between the region on the right side of the protrusion inflation portion 35 and the rear wall portion 29 in the main body inflation portion 17. As illustrated in FIG. 7, the restriction recessed portion 43 is configured to open a rear end 43b side and to be recessed forward in a shape of a pocket. In other words, the restriction recessed portion 43 closes both of the upper and lower sides. Specifically, when viewed from the leftward-and-rightward direction side, the restriction recessed portion 43 is configured as a substantially rectangular shape of which the width vertically widens. The restriction recessed portion 43 includes: a left wall 45 which serves as an outer wall portion disposed on the oblique collision restriction face 42 side; and a right wall 46 which serves as an inner wall portion disposed on the frontal collision restriction face 41 side, and is configured in a shape of a pocket that opens the rear end 43b side by coupling (sewing) each of upper edges 45a and 46a to each other, lower edges 45b and 46b to each other, and front edges 45c and 46c to each other in the left wall 45 and the right wall 46 (refer to FIG. 7). In other words, the width dimension of the restriction recessed portion 43 is constant to a front end 43a side (a tip end side of a recess). In addition, the length dimension (the opening width dimension of an opening portion 44) L1 on the upward-and-downward direction side (refer to FIG. 7) of the restriction recessed portion 43 is set to be a dimension by which the head MH of the occupant MP can smoothly enter. Specifically, the length dimension (opening width dimension of the opening portion 44) L1 on the upward-and-downward direction side of the restriction recessed portion 43 is set to be smaller than the width dimension L2 (refer to FIG. 7) on the upward-and-downward direction side at a part on the front end side (root side) of the protrusion inflation portion 35, and is set to be approximately 400 mm. In addition, a width dimension (depth) W1 (refer to FIG. 7) on the forward-and-rearward direction side of the restriction recessed portion 43 is set to be a dimension by which the region on the front side of the head MH of the occupant MP can enter. Specifically, the width dimension (depth) W1 on the forward-and-rearward direction side of the restriction recessed portion 43 is set to be approximately 50 to 100 mm. The restriction recessed portion 43 is disposed to substantially match the protrusion inflation portion 35 and the center in the upward-and-downward direction to each other. In other words, the protrusion inflation portion 35 is configured to include edge regions 35f and 35g which are not recessed to protrude outward in the upward-and-downward direction respectively on an upper edge 43c side and on a lower edge 43d side of the restriction recessed portion 43 (refer to FIGS. 11 and 13). The edge regions 35f and 35g in the protrusion inflation portion 35 are configured to be linked to the rear wall portion 29 of the main body inflation portion 17 on the upper side and on the lower side of the restriction recessed portion 43. In other words, the edge regions 35f and 35g are formed on the upper edge 43c side and the lower edge 43d side of the restriction recessed portion 43, and respectively configure linking portions 47U and 47D which link the protrusion inflation portion 35 and the rear wall portion 29 (the frontal collision restriction face 41 and the oblique collision restriction face 42) to each other (refer to FIGS. 11 and 13).

In addition, in the airbag 15 of the embodiment, on the inside, the regulating tether 68 which can regulate the rearward movement of the restriction recessed portion 43 when the airbag 15 is inflated. In addition, in the airbag 15 of the embodiment, the restriction recessed portion 43 is configured to be disposed substantially along a moving direction D (refer to FIGS. 16 and 17) of the head MH of the occupant MP who moves obliquely forward by the regulating tether 68 (refer to FIGS. 10, 12, and 16). Specifically, in the embodiment, the restriction recessed portion 43 is disposed to be inclined with respect to the forward-and-rearward direction to be substantially along the moving direction D of the head portion MH of the occupant MP who moves obliquely forward while an inclination angle θ (refer to FIG. 12) with respect to the forward-and-rearward direction (center line CL along the forward-and-rearward direction passing through the attachment center C) is approximately 20° (approximately 15° to 25°). In addition, in a case of the embodiment, as illustrated in FIG. 7, the restriction recessed portion 43 links the part in the vicinity of the center in the upward-and-downward direction on the tip end side (front end 43a side) of the recess to the regulating tether 68.

Figure 12:
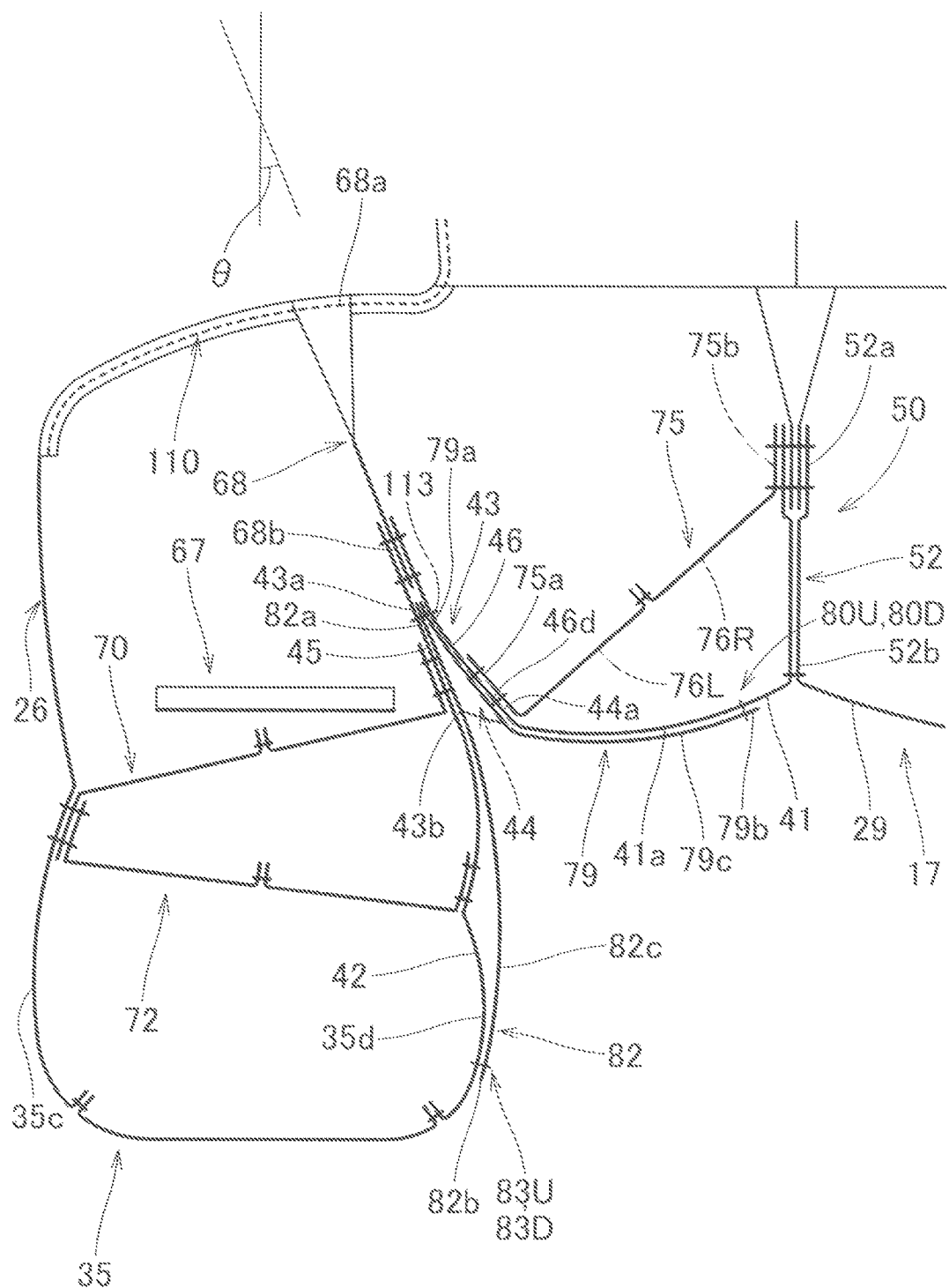
FIG. 12 is a partially enlarged schematic cross sectional view of the airbag of FIG. 3.
Figure 13:
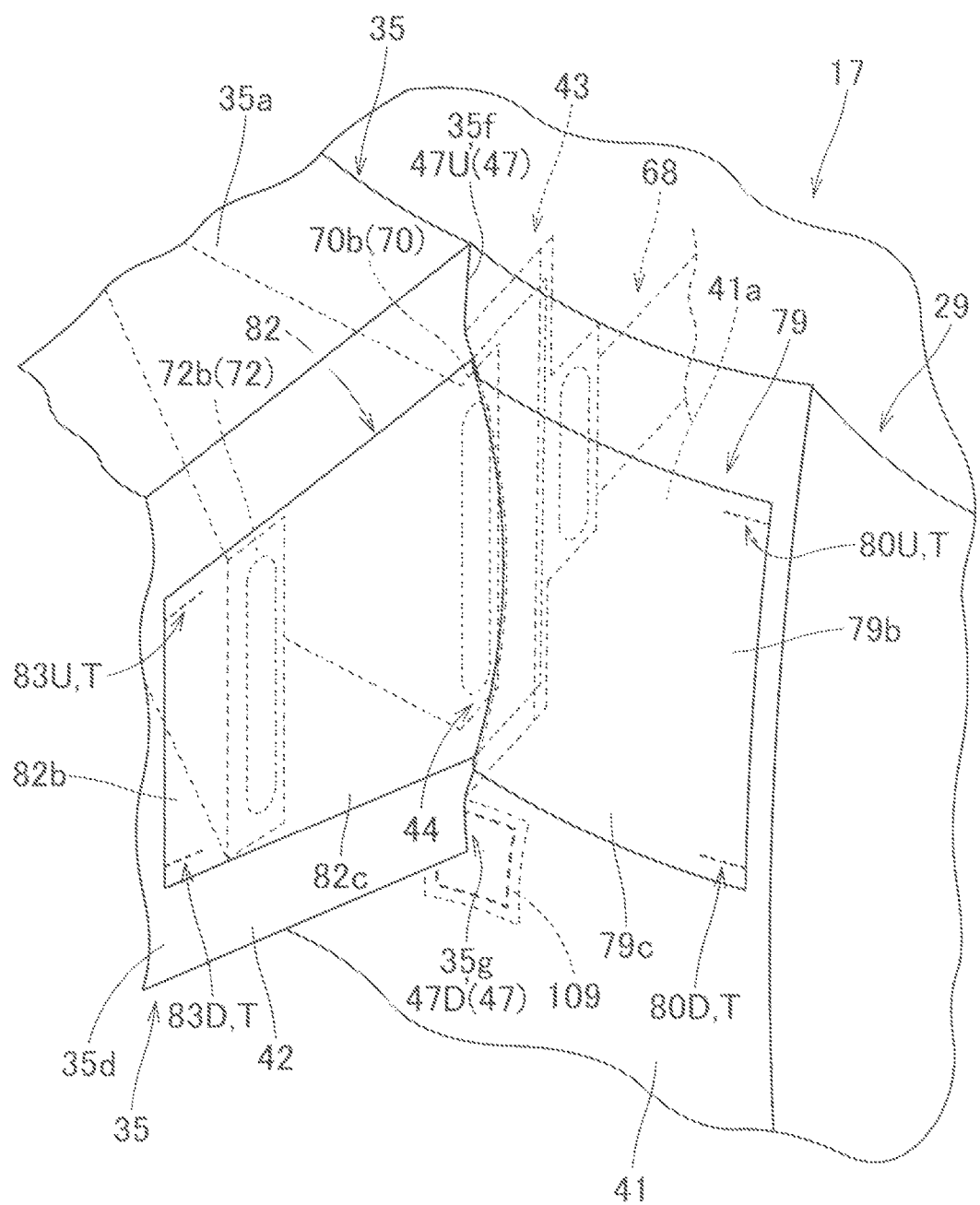
FIG. 13 is a partially enlarged perspective view illustrating a part of a restriction recessed portion in the airbag of FIG. 3.

Furthermore, in the airbag 15 of the embodiment, on the inside, the regulating tether 75 which regulates a separation distance between a right edge 44a side (rear edge 46d side of the right wall 46) of the opening portion 44 of the restriction recessed portion 43 and the front and rear tether 50 which will be described later, is installed (refer to FIGS. 10 and 12). In addition, in the airbag 15 of the embodiment, when the inflation is completed, in the restriction recessed portion 43, the rear edge 46d side of the right wall 46 is pulled obliquely rightward and forward by the regulating tether 75. At this time, as illustrated in FIGS. 10, 12, and 13, in the restriction recessed portion 43, the rear end 43b side is disposed being open, to be widened to the frontal collision restriction face 41 side.

In the bag main body 16, in a case of the embodiment, as illustrated in FIGS. 7 to 12, the tethers 50, 54, 55, 57, 67, 68, 70, 72, and 75 are disposed. Specifically, in the bag main body 16, the front and rear tether 50 which is disposed in the region of the main body inflation portion 17, two upper and lower tethers 54 and 55 which are disposed in the region of the main body inflation portion 17, the left and right tether 57 which is disposed in the region of the main body inflation portion 17, the regulating tether 67 which is disposed in the vicinity of the communication portion 36 on the front end side of the protrusion inflation portion 35, the regulating tether 68 which is disposed in the region of the main body inflation portion 17 and pulls the restriction recessed portion 43, two left and right tethers 70 and 72 which are disposed in the region of the protrusion inflation portion 35, and the regulating tether 75 which is disposed in the region of the main body inflation portion 17 and pulls the rear end 43b side of the restriction recessed portion 43, are disposed.

In a case of the embodiment, as illustrated in FIG. 10, when the inflation of the airbag 15 is completed, the front and rear tether 50 is disposed to be positioned on the center line CL along the forward-and-rearward direction passing through the center (attachment center C) of the gas inflow port 21. The front and rear tether 50 is configured to link a front part 51 which extends from a circumferential edge of the gas inflow port 21 and a rear part 52 which extends from the rear wall portion 29 side to each other (refer to FIGS. 8 and 10).

Figure 14:
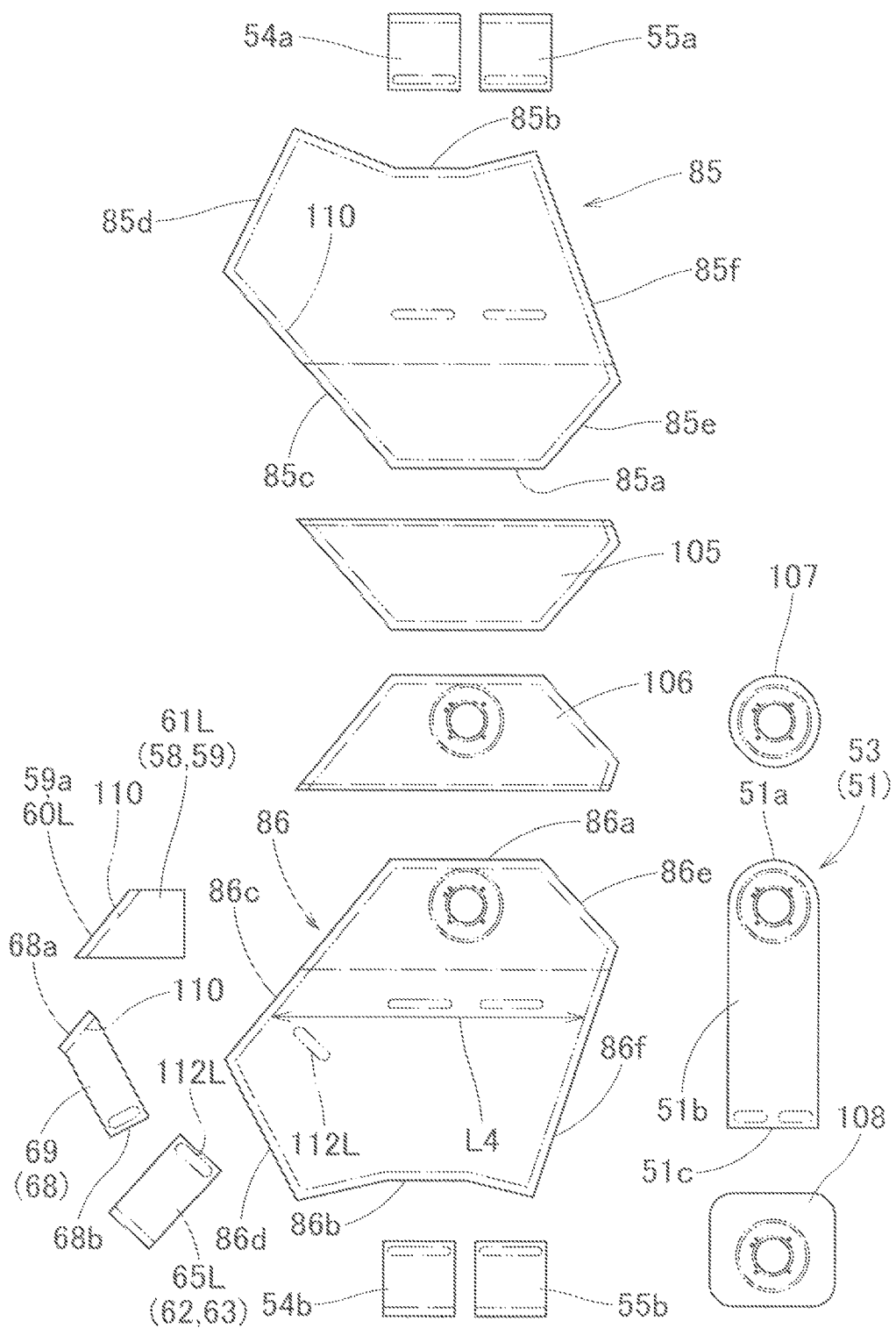
FIG. 14 is a plan view illustrating base fabric which configures the airbag of the embodiment.

The front part 51 is disposed to extend from the gas inflow port 21, and in a case of the embodiment, the front part 51 is configured by folding a front part material 53 illustrated in FIG. 14. The front part 51 has a laterally symmetric shape, and has a three-dimensional shape which is similar to a shape of a substantially triangular pyramid by allowing the front end side of the outer shape of the bag main body 16 when the inflation is completed to be along substantially leftward-and-rightward direction and the rear end side to be substantially upward-and-downward direction. In a case of the embodiment, as illustrated in FIG. 10, considering the region on the front end side as a linking portion 51a to the bag main body 16, an opening (reference numeral omitted) which corresponds to the gas inflow port 21 and the attachment hole 22 is disposed in the linking portion 51a, and the front part 51 is sewed at the part on the lower surface side of the attachment portion 20 in the main body inflation portion 17 across the entire circumference at a circumferential edge part of the gas inflow port 21. In addition, at the front part 51, the region which extends rearward from the gas inflow port 21 configures a main body portion 51b, and the outer shape of the main body portion 51b is a three-dimensional shape which is similar to a shape of a substantially triangular pyramid (refer to FIGS. 8 and 10). The main body portion 51b is configured such that a width dimension in the upward-and-downward direction of a part on a rear end 51c side sewed on a front end 52a side of the rear part 52 is substantially identical to a width dimension in the upward-and-downward direction of a part on the front end 52a side at the rear part 52.

In a case of the embodiment, the rear part 52 is a sheet shaped, and is configured by extending portions 91e and 95e which extend from an inner circumferential edge (a right edge 91d and a left edge 95c) of a left rear panel 91 and a right rear panel 95. The extending portions 91e and 95e are extended from an inner circumferential edge (a right edge 91d and a left edge 95c) of the left rear panel 91 and the right rear panel 95. Then, the extending portions 91e and 95e are integrated with the left rear panel 91 and the right rear panel 95 which configure the rear wall portion 29 in the main body inflation portion 17 (refer to FIGS. 8, 10, and 15). In other words, the rear part 52 has a shape in which two sheets overlap each other, and they are respectively configured to be integrated with the left rear panel 91 and the right rear panel 95. Specifically, in a case of the embodiment, the rear part 52 has a substantially trapezoidal shape in which the front end 52a side linked to the front part 51 has a narrow width and the width widens in the upward-and-downward direction to a rear end 52b side.

Since the front and rear tether 50 regulates the separation distance from the circumferential edge part of the gas inflow port 21 substantially at the center in the leftward-and-rightward direction of the rear wall portion 29 when the inflation of the airbag 15 is completed, at an early stage of the inflation of the airbag 15, the front and rear tether 50 is disposed in order to suppress a large protrusion of the rear wall portion 29 at the rear side that becomes the occupant MP side. In addition, in the embodiment, the rear wall portion 29 is pulled to the front and rear tether 50, and when the inflation of the airbag 15 is completed, the position that is on the center line CL along the forward-and-rearward direction passing through the attachment center C is disposed to be slightly recessed toward the front side of the vehicle across the entire region in the upward-and-downward direction (refer to FIG. 10). In addition, in the embodiment, a right end 75b of the regulating tether 75 is configured by linking the right end 75b of the regulating tether 75 to the front and rear tether 50 as the rear end 51c of the front part 51 and the front end 52a of the rear part 52 are sewed together when forming a suture part at which the rear end 51c and the front end 52a are sewed in the front and rear tether 50 (refer to FIG. 10). Furthermore, the front and rear tether 50 of the embodiment is disposed to pass through the front part 51 at a void between a lateral belt-like body 58 and a longitudinal belt-like body 62 which will be described later in the left and right tether 57.

In a case of the embodiment, as illustrated in FIG. 10, two upper and lower tethers 54 and 55 which are disposed in the main body inflation portion 17 are provided in parallel on the leftward-and-rightward direction to match the positions on the forward-and-rearward direction sides to each other. In a case of the embodiment, specifically, the upper and lower tethers 54 and 55 are at a position that becomes the rear side of the attachment portion 20 in the main body inflation portion 17, and are adjacent to the front side of the left and right tether 57. In addition, the upper and lower tethers 54 and 55 are disposed on both of the left and right sides of the front and rear tether 50 to interpose the front and rear tether 50 therebetween. Each of the upper and lower tethers 54 and 55 respectively has a shape of a belt disposed to be substantially along the upward-and-downward direction to link the upper wall portion 18a and the lower wall portion 18b to each other (refer to FIGS. 3, 4, and 8). The upper and lower tether 54 is configured to couple two pieces of tethering base fabric 54a and 54b which are installed in parallel on the upward-and-downward direction side. The upper and lower tether 55 is configured to couple two pieces of tethering base fabric 55a and 55b which are installed in parallel on the upward-and-downward direction side. In a case of the embodiment, the upper and lower tethers 54 and 55 are disposed such that the width direction is substantially along the leftward-and-rightward direction, and are configured such that the width dimensions on the leftward-and-rightward direction side are substantially the same as each other. The upper and lower tethers 54 and 55 are disposed in order to regulate the separation distance between the upper wall portion 18a and the lower wall portion 18b in the main body inflation portion 17, and to regulate the shape when the inflation of the main body inflation portion 17 is completed, when the inflation of the airbag 15 is completed.

The left and right tether 57 disposed in the main body inflation portion 17 is formed in order to regulate the inflation shape of a part in the vicinity of the detour recessed portion 27. The left and right tether 57 is disposed to be substantially along the leftward-and-rightward direction to link the front part 18ca of the left wall portion 18c which configure the right surface 27a of the detour recessed portion 27, and the right wall portion 18d to each other (refer to FIGS. 3 and 4). In a case of the embodiment, the left and right tether 57 includes the lateral belt-like body 58 which is disposed such that the width direction is substantially along the forward-and-rearward direction when the inflation of the airbag 15 is completed, and a longitudinal belt-like body 62 which is disposed such that the width direction is substantially along the upward-and-downward direction when the inflation of the airbag 15 is completed. Specifically, the lateral belt-like body 58 is disposed at a position that becomes substantially the center in the upward-and-downward direction in the main body inflation portion 17 such that the width direction is substantially along the forward-and-rearward direction. The longitudinal belt-like body 62 is disposed on the lower side of the lateral belt-like body 58 (region between the lateral belt-like body 58 and the lower wall portion 18b) such that the width direction is substantially along the upward-and-downward direction. Specifically, in a case of the embodiment, as illustrated in FIG. 7, in the longitudinal belt-like body 62, an upper edge 63c of a main body portion 63 which will be described later is disposed to be positioned in the vicinity of a rear edge 59c of a main body portion 59 which will be described later in the lateral belt-like body 58, that is, slightly in front of the rear edge 59c. In addition, the left and right tether 57 of the embodiment is configured such that the lateral belt-like body 58 and the longitudinal belt-like body 62 are disposed in a substantially reversed L shape being substantially orthogonal to each other when viewed from the leftward-and-rightward direction side. The lateral belt-like body 58 is configured by coupling two pieces of belt-like base fabric 61L and 61R which are installed in parallel on the leftwardand-rightward direction side. The longitudinal belt-like body 62 is configured by coupling two pieces of belt-like base fabric 65L and 65R which are installed in parallel on the leftward-and-rightward direction side.

Specifically, the lateral belt-like body 58 includes: the substantially belt-like main body portion 59 disposed by allowing the width direction to be substantially along the forward-and-rearward direction; and attachment portions 60L and 60R which attach a left end 59a and a right end 59b side of the main body portion 59 to the front part 18ca of the left wall portion 18c and the right wall portion 18d. Specifically, the attachment portion 60L on the left end 59a side is coupled to the front part 18ca of the left wall portion 18c as being sewed together across the entire region in the forward-and-rearward direction by a suture part 110 when performing suture work of a left front edges 85c and 86c of an upper panel 85 and a lower panel 86 which will be described later (refer to FIGS. 10 and 12). The attachment portion 60R on the right end 59b side is formed to extend downward from the main body portion 59. The attachment portion 60R is coupled to the right wall portion 18d as being coupled to a right panel 90 by a suture part 111R formed across substantially the entire region in the forward-and-rearward direction. Similar to the lateral belt-like body 58, the longitudinal belt-like body 62 also includes: the substantially belt-like main body portion 63 which is disposed by allowing the width direction to be substantially along the upward-and-downward direction; and attachment portions 64L and 64R which attach a left end 63a side and a right end 63b side of the main body portion 63 to the front part 18ca of the left wall portion 18c and the right wall portion 18d. Specifically, the attachment portions 64L and 64R on the left end 63a side and on the right end 63b side are respectively formed to extend rearward from the main body portion 63. The attachment portions 64L and 64R are respectively coupled to the front part 18ca and the right wall portion 18d by being coupled to a main body portion 88 of a left panel 87 and the right panel 90 by suture parts 112L and 112R which are formed across substantially the entire region in the forward-and-rearward direction.

In a case of the embodiment, length dimensions of the main body portion 59 of the lateral belt-like body 58 which configures the left and right tether 57 and the main body portion 63 of the longitudinal belt-like body 62 are configured to be substantially identical to each other. In addition, a length dimension L3 (the sum of length dimensions of each of the belt-like base fabric 61L, 61R, 65L, and 65R in a state of having developed to be flat with reference to FIG. 10) of the main body portions 59 and 63 is set to be smaller than a width dimension L4 (refer to FIG. 14) on the leftward-and-rightward direction side at a part on the front end side in a state where the upper panel 85 and the lower panel 86 which configure the main body inflation portion 17, are developed to be flat. Specifically, the length dimension L3 of the main body portion 59 of the lateral belt-like body 58 and the main body portion 63 of the longitudinal belt-like body 62 is set to be a dimension by which interference with the monitor 3 is suppressed when the inflation of the airbag 15 is completed and by which the detour recessed portion 27 that is capable of detouring the monitor 3 can be formed. In addition, the left and right tether 57 regulates the separation distance between the front part 18ca of the left wall portion 18c and the right wall portion 18d when the inflation of the airbag 15 is completed, and suppresses the protrusion toward the left side of the front part 18ca of the left wall portion 18c. By the regulation by the left and right tether 57, the detour recessed portion 27 is formed in the airbag 15 when the inflation is completed. In a case of the embodiment, the left and right tether 57 includes: the lateral belt-like body 58 disposed along the forward-and-rearward direction; and the longitudinal belt-like body 62 disposed along the upward-and-downward direction. Therefore, it is possible to suppress the protrusion toward the left side of the region that widens in the forward-and-rearward direction and in the upward-and-downward direction of the front part 18ca of the left wall portion 18c by the left and right tether 57, and to stably maintain a state where the detour recessed portion 27 is recessed. Specifically, in the embodiment, the attachment portion 60L on the left end 59a side of the lateral belt-like body 58 is disposed to extend forward from the angle portion 27c of the detour recessed portion 27. In addition, the attachment portion 64L on the left end 63a side of the longitudinal belt-like body 62 is disposed to extend downward to be substantially along the angle portion 27c of the detour recessed portion 27 on the rear edge 59c side (the area around the angle portion 27c of the detour recessed portion 27) of the lateral belt-like body 58 (refer to FIG. 3). In other words, in the airbag 15 of the embodiment, the attachment portion 60L on the left end 59a side of the lateral belt-like body 58 and the attachment portion 64L on the left end 63a side of the longitudinal belt-like body 62 are disposed in a substantially reversed L shape to intersect with each other at the part on the rear edge 59c side of the lateral belt-like body 58. Therefore, as the area around the intersection part is pulled in a shape of a face, the detour recessed portion 27 is recessed to be provided with the angle portion 27c in the vicinity of the intersection part.

Figure 9:
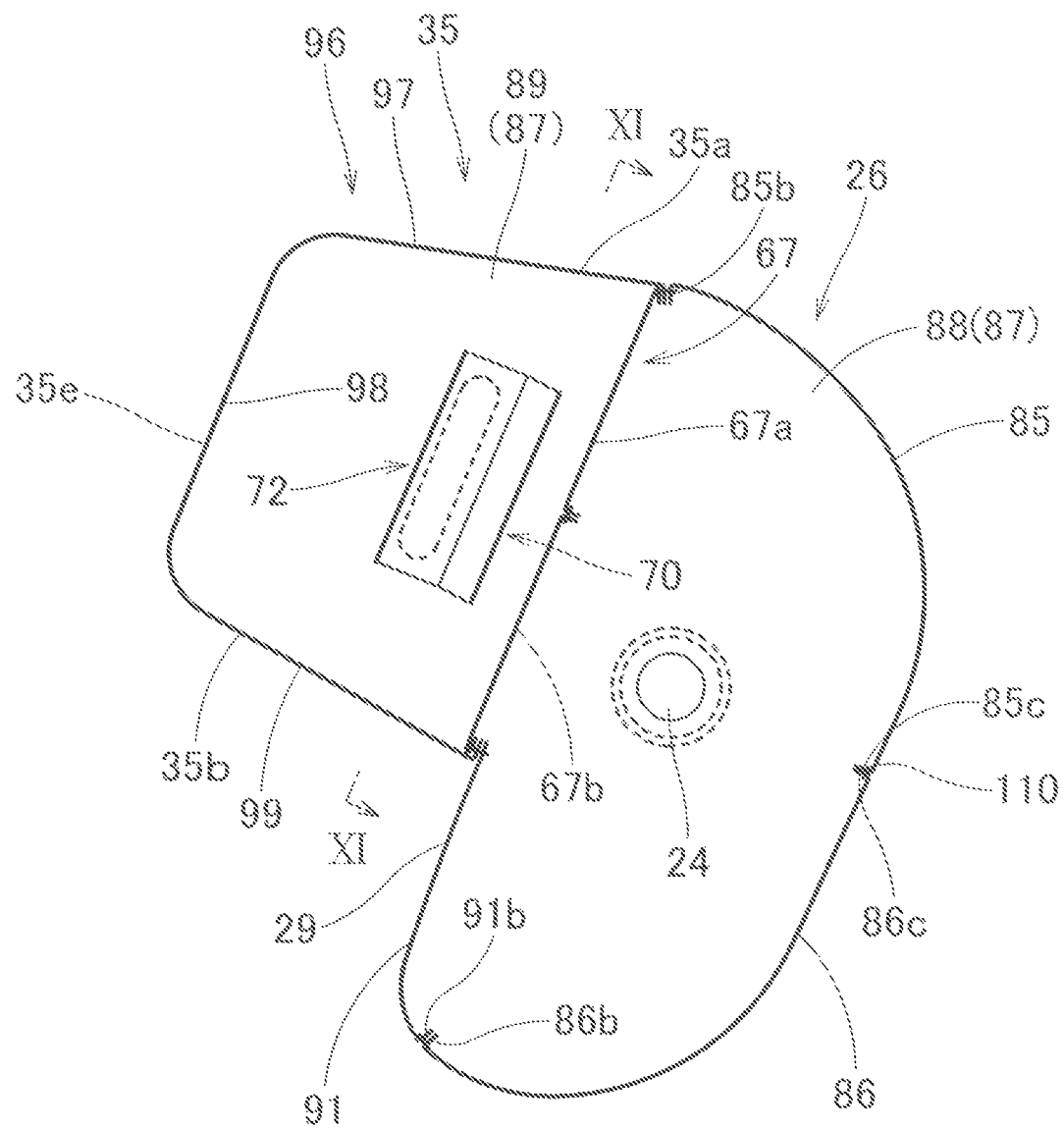
FIG. 9 is a schematic longitudinal sectional view of the airbag of FIG. 3, and is a sectional view at a part of a protrusion inflation portion.

The regulating tether 67 which is disposed at the part of the communication portion 36 of the protrusion inflation portion 35 is disposed to be substantially along the upward-and-downward direction at a position that becomes substantially the center in the leftward-and-rightward direction of the communication portion 36 (refer to FIGS. 9 to 12). Specifically, the regulating tether 67 is disposed to link front edge vicinity parts of the upper wall portion 35a and the lower wall portion 35b in the protrusion inflation portion 35, and an outer shape thereof is a shape of a substantial belt. In a case of the embodiment, as illustrated in FIGS. 9 and 11, the regulating tether 67 is configured by coupling two pieces of tethering base fabric 67a and 67b to each other which are installed on the upward-and-downward direction side. The regulating tether 67 is disposed for regulating the shape of the protrusion inflation portion 35 which has been inflated by regulating the separation distance between the upper wall portion 35a and the lower wall portion 35b in the vicinity of a boundary part (of the area around the communication portion 36) with the main body inflation portion 17 in the protrusion inflation portion 35.

In a case of the embodiment, as illustrated in FIGS. 10 and 12, the regulating tether 68 which is disposed in the region of the main body inflation portion 17 and pulls the restriction recessed portion 43 is installed to extend obliquely leftward and forward from the restriction recessed portion 43 in the region of the main body inflation portion 17. The regulating tether 68 links the tip end side (front end 43a side) of the recess of the restriction recessed portion 43 and the rear face 27b side (intermediate part 18cb in the left wall portion 18c) of the detour recessed portion 27 in the main body inflation portion 17, to each other. In addition, the regulating tether 68 is disposed to be substantially along the moving direction D of the head MH of the occupant MP who moves obliquely forward to extend and be linked from the restriction recessed portion 43 when the inflation of the airbag 15 is completed (refer to FIG. 16). In a case of the embodiment, the regulating tether 68 is formed to extend from the position that becomes the area around the right end of the intermediate part 18cb which is in the vicinity of the left end 59a of the lateral belt-like body 58 that configures the left and right tether 57. In addition, specifically, in the embodiment, as described above, the regulating tether 68 and the restriction recessed portion 43 are disposed to be inclined with respect to the forward-and-rearward direction while the inclination angle θ (refer to FIG. 12) with respect to the forward-and-rearward direction (center line CL along the forward-and-rearward direction passing through the attachment center C) is approximately 20° (approximately 15° to 25°). In the embodiment, the regulating tether 68 is configured of one piece of belt-like tethering base fabric 69 (refer to FIG. 14). In addition, as illustrated in FIGS. 3, 4, 7, 10, and 12, the regulating tether 68 is disposed by allowing a rear end 68b linked to the front end (tip end) 43a side of the restriction recessed portion 43 to be substantially along the upward-and-downward direction and by allowing a front end 68a linked to the intermediate part 18cb of the left wall portion 18c to be substantially along the leftward-and-rightward direction, when the inflation of the airbag 15 is completed, by returning the tethering base fabric 69 at the intermediate part. In a case of the embodiment, the front end 68a of the regulating tether 68 is linked to the intermediate part 18cb of the left wall portion 18c while the left front edges 85c and 86c are sewed together during the suture work of the left front edges 85c and 86c of the upper panel 85 and the lower panel 86, at a position (specifically, left side) that becomes the area around the left end 59a of the lateral belt-like body 58 in the left and right tether 57, when manufacturing the airbag 15 (refer to FIGS. 10 and 12).

Two left and right tethers 70 and 72 which are disposed in the protrusion inflation portion 35 are installed in parallel on the forward-and-rearward direction side. As illustrated in FIGS. 10 and 12, each of the left and right tethers 70 and 72 is disposed to be substantially along the leftward-and-rightward direction so as to link the right wall portion 35d and the left wall portion 35c to each other in the protrusion inflation portion 35. In a case of the embodiment, as illustrated in FIGS. 10 and 12, the left and right tether 70 disposed on the front side links a right end 70b to the position on the front end side of the right wall portion 35d of the protrusion inflation portion 35, that is, the vicinity of the opening portion 44 of the restriction recessed portion 43, and links a left end 70a side to the position that is slightly forward than the center in the forward-and-rearward direction in the left wall portion 35c of the protrusion inflation portion 35. The left and right tether 70 is disposed to be inclined with respect to the leftward-and-rightward direction to allow the left end 70a side to be oriented rearward when the inflation of the airbag 15 is completed (refer to FIGS. 10 and 12). The left and right tether 70 on the front side is disposed in the vicinity of the rear side of the regulating tether 67. The left and right tether 72 disposed on the rear side links a right end 72b side to the position that becomes substantially the center in the forward-and-rearward direction in the right wall portion 35d at a position that becomes the rear side of the right end 70b of the left and right tether 70 in the right wall portion 35d of the protrusion inflation portion 35, and links a left end 72a side to the vicinity of the boundary part between the support inflation portion 26 and the protrusion inflation portion 35 together with the left end 70a of the left and right tether 70. The left and right tether 72 is disposed to be slightly inclined with respect to the leftward-and-rightward direction so as to position the right end 72b side on the rear side when the inflation of the airbag 15 is completed (refer to FIGS. 10 and 12). In a case of the embodiment, the left and right tether 70 is configured by coupling two pieces of tethering base fabric 71L and 71R which are installed in parallel on the leftward-and-rightward direction side. The left and right tether 72 is configured by coupling two pieces of tethering base fabric 73L and 73R which are installed in parallel on the leftward-and-rightward direction side. The left and right tethers 70 and 72 are disposed such that the width direction is substantially along the upward-and-downward direction, and in a state of being deviated in the forward-and-rearward direction, the right ends 70b and 72b are respectively linked to the right wall portion 35d of the protrusion inflation portion 35. Therefore, it is possible to regulate approximately a front half of the region in the right wall portion 35d when the inflation of the airbag 15 is completed by the left and right tethers 70 and 72 (refer to FIG. 13) in a wide range in the forward-and-rearward direction and in the upward-and-downward direction, and to dispose the right wall portion 35d which configures the oblique collision restriction face 42 to be substantially along the forward-and-rearward direction when the inflation of the airbag 15 is completed.

Figure 15:
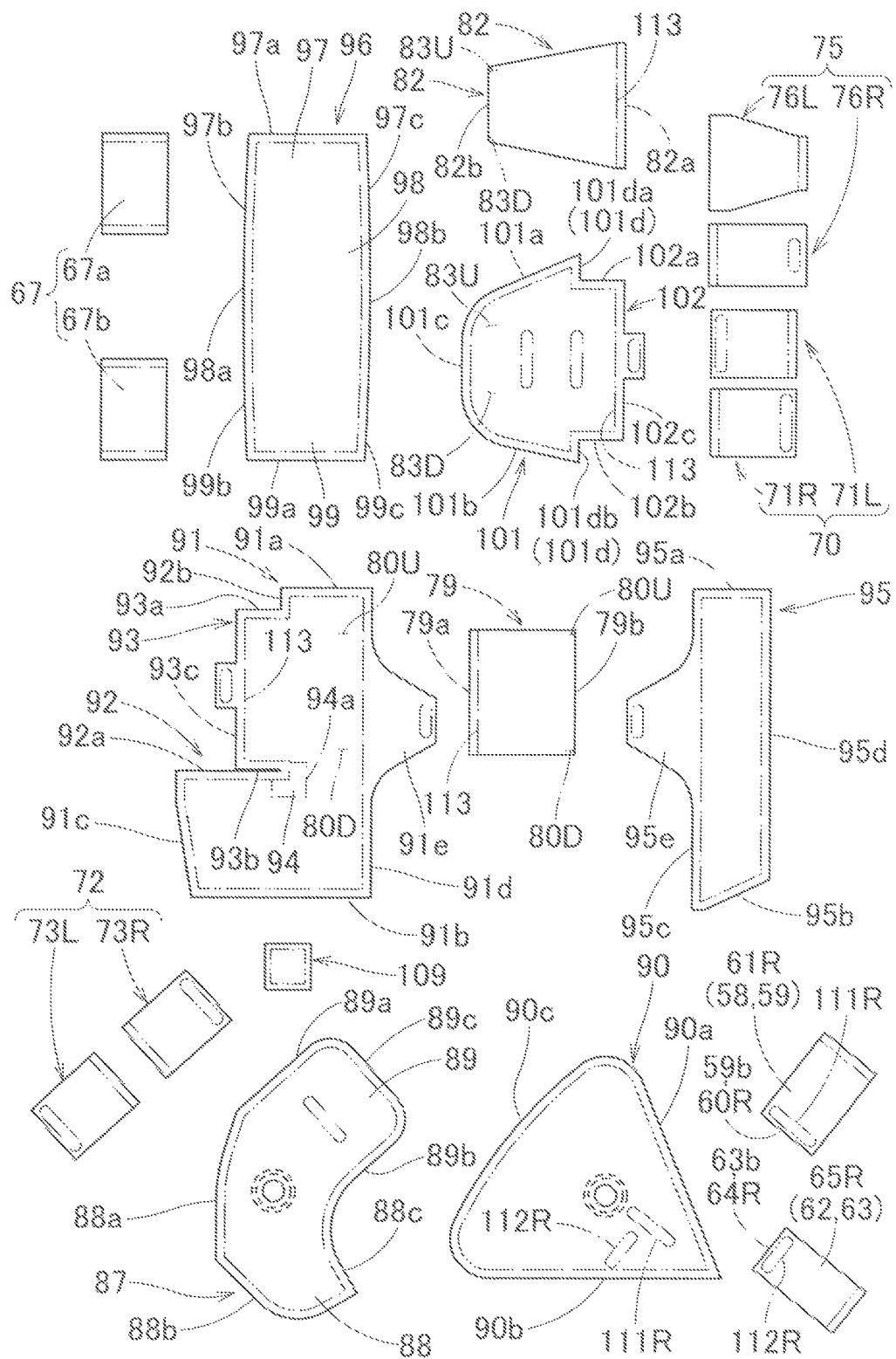
FIG. 15 is a plan view illustrating the remaining base fabric which configures the airbag of the embodiment.

In a case of the embodiment, as illustrated in FIGS. 10 and 12, the regulating tether 75 which is disposed in the region of the main body inflation portion 17 and pulls the rear end 43b side of the restriction recessed portion 43 is disposed to regulate the separation distance between the right edge 44a side of the opening portion 44 of the restriction recessed portion 43 and the front and rear tether 50. Specifically, the regulating tether 75 regulates the separation distance between the rear edge 46d of the right wall 46 and the front end 52a side of the rear part 52 by linking a left end 75a to the rear edge 46d side in the right wall 46 of the restriction recessed portion 43, and by linking the right end 75b to the front end 52a side of the rear part 52 in the front and rear tether 50. The length dimension of the regulating tether 75 is set to be the length dimension by which the right edge 44a side of the opening portion 44 of the restriction recessed portion 43 (boundary part between the right wall 46 and the frontal collision restriction face 41) is pulled rightward and forward, and by which the restriction recessed portion 43 can be disposed to be open when the inflation of the airbag 15 is completed. In a case of the embodiment, as illustrated in FIGS. 10, 12, and 15, the regulating tether 75 couples two pieces of tethering base fabric 76L and 76R which are installed in parallel on the leftward-and-rightward direction side.

The slip member 79 which serves as a slip portion and the outer slip member 82 which serves as the outer slip portion are disposed on the surface (outer surface) side of the bag main body 16. And, the slip member 79 and the outer slip member 82 have excellent sliding properties than those of the surface (outer surface) of the bag main body 16. In a case of the embodiment, each of the slip member 79 and the outer slip member 82 is separated from the bag main body 16. Each of the slip member 79 and the outer slip member 82 is configured of a sheet body of which a friction resistance of the surface is set to be smaller than that of a base material that configures the bag main body 16 (airbag 15).

As illustrated in FIGS. 10 and 12 when the inflation of the airbag 15 (bag main body 16) is completed, the slip member 79 is installed in the region from the surface side of the region on the left side that becomes the restriction recessed portion 43 side on the frontal collision restriction face 41 (left part 41a) to the surface side of the inner wall portion (right wall 46) that becomes the frontal collision restriction face 41 side in the restriction recessed portion 43. Specifically, the slip member 79 is configured to cover the region from the surface of the right wall 46 of the restriction recessed portion 43 to the surface of the left part 41*a* which is a region of an approximately left half of the frontal collision restriction face 41, in a state where a front end 79*a* side is linked to the tip end side (front end 43*a* side) of the recess of the restriction recessed portion 43, while the outer shape of the slip member 79 is a substantially rectangular shape of which the longitudinal direction is along the forward-and-rearward direction side (refer to FIG. 15). A rear end 79*b* side of the slip member 79 is temporarily coupled to the frontal collision restriction face 41 (the rear wall portion 29 in the main body inflation portion 17) by temporary coupling means 80U and 80D. In a case of the embodiment, when the inflation of the airbag 15 is completed, the rear end 79*b* of the slip member 79 is disposed at a position that is further on a slightly left side than the center in the leftward-and-rightward direction in the rear wall portion 29 (refer to FIGS. 10 and 12). In a case of the embodiment, the temporary coupling means 80U and 80D are configured by respectively partially sewing the upper edge side and the lower edge side on the rear end 79*b* side of the slip member 79 by using a suture thread T with respect to the rear wall portion 29. Specifically, the temporary coupling means 80U and 80D are respectively formed in a linear shape substantially along the horizontal direction (leftward-and-rightward direction in the bag main body 16 when the inflation is completed) to be substantially along the deviated moving direction of the head MH of the occupant MP, on the upper edge side and on the lower edge side on the rear end 79*b* side of the slip member 79 (refer to FIGS. 11 and 13). In addition, as the suture thread T which configures the temporary coupling means 80U and 80D, a thread of which a strength is set to be smaller than that of the suture thread used in sewing the circumferential edge of the base fabric that configures the bag main body 16, is used. In addition, the temporary coupling means 80U and 80D are set such that the length dimension or the strength of the suture thread T used in sewing work is a length dimension or a strength by which it is possible to release the coupled state with the frontal collision restriction face 41 (rear wall portion 29), by damaging or removing the suture thread T when the head MH of the occupant MP presses the slip member 79 to be deviated and moved to the restriction recessed portion 43 side with respect to the frontal collision restriction face 41 (rear wall portion 29) while the head MH of the occupant MP who moves to the restriction recessed portion 43 side is brought into contact with the surface of the slip member 79.

As illustrated in FIGS. 10 and 12, the outer slip member 82 is installed in a region from the surface side of the oblique collision restriction face 42 to the surface side of the outer wall portion (left wall 45) that becomes the oblique collision restriction face 42 side in the restriction recessed portion 43, in the bag main body 16 (airbag 15) when the inflation is completed. Specifically, the outer slip member 82 is configured to cover the region from the surface of the left wall 45 of the restriction recessed portion 43 to the surface in the vicinity of the rear end of the oblique collision restriction face 42 in a state where a front end 82*a* side is linked to the tip end side (front end 43*a*) of the recess of the restriction recessed portion 43. The outer shape of the outer slip member 82 is a substantially trapezoidal shape in which the longitudinal direction is allowed to be along the forward-and-rearward direction side and the width becomes narrow by approaching a rear end 82*b* side (refer to FIG. 15). The rear end 82*b* side of the outer slip member 82 is temporarily coupled to the oblique collision restriction face 42 (right wall portion 35*d* of the protrusion inflation portion 35) by outer temporary coupling means 83U and 83D. In a case of the embodiment, when the inflation of the airbag 15 is completed, the rear end 82*b* of the outer slip member 82 is disposed at a position further on a slightly front side than the rear edge in the right wall portion 35*d* of the protrusion inflation portion 35. In a case of the embodiment, the outer temporary coupling means 83U and 83D are configured by respectively sewing the upper edge side and the lower edge side on the rear end 82*b* side of the outer slip member 82 by partially using the suture thread with respect to the right wall portion 35*d*. Specifically, similar to the temporary coupling means 80U and 80D of the slip member 79, the outer temporary coupling means 83U and 83D are formed in a linear shape substantially along the horizontal direction (forward-and-rearward direction in the bag main body 16 when the inflation is completed) to be substantially along the deviated moving direction of the head MH of the occupant MP, on the upper edge side and on the lower edge side on the rear end 82*b* side of the outer slip member 82 (refer to FIGS. 7 and 13). In addition, as the suture thread T which configures the outer temporary coupling means 83U and 83D, a thread of which a strength is set to be smaller than that of the suture thread used in sewing the circumferential edge of the base fabric that configures the bag main body 16, is used. In addition, the outer temporary coupling means 83U and 83D are also set such that the length dimension or the strength of the suture thread T used in sewing work is a length dimension or a strength by which it is possible to release the coupled state with the oblique collision restriction face 42 (the right wall portion 35*d* of the protrusion inflation portion 35), by damaging or removing the suture thread T when the head MH of the occupant MP presses on the outer slip member 82 to be deviated and moved to the restriction recessed portion 43 side with respect to the oblique collision restriction face 42 (the right wall portion 35*d* of the protrusion inflation portion 35) while the head MH of the occupant MP who moves toward the restriction recessed portion 43 side is brought into contact with the surface of the outer slip member 82.

In the embodiment, the slip member 79 and the outer slip member 82 are configured by substantially matching the width dimensions on the upward-and-downward direction side at the parts on the front end 79*a* and front end 82*a* sides to each other. In addition, the width dimensions on the forward-and-rearward direction sides of the slip member 79 and the outer slip member 82 are respectively set to be dimensions by which the slip member 79 and the outer slip member 82 are disposed in a state of not being loosened along the frontal collision restriction face 41 or the oblique collision restriction face 42 when the inflation of the airbag 15 is completed (refer to FIGS. 4, 7, 11, and 13). Specifically, in a case of the embodiment, a width dimension L5 (refer to FIG. 7) on the upward-and-downward direction side at a part on the front ends 79*a* and 82*a* sides of the slip member 79 and the outer slip member 82 is respectively set to be approximately ¾ of the length dimension L1 on the upward-and-downward direction side of the restriction recessed portion 43. In addition, the slip member 79 and the outer slip member 82 are configured by sewing the front ends 79*a* and 82*a* together when forming the restriction recessed portion 43, that is, during the suture work (when forming a suture part 113) of a front edge 102*c* of a recessed portion part 102 of a protrusion portion right panel 101 that configures the left wall 45 and a front edge 103*c* of a recessed portion part 93 of the left rear panel 91 that configures the right wall 46, in manufacturing the bag main body 16, and by being linked to the tip end side (front end 43*a* side) of the recess of the restriction recessed portion 43 (refer to FIGS. 10 and 12). In addition, similar to the base fabric that configures the bag main body 16, the slip member 79 and the outer slip member 82 are configured of non-coated fabric having flexibility which is formed by weaving polyester or polyamide yarn. Specifically, the slip member 79 and the outer slip member 82 have a small friction resistance of the surface and excellent sliding properties compared to those of the base fabric that configures the bag main body 16 by using woven fabric formed by weaving yarn having a lower fineness than that of the base fabric that configures the bag main body 16.

Since the bag main body 16 is configured in a bag shape as circumferential edges of the base fabric having a predetermined shape are coupled to each other, in a case of the embodiment, as illustrated in FIGS. 14 and 15, the bag main body 16 is configured of eight types of base fabric including an upper panel 85 disposed on the upper side when the inflation is completed, a lower panel 86 disposed on the lower side when the inflation is completed, a left panel 87 disposed on the left side when the inflation is completed, a right panel 90 disposed on the right side when the inflation is completed, a left rear panel 91 and a right rear panel 95 disposed on the rear side when the inflation is completed, a protrusion portion main panel 96 which configures the part from the upper side of the protrusion inflation portion 35 to the lower side via the rear side, and a protrusion portion right panel 101 which configures the part on the right side of the protrusion inflation portion 35; two reinforcing fabrics 105 and 106 which reinforce the part of the attachment portion 20 in the bag main body 16; one reinforcing fabric 107 which reinforces the circumferential edge of the gas inflow port 21; one protection fabric 108 which protects the circumferential edge part of the gas inflow port 21; and a reinforcing patch 109 which reinforces the area around the boundary portion between the protrusion inflation portion 35 and the main body inflation portion 17.

The upper panel 85 configures the part of the upper wall portion 18*a* and a region on the upper side from the front part 18*ca* to the intermediate part 18*cb* in the left wall portion 18*c* in the main body inflation portion 17 when the inflation is completed. The lower panel 86 configures the part of the lower wall portion 18*b* and the region on the lower side from the front part 18*ca* to the intermediate part 18*cb* in the left wall portion 18*c* in the main body inflation portion 17 when the inflation is completed. In other words, in the airbag 15 of the embodiment, the front part 18*ca* of the left wall portion 18*c* which configures the right surface 27*a* of the detour recessed portion 27 and the intermediate part 18*cb* which configures the rear surface 27*b* are configured of the left front sides of the upper panel 85 and the lower panel 86. In addition, in the airbag 15 of the embodiment, on the right surface 27*a* and on the rear surface 27*b* of the detour recessed portion 27, the suture part 110 which is formed by sewing the left front edges 85*c* and 86*c* of the upper panel 85 and the lower panel 86 by using the suture thread is configured to be installed to be substantially along the forward-and-rearward direction at the position that becomes substantially the center in the upward-and-downward direction (refer to FIGS. 3 and 5). In addition, in the airbag 15 of the embodiment, when forming the suture part 110 (when performing the suture work of the left front edges 85*c* and 86*c* of the upper panel 85 and the lower panel 86), the front end 68*a* of the regulating tether 68 and the left end 59*a* of the lateral belt-like body 58 in the left and right tether 57 are sewed together.

The left panel 87 configures the part from the rear part 18*cc* (left surface of the support inflation portion 26) of the left wall portion 18*c* of the main body inflation portion 17 to the left wall portion 35*c* of the protrusion inflation portion 35. As illustrated in FIG. 15, the left panel 87 links a protrusion portion 89 having a substantially rectangular shape that configures the left wall portion 35*c* of the protrusion inflation portion 35 to the upper rear end side of the main body portion 88 having a flat rectangular shape that configures the rear part 18*cc*. Since the right panel 90 configures the part of the right wall portion 18*d* in the main body inflation portion 17 when the inflation is completed, the outer shape is a substantially triangular shape.

The left rear panel 91 and the right rear panel 95 are configured to divide the part of the rear wall portion 29 in the main body inflation portion 17 when the inflation is completed in the leftward-and-rightward direction. In a case of the embodiment, the left rear panel 91 configures the region on the left side from the center line CL along the forward-and-rearward direction passing through the attachment center C in the rear wall portion 29. The right rear panel 95 configures the region on the right side from the center line CL in the rear wall portion 29. The left rear panel 91 has a shape from which the region on the upper left side is notched to allow the protrusion inflation portion 35 to communicate therewith, and installs the recessed portion part 93 which configures the right wall 46 of the restriction recessed portion 43 in a region of a notched recessed portion 92 (refer to FIG. 15). The outer shape of the recessed portion part 93 is a substantially rectangular shape in which the longitudinal direction is along the upward-and-downward direction. The recessed portion part 93 is formed to protrude leftward from a right edge 92*b* in the notched recessed portion 92, in the left rear panel 91 in a state of having developed to be flat. Specifically, the width dimension on the upward-and-downward direction side of the recessed portion part 93 is set to be slightly smaller than the width dimension (length dimension of the right edge 92*b*) on the upward-and-downward direction side of the notched recessed portion 92, and the center in the upward-and-downward direction of the recessed portion part 93 is positioned below the center of the notched recessed portion 92 in the upward-and-downward direction. A lower edge 93*b* of the recessed portion part 93 is in the vicinity of a lower edge 92*a* of the notched recessed portion 92. In addition, on the inner circumferential edge (the right edge 91*d* and the left edge 95*c*) of the left rear panel 91 and the right rear panel 95, the extending portions 91*e* and 95*e* which configure the rear part 52 of the front and rear tether 50 are respectively formed.

The protrusion portion main panel 96 includes an upper wall part 97 which configures the part of the upper wall portion 35*a*; a rear wall part 98 which configures the part of the rear wall portion 35*e*; and a lower wall part 99 which configures the part of the lower wall portion 35*b*, in the protrusion inflation portion 35 when the inflation of the airbag 15 is completed. As illustrated in FIG. 15, the protrusion portion main panel 96 has a shape of a substantial belt in which the upper wall part 97, the rear wall part 98, and the lower wall part 99 are aligned in series.

Since the protrusion portion right panel 101 configures the part of the right wall portion 35*d* in the protrusion inflation portion 35 when the inflation is completed, the outer shape of the protrusion portion right panel 101 is a substantially trapezoidal shape of which the width slightly becomes narrow by approaching a rear edge 101c side. In addition, in the protrusion portion right panel 101, the recessed portion part 102 which configures the left wall 45 of the restriction recessed portion 43 is installed on a front edge 101d side. The outer shape of the recessed portion part 102 is a substantially rectangular shape, and the recessed portion part 102 is formed to protrude from the front edge 101d of the protrusion portion right panel 101. The outer shape of the recessed portion part 102 is substantially the same as that of the recessed portion part 93 formed in the left rear panel 91 (refer to FIG. 15). Specifically, the recessed portion part 102 is configured such that the width dimension on the upward-and-downward direction side is set to be slightly smaller than the width dimension on the upward-and-downward direction side of the front edge 101d of the protrusion portion right panel 101, and the center in the upward-and-downward direction is substantially identical to the center in the upward-and-downward direction of the protrusion portion right panel 101. In other words, the front edge 101d of the protrusion portion right panel 101 is configured to include an upper part 101da and a lower part 101db which respectively extend to the upper side and the lower side of the recessed portion part 102. In the embodiment, the upper part 101da is coupled to the right edge 92b of the notched recessed portion 92 in the left rear panel 91, and the lower part 101db is coupled to a corner circumferential portion 94 that becomes a circumferential edge of a corner portion of the notched recessed portion 92 in the left rear panel 91. As illustrated in FIGS. 7, 13, and 15, the corner circumferential portion 94 is reinforced by the reinforcing patch 109 which is a separated body having a substantially square shape. The reinforcing patch 109 is installed for reinforcing the area around the boundary part between the main body inflation portion 17 (support inflation portion 26) and the protrusion inflation portion 35, and specifically, the area around the part at which the area around the corner portion on the right lower front end side of the protrusion inflation portion 35 is coupled to the main body inflation portion 17 (support inflation portion 26). In addition, in the airbag 15, the area (a part in the vicinity of the edge regions 35f and 35g in the protrusion inflation portion 35) around the coupling part by coupling the upper part 101da and the lower part 101db of the protrusion portion right panel 101 to the left rear panel 91 forms the linking portions 47U and 47D which link the frontal collision restriction face 41 and the oblique collision restriction face 42 to each other on the upper edge 43c side and on the lower edge 43d side of the restriction recessed portion 43 (refer to FIGS. 11 and 13). Specifically, the linking portion 47D is formed to enter the region (a suture part 94a obtained by the corner circumferential portion 94 and the reinforcing patch 109) that abuts against the reinforcing patch 109.

The reinforcing fabric 105 and 106 which reinforce the attachment portion 20 of the bag main body 16 are respectively disposed one by one while the outer shape is a substantially trapezoidal shape which corresponds to the regions on the front edge sides of each of the upper panel 85 and the lower panel 86 (refer to FIG. 14). The outer shape of the reinforcing fabric 107 which reinforces the circumferential edge part of the gas inflow port 21 is a substantially circular shape. The protection fabric 108 is configured to be capable of protecting the suture part from the inflation gas by covering the inner circumferential surface side of the suture part (specifically, a suture part (reference numeral omitted) obtained by sewing front edges 85a and 86a of the upper panel 85 and the lower panel 86 to each other) which is disposed at the circumferential edge of the gas inflow port 21 while the outer shape is a substantially rectangular shape.

In the embodiment, the upper panel 85, the lower panel 86, the left panel 87, the right panel 90, the left rear panel 91, the right rear panel 95, the protrusion portion main panel 96, the protrusion portion right panel 101, the reinforcing fabric 105, 106, and 107, the protection fabric 108, and the reinforcing patch 109 which configure the bag main body 16, the front part material 53 which configures the front part 51 of the front and rear tether 50, the tethering base fabric 54a, 54b, 55a, and 55b which configure the upper and lower tethers 54 and 55, the belt-like base fabric 61L, 61R which configure the ateral belt-like body 58 of the left and right tether 57, the belt-like base fabric 65L, 65R which configure the longitudinal belt-like body 62 of the left and right tether 57, tethering base fabric 67a and 67b which configure the regulating tether 67, the tethering base fabric 69 which configures the regulating tether 68, the tethering base fabric 71L, 71R, 73L, and 73R which configure the left and right tethers 70 and 72, and the tethering base fabric 76L and 76R which configure the regulating tether 75, are respectively formed of non-coated fabric having flexibility formed by weaving polyester or polyamide yarn. In addition, in the airbag 15 of the embodiment, as described above, the slip member 79 and the outer slip member 82 are formed of the non-coated fabric formed by weaving the yarn having a lower fineness than that of the non-coated fabric that configures the bag main body 16.

In addition, as illustrated in FIGS. 3 to 10, the bag main body 16 of the embodiment has a shape of a bag by sewing (coupling) the corresponding edge portions of the upper panel 85, the lower panel 86, the left panel 87, the right panel 90, the left rear panel 91, the right rear panel 95, the protrusion portion main panel 96, and the protrusion portion right panel 101 to each other by using the suture thread. Specifically, the front edge 85a, the left front edge 85c, and the right front edge 85e of the upper panel 85 are coupled to the front edge 86a, the left front edge 86c, and a right front edge 86e of the lower panel 86. A rear edge 85b of the upper panel 85 is coupled to a front edge 97a of the upper wall part 97 in the protrusion portion main panel 96, and upper edges 91a and 95a of the left rear panel 91 and the right rear panel 95. A left rear edge 85d of the upper panel 85 is coupled to an upper edge 88a of the main body portion 88 in the left panel 87. A right rear edge 85f of the upper panel 85 is coupled to an upper edge 90a of the right panel 90. A rear edge 86b of the lower panel 86 is coupled to lower edges 91b and 95b of the left rear panel 91 and the right rear panel 95. A left rear edge 86d of the lower panel 86 is coupled to a lower edge 88b of the main body portion 88 in the left panel 87. A right rear edge 86f of the lower panel 86 is coupled to a lower edge 90b of the right panel 90. A rear edge 88c of the main body portion 88 in the left panel 87 is coupled to a left edge 91c of the left rear panel 91. An upper edge 89a of the protrusion portion 89 in the left panel 87 is coupled to a left edge 97b of the upper wall part 97 in the protrusion portion main panel 96. A rear edge 89c of the protrusion portion 89 is coupled to a left edge 98a of the rear wall part 98. A lower edge 89b of the protrusion portion 89 is coupled to a left edge 99b of the lower wall part 99. A rear edge 90c of the right panel 90 is coupled to a right edge 95d of the right rear panel 95. The right edge (inner circumferential edge) 91d of the left rear panel 91 is coupled to the left edge (inner circumferential edge) 95c of the right rear panel 95. The lower edge 92a of the notched recessed portion 92 in the left rear panel 91 is coupled to a front edge 99a of the lower wall part 99 of the protrusion portion main panel 96. The right edge 92b of the notched recessed portion 92 in the left rear panel 91 is coupled to the upper part 101da in the front edge 101d of the protrusion portion right panel 101. An upper edge 93a, the lower edge 93b, and a front edge 93c of the recessed portion part 93 in the left rear panel 91 are respectively coupled to an upper edge 102a, a lower edge 102b, and the front edge 102c of the recessed portion part 102 in the protrusion portion right panel 101. In addition, the front ends 79a and 82a sides of the slip member 79 and the outer slip member 82 are sewed to each other when coupling the front edges 93c and 102c of the recessed portion parts 93 and 102 to each other (when forming the suture part 113). A right edge 97c of the upper wall part 97, a right edge 98b of the rear wall part 98, and a right edge 99c of the lower wall part 99 in the protrusion portion main panel 96 are respectively coupled to an upper edge 101a, the rear edge 101c, and a lower edge 101b of the protrusion portion right panel 101. As described above, the lower part 101db of the front edge 101d in the protrusion portion right panel 101 is coupled to the corner circumferential portion 94 that becomes the circumferential edge of the corner portion of the notched recessed portion 92, in the left rear panel 91.

In addition, after manufacturing the bag main body 16, after disposing the slip member 79 to cover the left part 41a of the frontal collision restriction face 41, by using the suture thread T, the rear end 79b side is sewed to the frontal collision restriction face 41 to form the temporary coupling means 80U and 80D. After disposing the outer slip member 82 to cover the oblique collision restriction face 42, by using the suture thread T, the rear end 82b side is sewed to the oblique collision restriction face 42 to form the outer temporary coupling means 83U and 83D. As a result, it is possible to manufacture the airbag 15.

Figure 18:
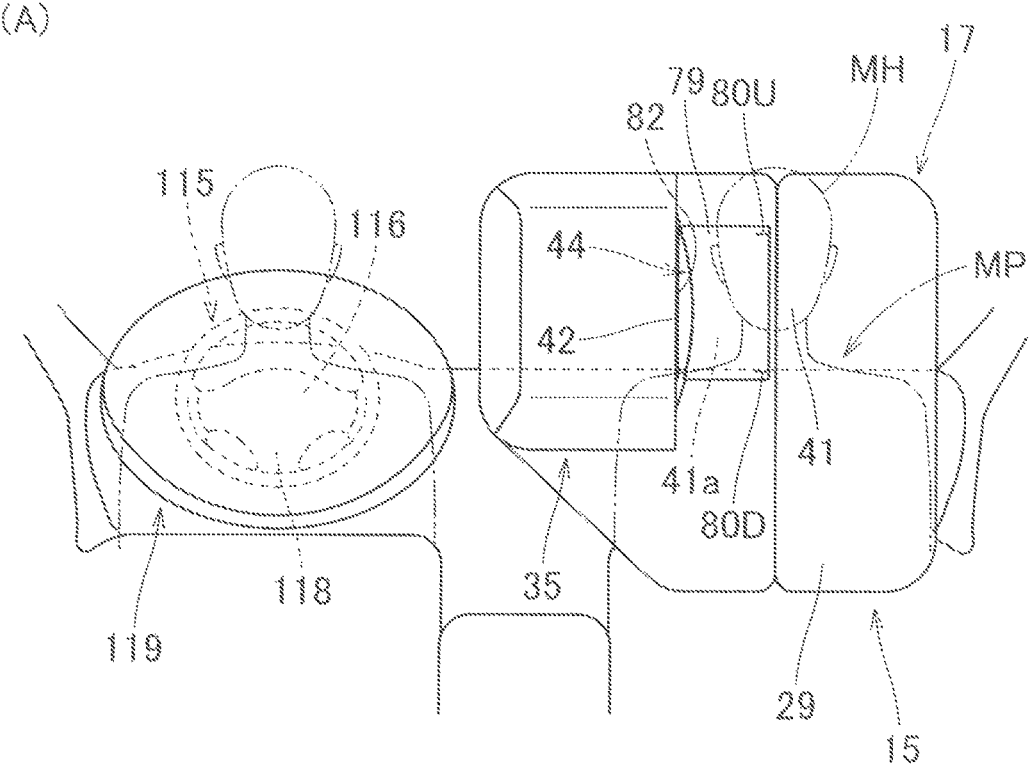
FIG. 18 is a schematic front view illustrating a state where the airbag has been inflated, and illustrates a state before receiving the occupant and when receiving the occupant, in the airbag device for a passenger seat of the embodiment.
Figure 18:
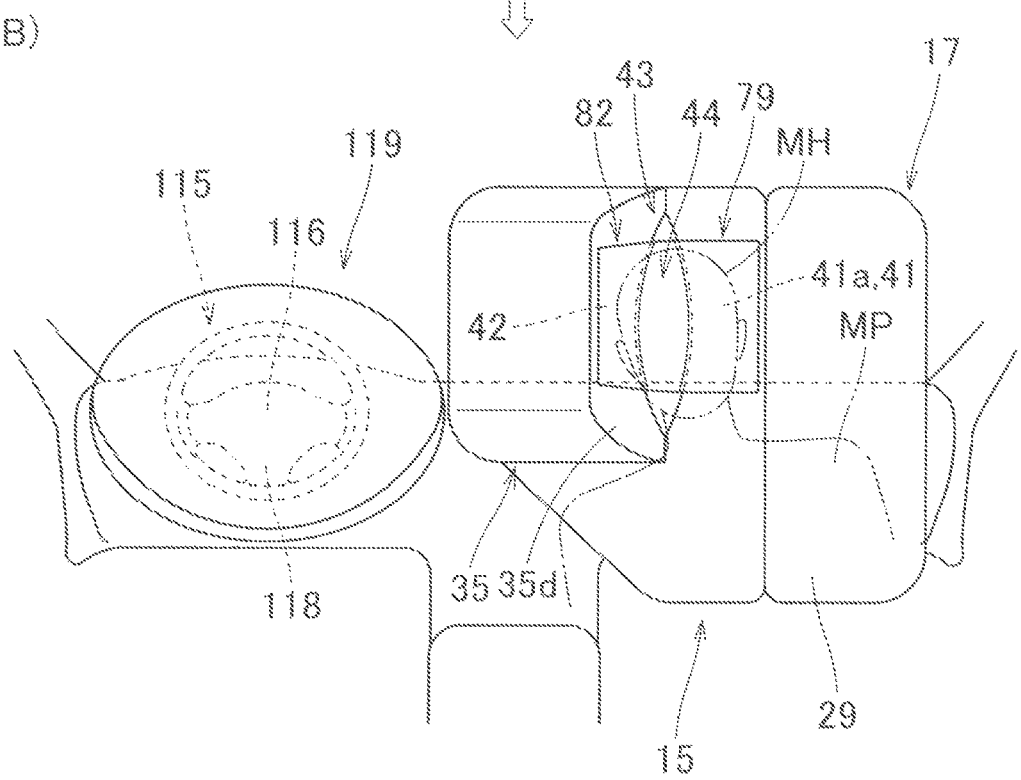

In the steering wheel 115 disposed in front of the driver seat DS on the left side of the passenger seat PS, an airbag device 118 for a steering wheel is loaded. The airbag device 118 for a steering wheel includes: the airbag 119 for a steering wheel (hereinafter, referred to as "airbag") which is folded and stored in a boss portion 116 at the center of the steering wheel 115; and an inflator which is not illustrated and supplies the inflation gas to the airbag 119. The airbag 119 is configured to have a shape of a bag formed of a sheet body having flexibility, to allow the inflation gas from the inflator to flow to the inside when performing an operation of the inflator which is not illustrated, and to inflate to cover the upper face (rear face) of the steering wheel 115 across the entire surface (refer to the two-dot chain line in FIG. 2, and FIG. 18). In addition, similar to the inflator 8 of the airbag device M for a passenger seat, the inflator which is not illustrated of the airbag device 118 for a steering wheel is configured to operate when the frontal collision, the oblique collision, and the offset collision of the vehicle V occur.

Next, loading of the airbag device M for a passenger seat of the embodiment in the vehicle V will be described. First, the airbag 15 is folded to be storable in the case 12 in a state where the retainer 9 is stored on the inside thereof. The periphery of the folded airbag 15 is wrapped by a tearable wrapping sheet, which is not illustrated, not to be bent and broken. Next, the folded airbag 15 is placed in the bottom wall portion 12a of the case 12. The main body portion 8a of the inflator 8 is inserted into the case 12 from below the bottom wall portion 12a, and each of the bolts 9a which protrude downward from the bottom wall portion 12a is inserted into the flange portion 8c of the inflator 8. After this, when the nut 10 is fastened to each of the bolts 9a which protrudes from the flange portion 8c of the inflator 8, the folded airbag 15 and the inflator 8 can be attached to the case 12.

In addition, when the circumferential wall portion 12b of the case 12 is locked to the linking wall portion 6c of the airbag cover 6 in the instrument panel 1 in the vehicle V, and a bracket which is not illustrated in the case 12 is fixed to the body side of the vehicle V, it is possible to load the airbag device M for a passenger seat in the vehicle V.

In the airbag device M for a passenger seat of the embodiment, in a state of being loaded in the vehicle V, when the frontal collision, the oblique collision, or the offset collision of the vehicle V occurs, if the inflation gas is discharged from the gas discharge port 8b of the inflator 8, the inflation gas flows to the inside and the airbag 15 is inflated, and the door portions 6a and 6b of the airbag cover 6 are pressed and open. In addition, the airbag 15 protrudes upward from the case 12 via an opening formed by pressing and opening the door portions 6a and 6b of the airbag cover 6, is developed and inflated while protruding toward the rear side of the vehicle, and finishes the inflation to block the part between the upper surface 2 of the instrument panel 1 and the windshield 4 above the instrument panel 1 as illustrated by two-dot chain line of FIGS. 1 and 2, and FIGS. 16 and 18. In addition, at this time, the airbag 119 for a steering wheel also allows the inflation gas to flow to the inside thereof, and finishes the inflation to cover an upper surface (rear surface) of the steering wheel 115 (refer to FIG. 18).

In addition, in the airbag device M for a passenger seat of the embodiment, in the occupant protection portion 40, the restriction recessed portion 43 for allowing the head MH of the occupant MP to enter and to be restricted, is formed to be recessed forward between the frontal collision restriction face 41 and the oblique collision restriction face 42 which is formed to protrude rearward from the frontal collision restriction face 41. Therefore, when the oblique collision or the offset collision of the vehicle V occurs, the head MH of the occupant MP who moves obliquely forward is allowed to enter the inside of the restriction recessed portion 43 while being guided by the oblique collision restriction face 42 and can be restricted. In addition, in the airbag device M for a passenger seat of the embodiment, in the airbag 15 (bag main body 16) when the inflation is completed, the slip member 79 which serves as the slip portion is disposed in the region from the surface side of the region on the left side that becomes the restriction recessed portion 43 side in the frontal collision restriction face 41 to the surface side of the right wall 46 which serves as the inner wall portion that becomes the frontal collision restriction face 41 side in the restriction recessed portion 43. In addition, the slip member 79 is configured to have excellent sliding properties compared to those of other regions of the frontal collision restriction face 41, and to have sliding properties that make it possible to guide the received head MH toward the inside of the restriction recessed portion 43 when the head MH of the occupant MP who moves obliquely forward comes into contact with the frontal collision restriction face 41, when the oblique collision or the offset collision of the vehicle V occurs. Therefore, when the oblique collision or the offset collision of the vehicle V occurs, in a case where the head MH of the occupant MP who moves obliquely forward does not come into contact with the oblique collision restriction face 42, and comes into contact with the region on the restriction recessed portion 43 side in the frontal collision restriction face 41, it is possible to guide the head MH of the occupant MP to the restriction recessed portion 43 side in a state where the rotation that makes the face oriented toward the center side of the frontal collision restriction face 41 is suppressed by allowing the head MH to slide by the slip member 79. As a result, it is possible to allow the head MH to smoothly enter the inside of the restriction recessed portion 43.

In addition, in the airbag device M for a passenger seat of the embodiment, when the head MH of the occupant MP enters the inside of the restriction recessed portion 43, at least a part of the head MH of the occupant MP enters the inside of the restriction recessed portion 43 while pressing and opening the restriction recessed portion 43 in the leftward-and-rightward direction. In addition, it is possible to receive the head MH of the occupant MP from the front side to both of the left and right sides by the wide restriction face configured of the inner surfaces of the outer wall portion (left wall 45) and the inner wall portion (right wall 46) which oppose each other on both of the left and right sides of the restriction recessed portion 43. In other words, an aspect in which the outer wall portion (left wall 45) and the inner wall portion (right wall 46) of the restriction recessed portion 43 interpose the head MH of the occupant MP from both of the left and right sides is achieved, that is, the outer wall portion (left wall 45) and the inner wall portion (right wall 46) of the restriction recessed portion 43 come into contact with both of the left and right sides of the head MH. Therefore, it is possible to suppress the rotation in the leftward-and-rightward direction, to contribute to receiving the head MH, and to smoothly receive the head MH of the occupant MP when the oblique collision or the offset collision occurs by the restriction recessed portion 43.

Therefore, in the airbag device M for a passenger seat of the embodiment, it is possible to smoothly protect the occupant MP who moves obliquely forward by the airbag 15 which has been inflated.

Figure 16:
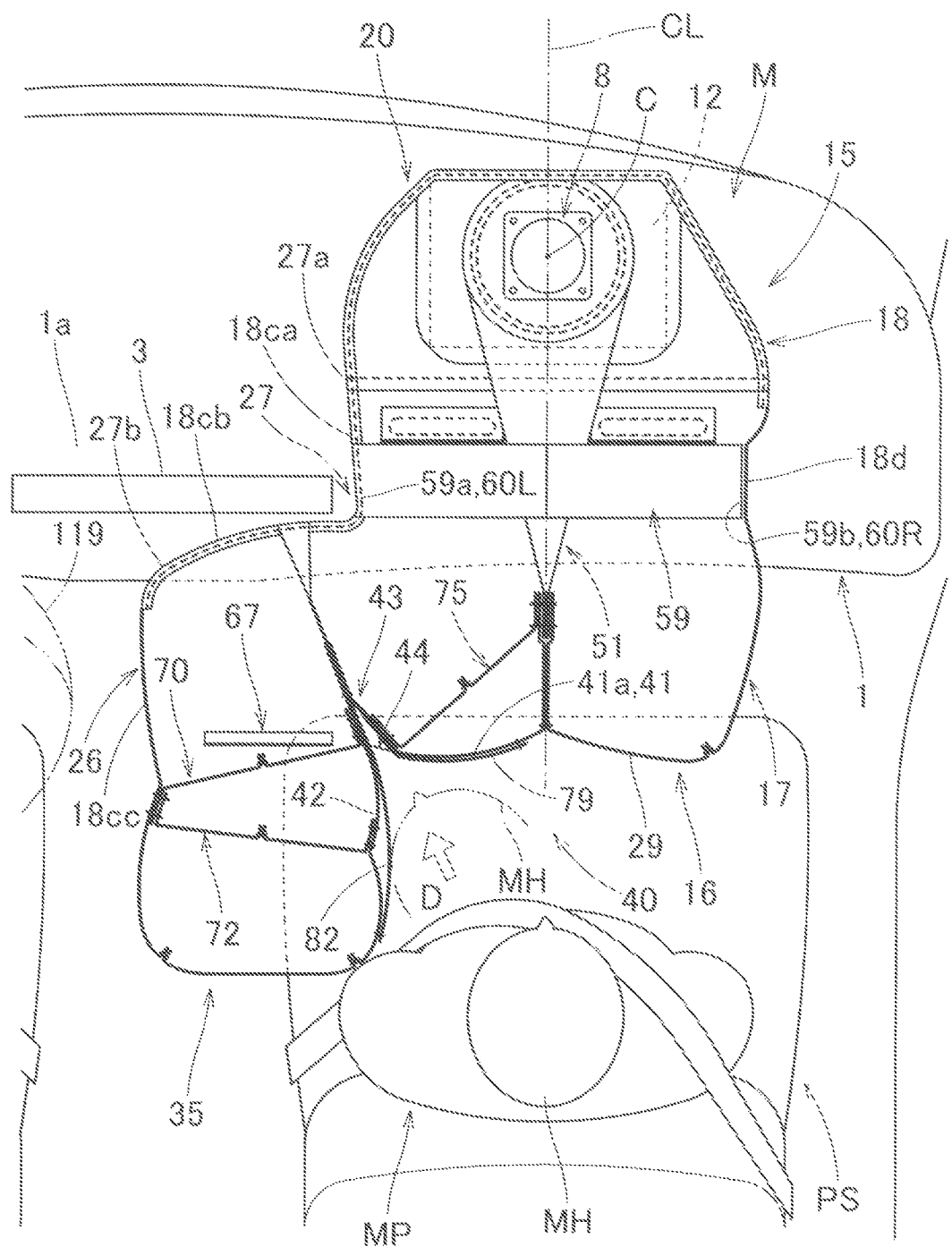
FIG. 16 is a schematic cross sectional view illustrating a state where the airbag has been inflated, in the airbag device for a passenger seat of the embodiment.
Figure 17:
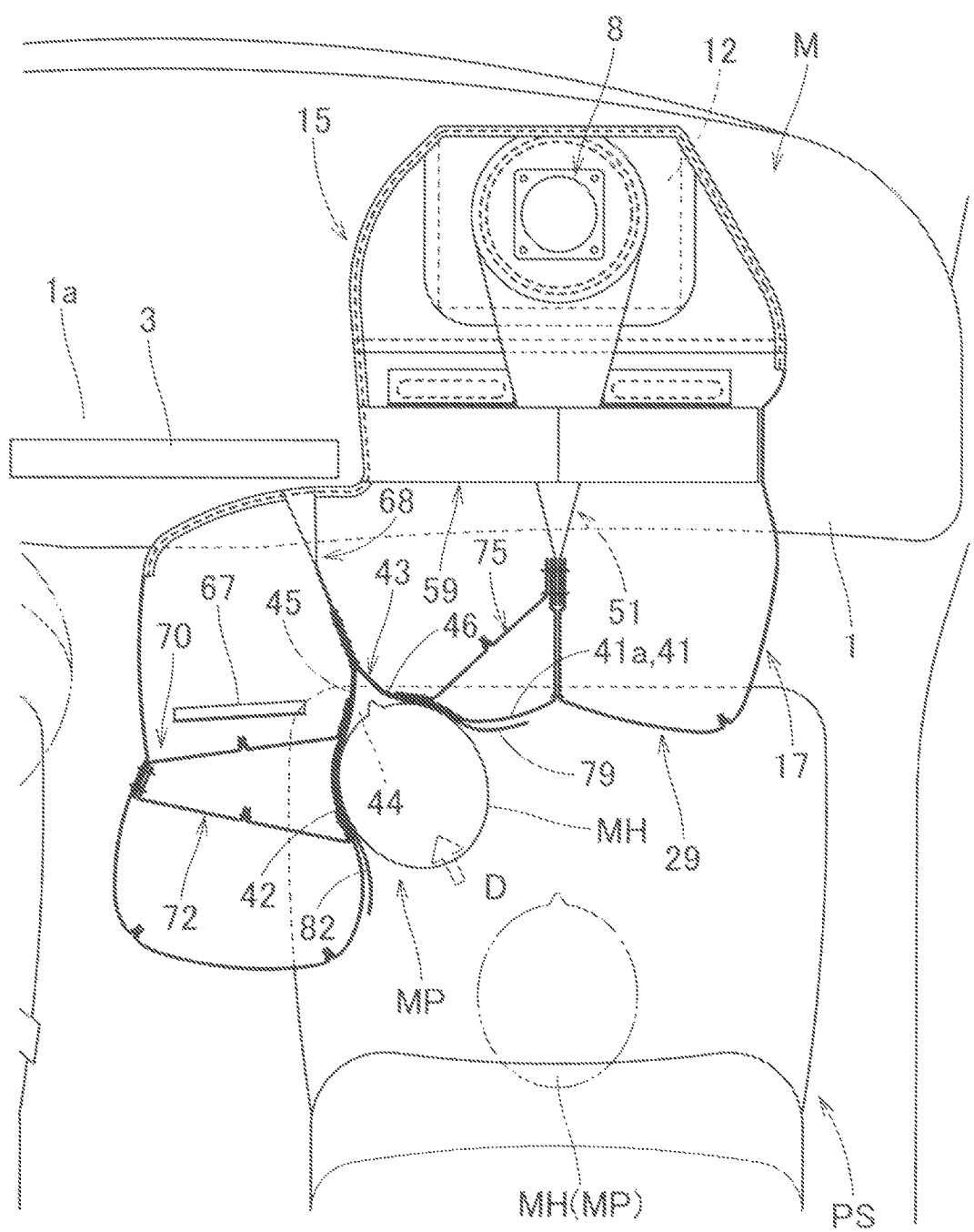
FIG. 17 is a schematic cross sectional view illustrating a state where the airbag which has been inflated receives an occupant who moves obliquely, in the airbag device for a passenger seat of the embodiment.

In particular, in the airbag device M for a passenger seat of the embodiment, the restriction recessed portion 43 is configured to be disposed to be substantially along the moving direction D of the head MH of the occupant MP who moves obliquely forward when the inflation of the airbag 15 is completed, by the regulating tether 68 (refer to FIG. 16). In addition, as illustrated in FIG. 17, the head MH of the occupant MP enters the inside of the restriction recessed portion 43 to be substantially along the direction of the recess of the restriction recessed portion 43. Therefore, large interference of the head MH of the occupant MP with any one of the left and right inner surfaces (the left wall 45 and the right wall 46) of the restriction recessed portion 43 is suppressed, and the restriction recessed portion 43 can receive the head MH of the occupant MP to be substantially equivalent on the left and right inner surfaces (the left wall 45 and the right wall 46). As a result, it is possible to suppress the rotation in the leftward-and-rightward direction by the restriction recessed portion 43, and to smoothly receive the head MH of the occupant MP.

Figure 19A:
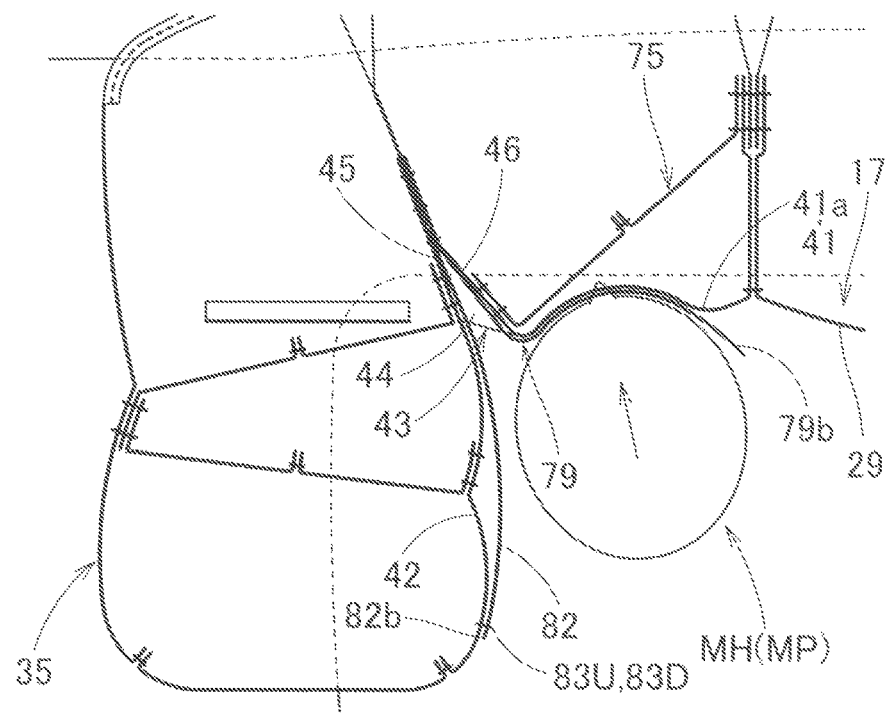
FIGS. 19A and 19B are partially enlarged schematic cross sectional views illustrating a state where the airbag which has been inflated allows the occupant to enter the inside of the restriction recessed portion and receives the occupant while bringing the occupant who moves obliquely into contact with a slip member, in the airbag device for a passenger seat of the embodiment.
Figure 19B:
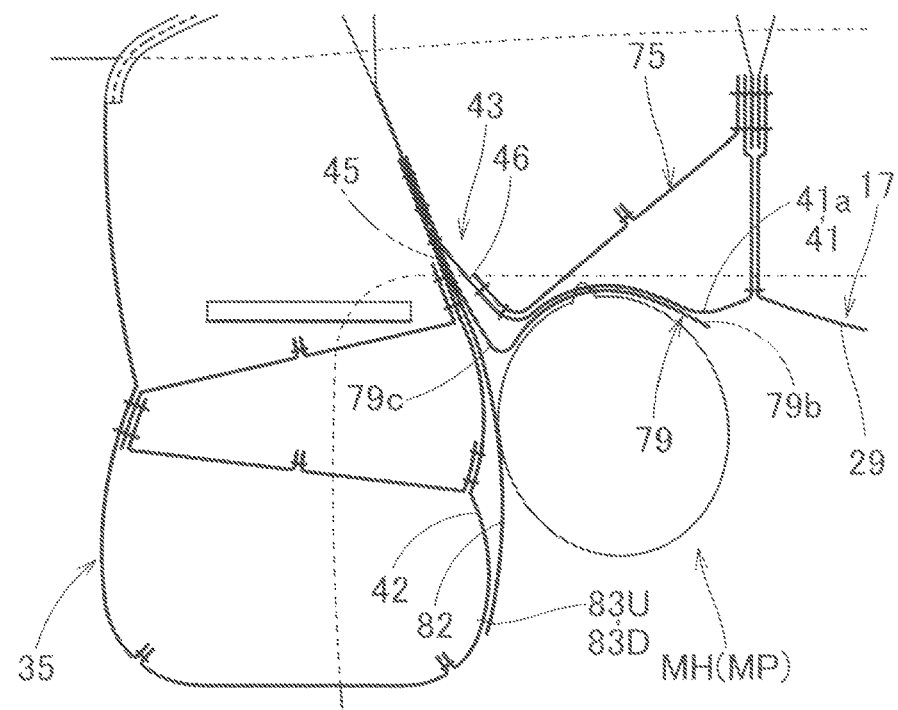
Figure 20:
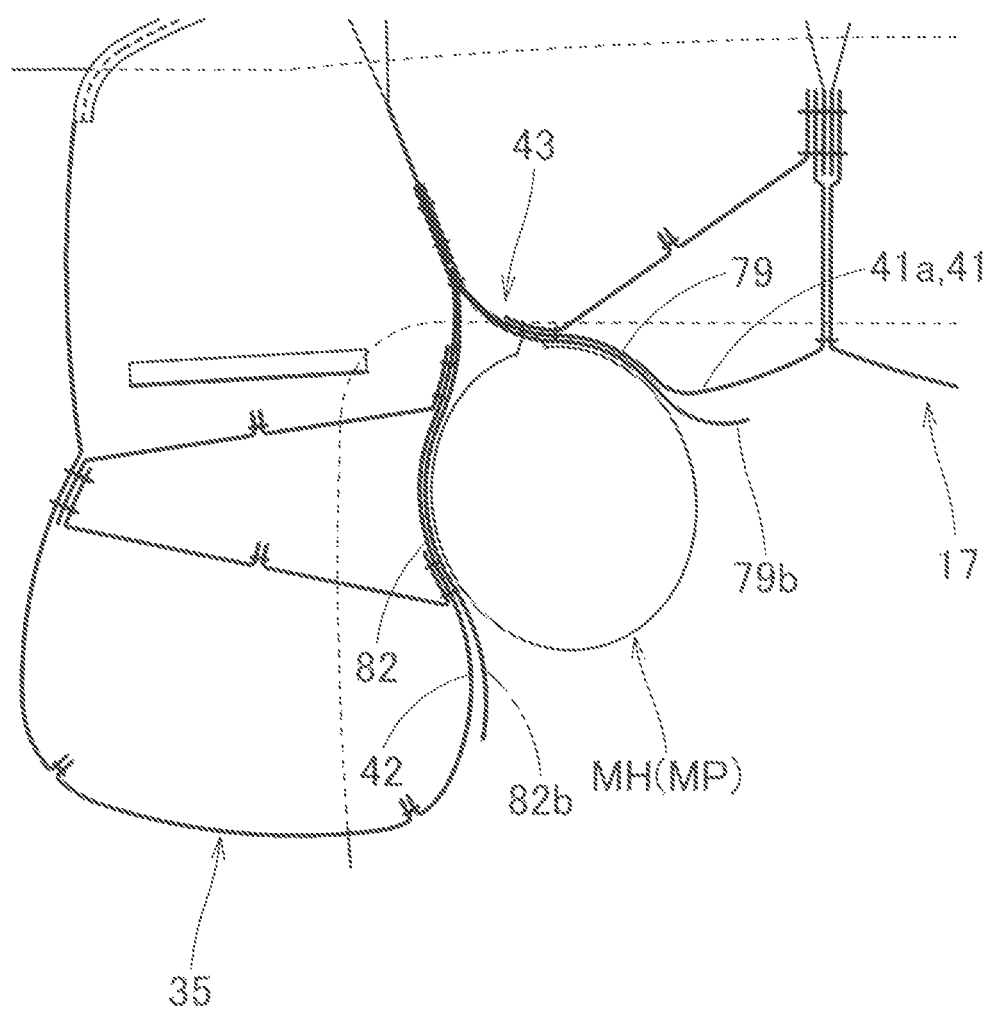
FIG. 20 is a partially enlarged schematic cross sectional view illustrating a state where the airbag which has been inflated allows the occupant to enter the inside of the restriction recessed portion and receives the occupant while bringing the occupant who moves obliquely into contact with the slip member, and is a state after FIG. 19B, in the airbag device for a passenger seat of the embodiment.

Furthermore, in the airbag device M for a passenger seat of the embodiment, the slip member 79 which serves as the slip portion is configured of a sheet body of which the friction resistance of the surface is set to be smaller than that of the base material that configures the airbag 15 (bag main body 16). In addition, the slip member 79 links the front end 79*a* side to the tip end side (front end 43*a* side) of the recess of the restriction recessed portion 43, and temporarily links the rear end 79*b* side to the frontal collision restriction face 41 by the temporary coupling means 80U and 80D. The temporary coupling means 80U and 80D are configured to be capable of releasing the coupled state with the frontal collision restriction face 41 when the head MH of the occupant MP comes into contact with the surface of the slip member 79. Therefore, in the airbag device M for a passenger seat of the embodiment, for example, in a case where the angle with respect to the forward-and-rearward direction is set to be smaller than the inclination angle of the restriction recessed portion 43 and the head MH of the occupant MP moves obliquely forward, the head MH of the occupant MP who moves obliquely forward comes into contact with a rear part 79*c* that covers the frontal collision restriction face 41 in the slip member 79, and when the contact state is achieved, the head MH which moves toward the restriction recessed portion 43 presses the rear part 79*c* obliquely forward to deviate and move the rear part 79*c* in the slip member 79 obliquely forward with respect to the frontal collision restriction face 41. In addition, by receiving the deviated movement of the rear part 79*c* which has received the head MH with respect to the frontal collision restriction face 41, the temporary coupling means 80U and 80D release the coupled state with the frontal collision restriction face 41 (refer to FIG. 19A). In other words, in the airbag device M for a passenger seat of the embodiment, when receiving the head MH of the occupant MP by the rear part 79*c* of the slip member 79, the slip member 79 releases the coupled state with the frontal collision restriction face 41 by the temporary coupling means 80U and 80D on the rear end 79*b* side, and links only the front end 79*a* side to the airbag 15 (bag main body 16). Therefore, as illustrated in FIG. 19B, it becomes possible to allow the slip member 79 itself which has received the head MH of the occupant MP to slide with respect to the frontal collision restriction face 41 in the airbag 15 (bag main body 16), and in a state where the rotation that makes the face of the head MH of the occupant MP oriented toward the center side of the frontal collision restriction face 41 is suppressed, it is possible to smoothly and largely move the slip member 79 with respect to the bag main body 16. As a result, while suppressing the rotation that makes the face oriented toward the center side of the frontal collision restriction face 41, it is possible to allow the head MH of the occupant MP who moves with a small inclination angle with respect to the forward-and-rearward direction to slide with respect to the frontal collision restriction face 41 of the airbag 15 (bag main body 16), and to guide the head MH to the inside of the restriction recessed portion 43, by the slip member 79, and in a state where a large rotation is suppressed, it is possible to receive the head portion MH by the restriction recessed portion 43 (refer to FIG. 20).

In addition, in the airbag device M for a passenger seat of the embodiment, the outer slip member 82 which serves as the outer slip portion and has excellent sliding properties compared to those of other regions of the frontal collision restriction face 41 is disposed in the region from the surface side of the oblique collision restriction face 42 in the airbag 15 (bag main body 16) when the inflation is completed to the surface side of the left wall 45 which serves as the outer wall portion that becomes the oblique collision restriction face 42 side in the restriction recessed portion 43. When the oblique collision or the offset collision of the vehicle V occurs, the outer slip member 82 is configured to have sliding properties by which the received head MH can be guided toward the inside of the restriction recessed portion 43 when the head MH of the occupant MP who moves obliquely forward comes into contact with the oblique collision restriction face 42. Therefore, in the airbag device M for a passenger seat of the embodiment, when the oblique collision or the offset collision of the vehicle V occurs, even when the head MH of the occupant MP who moves obliquely forward comes into contact with the region separated to the rear part from the restriction recessed portion 43 in the oblique collision restriction face 42, the head MH of the occupant MP is allowed to slide by the outer slip member 82, and in a state where the rotation that makes the face oriented toward the rear end side of the oblique collision restriction face 42 is suppressed, it is possible to guide the head MH to the restriction recessed portion 43 side. As a result, it is possible to allow the head MH to smoothly enter the inside of the restriction recessed portion 43.

Figure 21A:
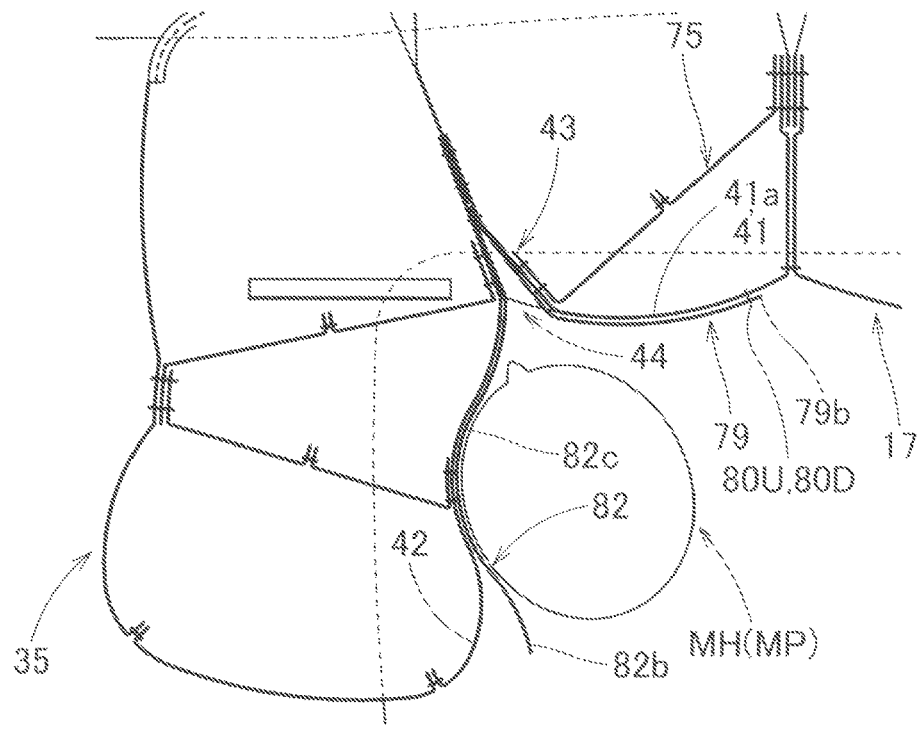
FIGS. 21A and 21B are partially enlarged schematic cross sectional views illustrating a state where the airbag which has been inflated allows the occupant to enter the inside of the restriction recessed portion and receives the occupant while bringing the occupant who moves obliquely into contact with an outer slip member, in the airbag device for a passenger seat of the embodiment.
Figure 21B:
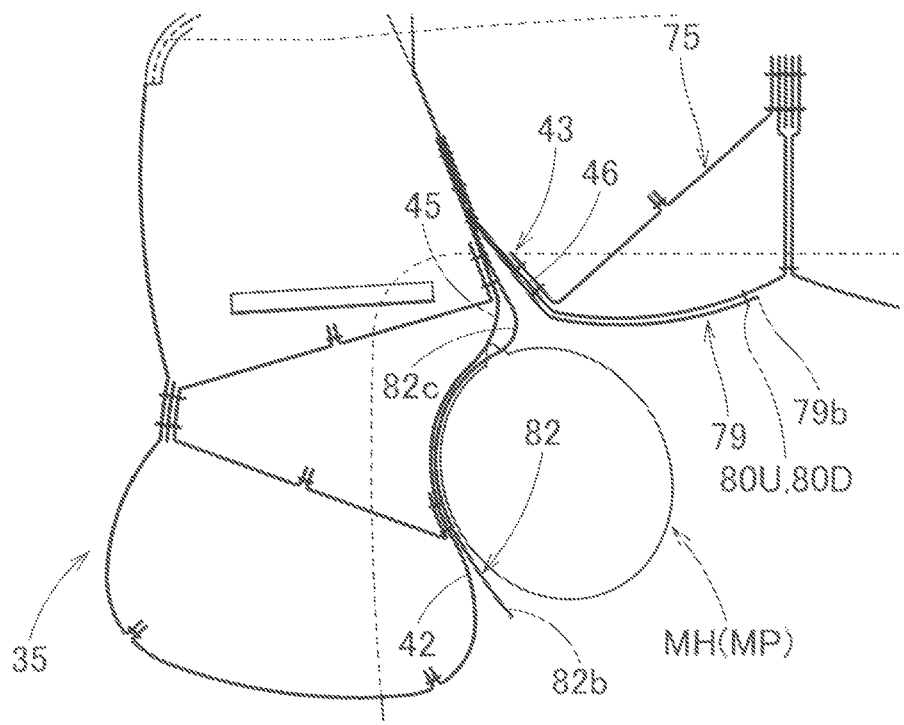
Figure 22:
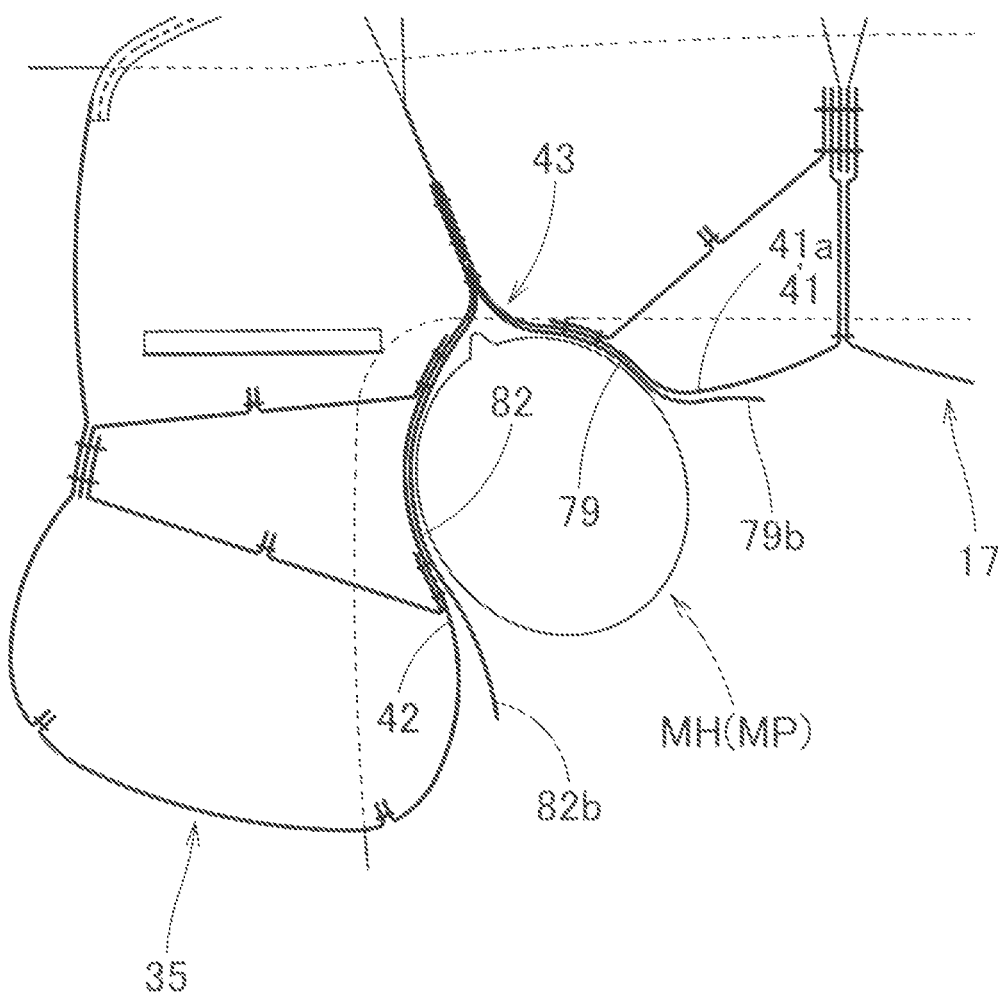
FIG. 22 is a partially enlarged schematic cross sectional view illustrating a state where the airbag which has been inflated allows the occupant to enter the inside of the restriction recessed portion and receives the occupant while bringing the occupant who moves obliquely into contact with the outer slip member, and illustrates a state after FIG. 21B, in the airbag device for a passenger seat of the embodiment.

Specifically, in the airbag device M for a passenger seat of the embodiment, similar to the slip member 79, the outer slip member 82 is configured of the sheet body of which the friction resistance of the surface is set to be smaller than that of the base material that configures the airbag 15 (bag main body 16). In addition, in the outer slip member 82, the front end 82a side is linked to the tip end side (front end 43a side) of the recess of the restriction recessed portion 43, and the rear end 82b side is temporarily coupled to the oblique collision restriction face 42 by the outer temporary coupling means 83U and 83D. The outer temporary coupling means 83U and 83D are configured to be capable of releasing the coupled state with the oblique collision restriction face 42 when the head MH of the occupant MP who moves to the restriction recessed portion 43 side comes into contact with the surface of the outer slip member 82. Therefore, in the airbag device M for a passenger seat of the embodiment, for example, in a case where the inclination angle with respect to the forward-and-rearward direction is set to be greater than the inclination angle of the restriction recessed portion 43 and the head MH of the occupant MP moves obliquely forward, the head MH of the occupant MP who moves obliquely forward comes into contact with a rear part 82c which covers the oblique collision restriction face 42 in the outer slip member 82, and when the contact state is achieved, the head MH which moves toward the restriction recessed portion 43 presses the rear part 82c in the outer slip member 82 obliquely forward to be deviated and moved obliquely forward with respect to the oblique collision restriction face 42. In addition, by receiving the deviated movement of the rear part 82c which has received the head MH with respect to the oblique collision restriction face 42, the outer temporary coupling means 83U and 83D release the coupled state with the oblique collision restriction face 42 (refer to FIG. 21A). In other words, in the airbag device M for a passenger seat of the embodiment, when receiving the head MH of the occupant MP by the rear part 82c of the outer slip member 82, the outer slip member 82 is configured to release the coupled state with the oblique collision restriction face 42 by the outer temporary coupling means 83U and 83D on the rear end 82b side, and to link only the front end 82a side to the airbag 15 (bag main body 16). Therefore, as illustrated in FIG. 21B, it becomes possible to allow the outer slip member 82 itself which has received the head MH of the occupant MP to slide with respect to the oblique collision restriction face 42 in the airbag 15 (bag main body 16), and in a state where the rotation that makes the face of the head MH of the occupant MP oriented toward the rear end side of the oblique collision restriction face 42 is suppressed, it is possible to smoothly and largely move the outer slip member 82 with respect to the bag main body 16. As a result, while suppressing the rotation that makes the head MH of the occupant MP with a large inclination angle with respect to the forward-and-rearward direction oriented toward the rear end side of the oblique collision restriction face 42, it is possible to allow the head MH to smoothly slide with respect to the oblique collision restriction face 42 of the airbag 15 (bag main body 16) and to guide the head MH to the inside of the restriction recessed portion 43, by the outer slip member 82, and in a state where a large rotation is suppressed, it is possible to receive the head MH by the restriction recessed portion 43 (refer to FIG. 22).

In other words, in the airbag device M for a passenger seat of the embodiment, the slip member 79 which covers the frontal collision restriction face 41 and the outer slip member 82 which covers the oblique collision restriction face 42 are provided. Therefore, even when the head MH of the occupant MP who moves obliquely forward is slightly shaken on the leftward-and-rightward direction side, it is possible to suppress the rotation, and to smoothly guide the head MH of the occupant MP to the inside of the restriction recessed portion 43. In addition, in the embodiment, in a state where the head MH is restricted by the restriction recessed portion 43, the coupled states of all of the temporary coupling means 80U, 80D, 83U, and 83D are released (refer to FIGS. 17, 22, and 24).

Furthermore, in the airbag device M for a passenger seat of the embodiment, the rear end 43b side of the restriction recessed portion 43 is configured to be widened and open to the frontal collision restriction face 41 side. Therefore, when the head MH of the occupant MP who moves obliquely forward comes into contact with the frontal collision restriction face 41, it is possible to allow the head MH of the occupant MP to more smoothly enter the inside of the restriction recessed portion 43.

In addition, in the airbag 15 of the embodiment, the temporary coupling means 80U and 80D for temporarily coupling the rear end 79b side of the slip member 79 to the frontal collision restriction face 41 (rear wall portion 29), and the outer temporary coupling means 83U and 83D for temporarily coupling the rear end 82b side of the outer slip member 82 to the oblique collision restriction face 42 (right wall portion 35d of the protrusion inflation portion 35), are configured by sewing the slip member 79 and the outer slip member 82 to the rear wall portion 29 and the right wall portion 35d by using the suture thread T having a small strength. However, as described in the embodiment, the temporary coupling means is not limited to the means for sewing in which the suture thread is used. For example, as the temporary coupling means, a configuration in which the linked state can be maintained until the inflation of the bag main body is completed, and rear end side of the slip member and the outer slip member are temporarily fixed to the frontal collision restriction face or the oblique collision restriction face by a tape member which can release the linked state by a damage or peeling when receiving the head of the occupant, may be employed. In addition, as the temporary coupling means, a configuration in which the rear end side of the slip member and the outer slip member adhere and are temporarily fixed to the frontal collision restriction face or the oblique collision restriction face by adhering means, such as an adhesive, which can release the adhesive state by peeling or the like when receiving the head of the occupant, may be employed.

Figure 23:
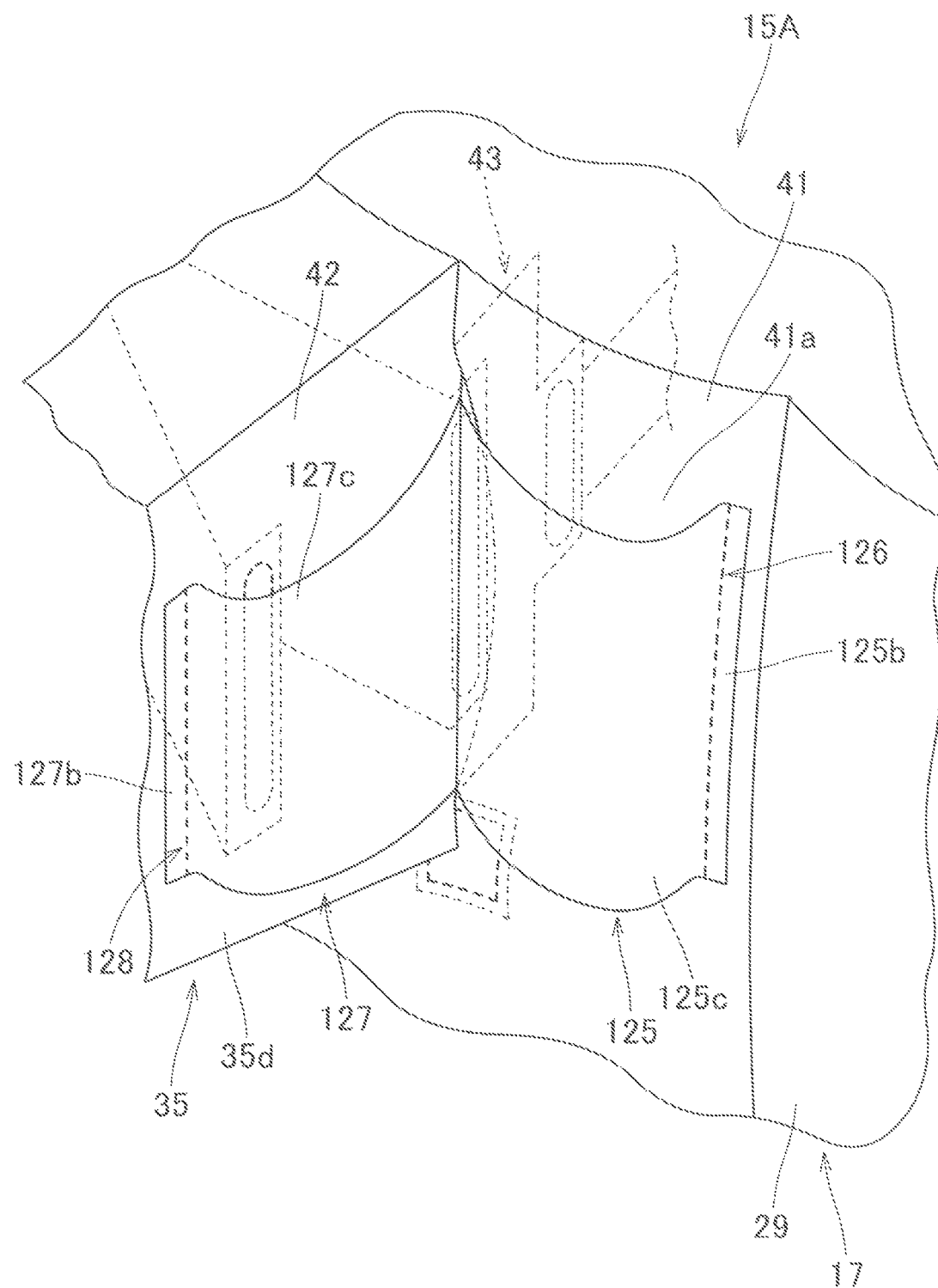
FIG. 23 is a partially enlarged perspective view illustrating a part of a restriction recessed portion, in an airbag in another embodiment of the invention.
Figure 24:
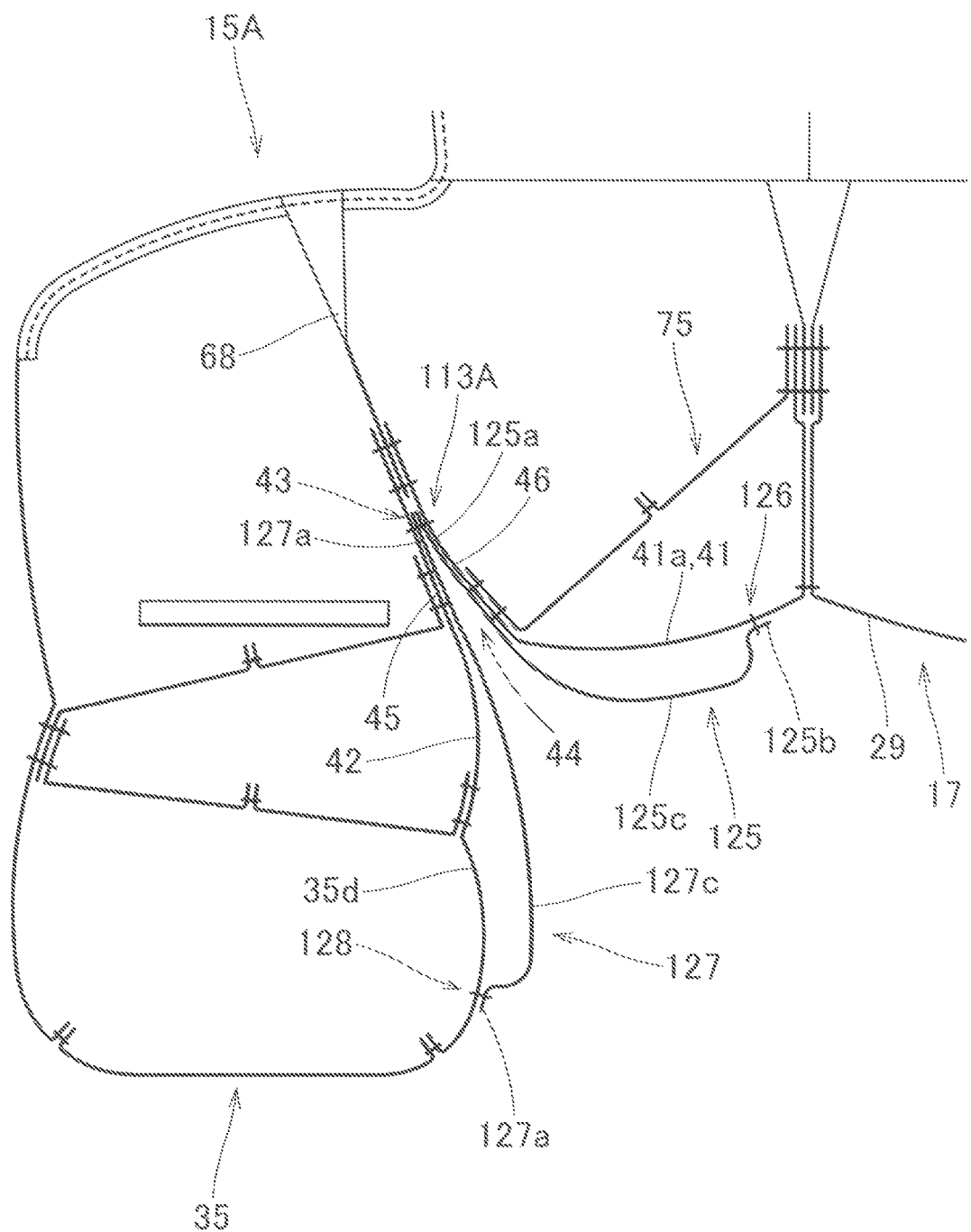
FIG. 24 is a partially enlarged schematic cross sectional view of the airbag of FIG. 23.
Figure 26:
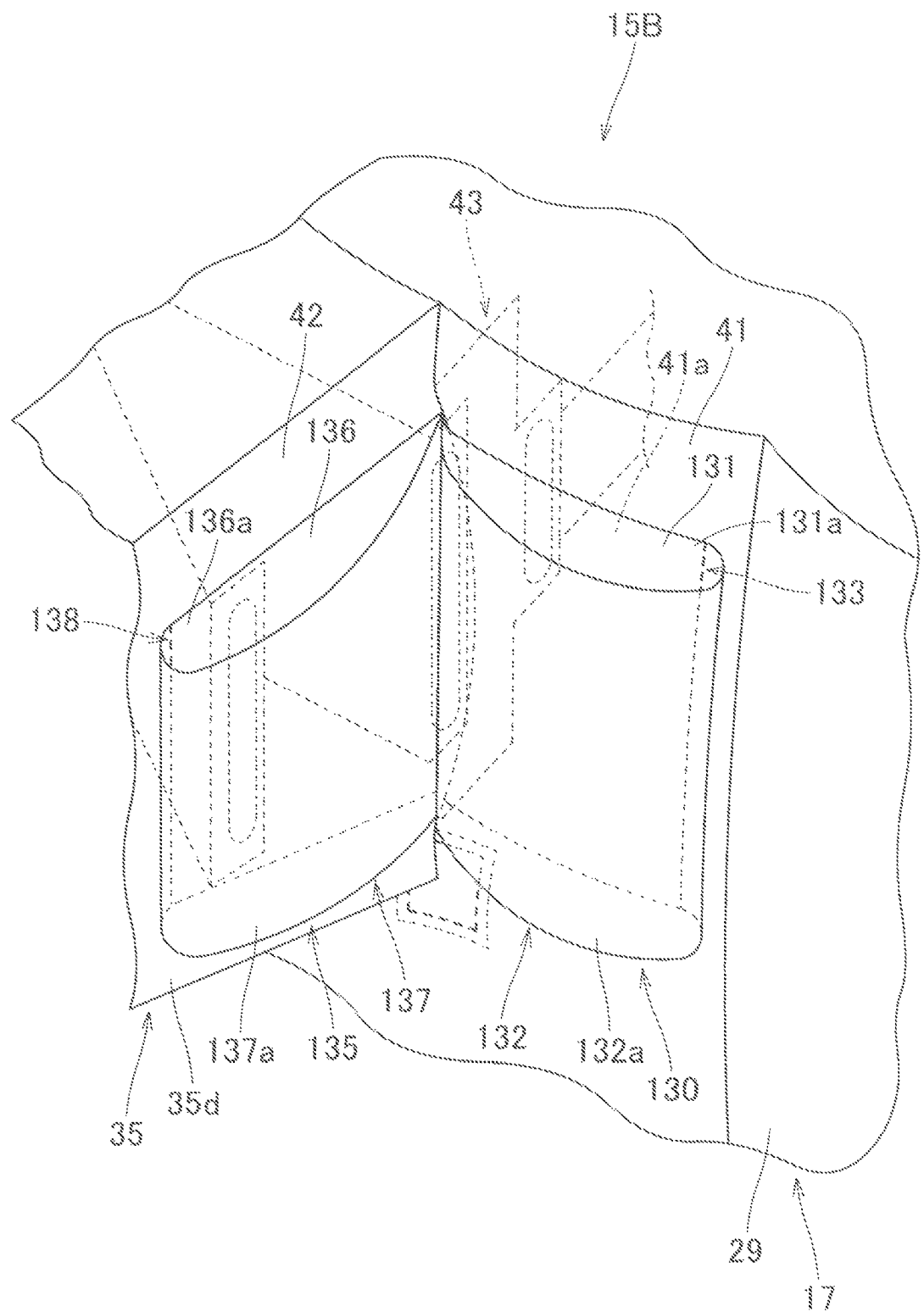
FIG. 26 is a partially enlarged perspective view illustrating a part of a restriction recessed portion, in an airbag in another embodiment of the invention.
Figure 27:
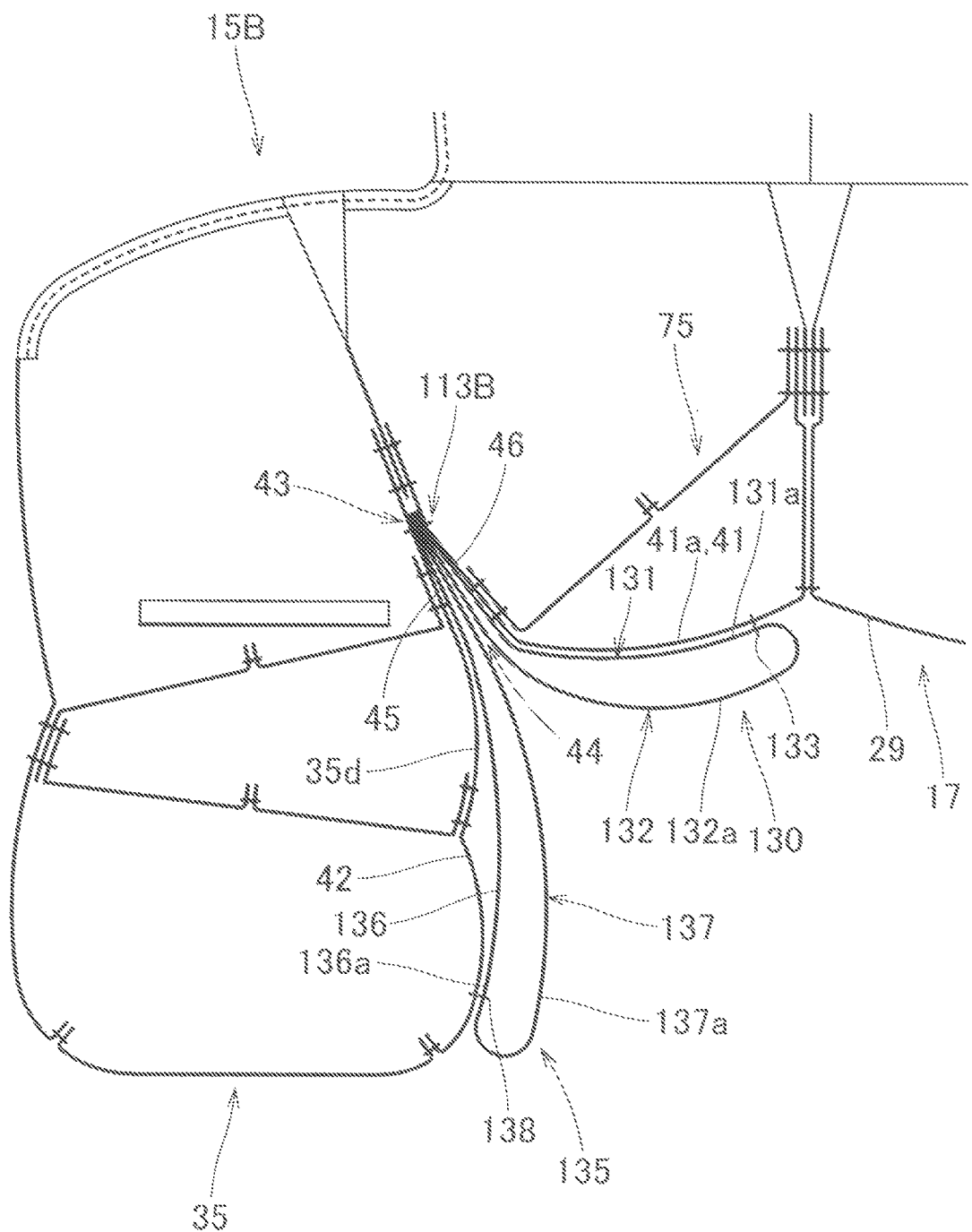
FIG. 27 is a partially enlarged schematic cross sectional view of the airbag of FIG. 26.

In addition, the shapes of the slip member 79 and the outer slip member 82 are also not limited to the above-described airbag 15, and may be configured as an airbag 15A illustrated in FIGS. 23 and 24 or an airbag 15B of FIGS. 26 and 27.

In the airbag 15A illustrated in FIGS. 23 and 24, a configuration in which only the configuration of a slip member 125 and an outer slip member 127 is different is employed, and the bag main body 16 has the same configuration as that of the bag main body 16 in the airbag 15. Therefore, with respect to the same member in the bag main body 16, the same reference numerals will be given, and the specific description thereof will be omitted. Similar to the slip member 79 and the outer slip member 82 in the above-described airbag 15, the slip member 125 and the outer slip member 127 which will be used in the airbag 15A are configured of the sheet body of which the friction resistance of the surface is set to be smaller than that of the base material that configures the bag main body 16 (airbag 15A), and have excellent sliding properties than those of the surface (outer surface) of the bag main body 16. Specifically, similar to the slip member 79 and the outer slip member 82 in the above-described airbag 15, the slip member 125 and the outer slip member 127 are formed of fabric formed by weaving the suture thread having a lower fineness than that of the base fabric that configures the bag main body 16.

Figure 25:
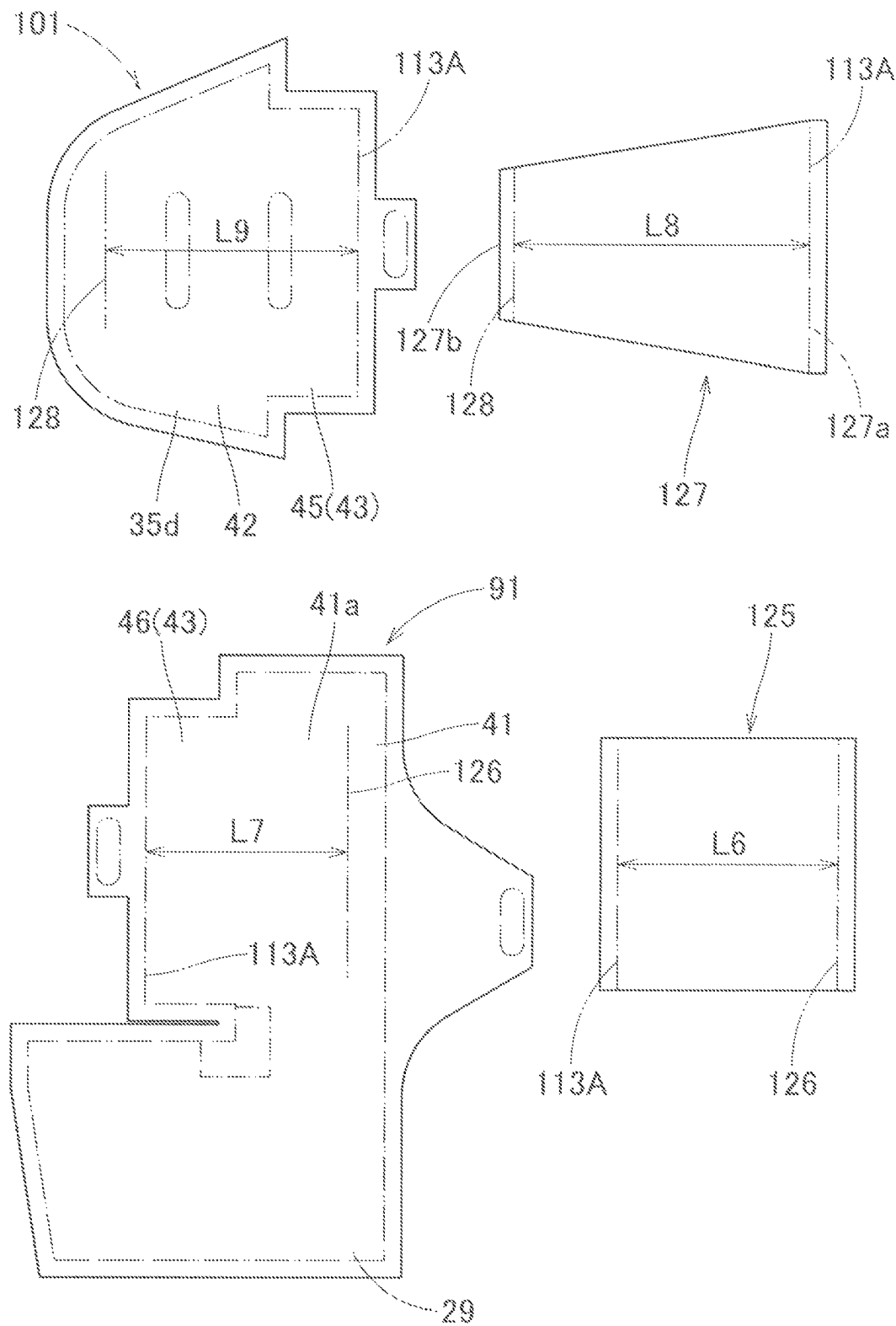
FIG. 25 is a plan view of a state where a part of the base material that configures the airbag of FIG. 23, and the slip member and the outer slip member in a state of having developed to be flat are aligned.

The slip member 125 is installed in the region from the surface side of the region (left part 41a) on the left side that becomes the restriction recessed portion 43 side on the frontal collision restriction face 41 to the surface side of the inner wall portion (right wall 46) that becomes the frontal collision restriction face 41 side in the restriction recessed portion 43, in the airbag 15A (bag main body 16) when the inflation is completed. Specifically, the outer shape of the slip member 125 is configured to cover the part from the surface of the right wall 46 of the restriction recessed portion 43 to the surface of the left part 41a which is the region of approximately a left half of the frontal collision restriction face 41 in a state where the front end 125a side is linked to the tip end side (front end 43a side) of the recess of the restriction recessed portion 43 while the outer shape is the substantially rectangular shape in which the longitudinal direction is along the forward-and-rearward direction side. A rear end 125b side of the slip member 125 is coupled to the frontal collision restriction face 41 (rear wall portion 29 in the main body inflation portion 17) by a coupling part 126. Even in the slip member 125, when the inflation of the airbag 15 is completed, the rear end 125b of the slip member 125 is disposed at a position that becomes slightly more to the left side than the center in the leftward-and-rightward direction in the rear wall portion 29. In addition, similar to the above-described slip member 79, when manufacturing the bag main body 16, the slip member 125 is sewed with the front end 125a when forming the restriction recessed portion 43 (when forming a suture part 113A), and is linked to the tip end side (front end 43a side) of the recess of the restriction recessed portion 43 (refer to FIG. 24). The suture part 113A configures a front linking part which links a front end 125a of the slip member 125 to the restriction recessed portion 43 side. As illustrated in FIG. 23, the coupling part 126 which serves as the rear linking part which links the rear end 125b of the slip member 125 to the frontal collision restriction face 41 side is formed to be substantially along the upward-and-downward direction across the entire region in the upward-and-downward direction of the rear end 125b of the slip member 125. In addition, in the slip member 125, the width dimension (a separation distance L6 between the suture part 113A and the coupling part 126, refer to FIG. 25) on the forward-and-rearward direction side in a state of having developed to be flat is set to be greater than a membrane length L7 (refer to FIG. 25) from the suture part 113A to the coupling part 126 in the base material of the airbag 15A (bag main body 16) when the inflation is completed. In other words, the slip member 125 includes a loosened portion 125c between the suture part 113A and the coupling part 126 (refer to FIGS. 23 and 24). In a case of the embodiment, the separation distance L6 between the suture part 113A and the coupling part 126 in the slip member 125 is set to be greater than the membrane length L7 from the suture part 113A to the coupling part 126 in the bag main body 16 approximately by 50 mm. A difference in length dimension is set to correspond to the width dimension (depth) on the forward-and-rearward direction side of the restriction recessed portion 43. Specifically, the difference in length dimension is set to be a dimension by which the slip member 125 which has received the head MH of the occupant MP can be deviated and moved smoothly with respect to the frontal collision restriction face 41 when receiving the head MH of the occupant MP by the slip member 125.

The outer slip member 127 is installed in the region from the surface side of the oblique collision restriction face 42 to the surface side of the outer wall portion (left wall 45) that becomes the oblique collision restriction face 42 side in the restriction recessed portion 43, in the airbag 15A (bag main body 16) when the inflation is completed. Specifically, the outer shape of the outer slip member 127 is a substantially trapezoidal shape of which the width becomes slightly narrow by approaching a rear end 127b side. The outer slip member 127 is configured to cover the region from the surface of the left wall 45 of the restriction recessed portion 43 to the area around the rear end of the oblique collision restriction face 42 in a state where a front end 127a side is linked to the tip end side (front end 43a side) of the recess of the restriction recessed portion 43. The rear end 127b side of the outer slip member 127 is coupled to the oblique collision restriction face 42 (right wall portion 35d in the protrusion inflation portion 35) by a coupling part 128. Even in the outer slip member 127, when the inflation of the airbag 15A is completed, the rear end 127b of the outer slip member 127 is disposed at a position that becomes slightly more to the front side than the rear edge in the right wall portion 35d of the protrusion inflation portion 35. In addition, similar to the above-described outer slip member 82, when manufacturing the bag main body 16, the outer slip member 127 is sewed with the front end 127a when forming the restriction recessed portion 43 (when forming a suture part 113A), and is linked to the tip end side (front end 43a side) of the recess of the restriction recessed portion 43 (refer to FIG. 24). The suture part 113A configures an outer front linking part which links the front end 127a of the outer slip member 127 to the restriction recessed portion 43 side. As illustrated in FIG. 23, the coupling part 128 which serves as the outer rear linking part which links the rear end 127b of the outer slip member 127 to the oblique collision restriction face 42 side is formed to be substantially along the upward-and-downward direction across the entire region in the upward-and-downward direction of the rear end 127b of the outer slip member 127. In addition, in the outer slip member 127, the width dimension (a separation distance L8 between the suture part 113A and the coupling part 128, refer to FIG. 25) on the forward-and-rearward direction side in a state of having developed to be flat is set to be greater than a membrane length L9 (refer to FIG. 25) from the suture part 113A to the coupling part 128 in the base material of the airbag 15A (bag main body 16) when the inflation is completed. The outer slip member 127 includes a loosened portion 127c between the suture part 113A and the coupling part 128 (refer to FIGS. 23 and 24). In a case of the embodiment, the separation distance L8 between the suture part 113A and the coupling part 128 in the outer slip member 127 is set to be greater than the membrane length L9 from the suture part 113A to the coupling part 128 in the bag main body 16 approximately by 50 mm. A difference in length dimension is set to correspond to the width dimension (depth) on the forward-and-rearward direction side of the restriction recessed portion 43. Specifically, the difference in length dimension is set to be a dimension by which the outer slip member 127 which has received the head MH of the occupant MP can be deviated and moved smoothly with respect to the oblique collision restriction face 42 when receiving the head MH of the occupant MP by the outer slip member 127.

Even in the airbag 15A having such a configuration, the slip member 125 is configured such that the separation distance L6 between the suture part 113A which serves as the front linking part linked to the restriction recessed portion 43 side and the coupling part 126 which serves as the rear linking part linked to the frontal collision restriction face 41 side is set to be greater than the membrane length L7 from the suture part 113A to the coupling part 126 in the base material of the airbag 15A (bag main body 16) when the inflation is completed, and the loosened portion 125c is provided. Similarly, the outer slip member 127 is also configured such that the separation distance L8 between the suture part 113A which serves as the outer front linking part linked to the restriction recessed portion 43 side and the coupling part 128 which serves as the outer rear linking part linked to the oblique collision restriction face 42 side is set to be greater than the membrane length L9 from the suture part 113A to the coupling part 128 in the base material of the airbag 15A (bag main body 16) when the inflation is completed, and the loosened portion 127c is provided. Therefore, when the head MH of the occupant MP is received, the slip member 125 and the outer slip member 127 can be smoothly moved with respect to the airbag 15A (bag main body 16) by allowing the slip member 125 and the outer slip member 127 itself (loosened portions 125c and 127c) which receive the head MH of the occupant MP to slide with respect to the bag main body 16. Furthermore, the slip member 125 and the outer slip member 127 can slide the head MH of the occupant MP. Therefore, it is possible to allow the head MH of the occupant MP to smoothly slide with respect to the frontal collision restriction face 41 or the oblique collision restriction face 42 of the airbag 15A (bag main body 16) made of the base material by the slip member 125 and the outer slip member 127, and to guide the head MH to the inside of the restriction recessed portion 43.

In the airbag 15B illustrated in FIGS. 26 and 27, a configuration in which only the configuration of a slip member 130 and an outer slip member 135 is different is employed, and the bag main body 16 has the same configuration as that of the bag main body 16 in the airbag 15. With respect to the same member in the bag main body 16, the same reference numerals will be given, and the specific description thereof will be omitted. Similar to the slip member 79 and the outer slip member 82 in the above-described airbag 15, the slip member 130 and the outer slip member 135 which will be used in the airbag 15B are configured of the sheet body of which the friction resistance of the surface is set to be smaller than that of the base material that configures the bag main body 16 (airbag 15A), and have excellent sliding properties than those of the surface (outer surface) of the bag main body 16. Specifically, similar to the slip member 79 and the outer slip member 82 in the above-described airbag 15, the slip member 130 and the outer slip member 135 are formed of fabric formed by weaving the suture thread having a lower fineness than that of the base fabric that configures the bag main body 16.

Figure 28:
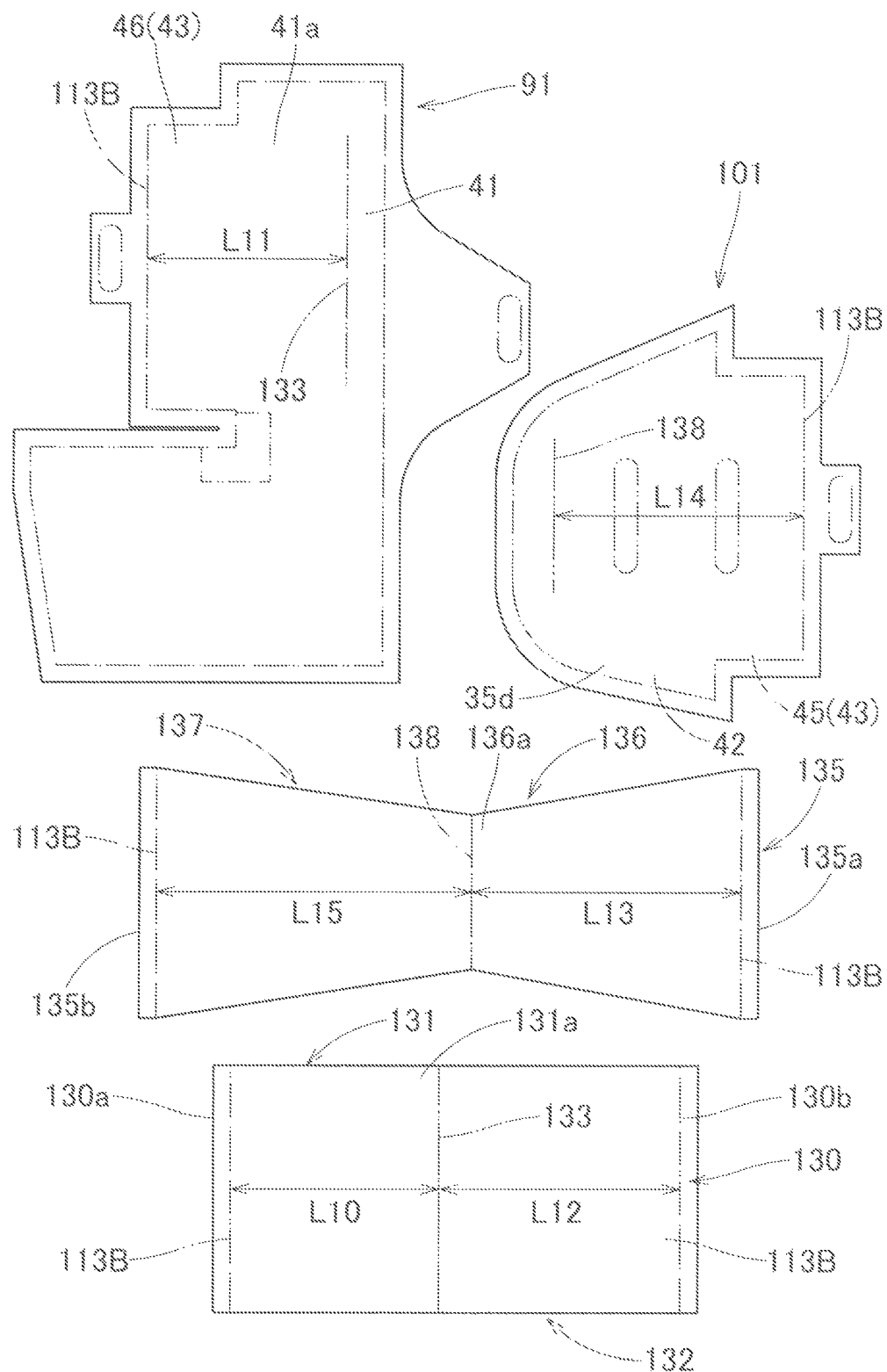
FIG. 28 is a plan view of a state where a part of the base material that configures the airbag of FIG. 26, and the slip member and the outer slip member of the state of having developed to be flat are aligned.

The slip member 130 is installed in the region from the surface side of the region (left part 41a) on the left side that becomes the restriction recessed portion 43 side on the frontal collision restriction face 41 to the surface side of the inner wall portion (right wall 46) that becomes the frontal collision restriction face 41 side in the restriction recessed portion 43, in the airbag 15B (bag main body 16) when the inflation is completed. Since the slip member 130 is configured of the belt-like sheet body, both of terminals 130a and 130b are linked to the tip end side (front end 43a side) of the recess of the restriction recessed portion 43, and have a substantially loop shape in a state where the airbag 15B when inflation is completed is viewed from the upward-and-downward direction side. The slip member 130 includes a front part 131 disposed on the frontal collision restriction face 41 side, and a rear part 132 disposed on the occupant MP side. The front part 131 links (couples) the area around a rear end 131a to the frontal collision restriction face 41 by a coupling part 133. Even in the slip member 130, when the inflation of the airbag 15B is completed, the rear end 131a of the front part 131 is disposed at a position which is slightly more to the left side than the center in the leftward-and-rightward direction in the rear wall portion 29. In addition, when manufacturing the bag main body 16, the slip member 130 is configured to sew the terminals 130a and 130b together when forming the restriction recessed portion 43 (when forming a suture part 113B), and to link the terminals 130a and 130b to the tip end side (front end 43a side) of the recess of the restriction recessed portion 43 (refer to FIG. 27). In addition, the suture part 113B configures the front linking part which links the terminals 130a and 130b of the slip member 130 to the restriction recessed portion 43 side. The coupling part 133 which serves as the rear linking part that links the rear end 131a of the front part 131 to the frontal collision restriction face 41 side in the slip member 130 is formed to be substantially along the upward-and-downward direction across the entire region in the upward-and-downward direction of the rear end 131a of the front part 131 (refer to FIG. 26). In addition, the front part 131 of the slip member 130 is configured such that a width dimension (a separation distance L10 between the suture part 113B and the coupling part 133, refer to FIG. 28) on the forward-and-rearward direction side in a state of having developed to be flat is set to be substantially the same as a membrane length L11 (refer to FIG. 28) from the suture part 113B to the coupling part 133 in the base material of the airbag 15B (bag main body 16) when the inflation is completed. At the rear part 132 of the slip member 130, a width dimension (a separation distance L12 between the suture part 113B and the coupling part 133, refer to FIG. 28) on the forward-and-rearward direction side in a state of having developed to be flat is set to be greater than the membrane length L11 from the suture part 113B to the coupling part 133 in the base material of the airbag 15B (bag main body 16) when the inflation is completed. The rear part 132 includes a loosened portion 132a between the suture part 113B and the coupling part 133. Even in the airbag 15B, similar to the slip member 125 in the above-described airbag 15A, the separation distance L12 between the suture part 113B and the coupling part 133 at the rear part 132 of the slip member 130 in the airbag 15B is set to be greater than the membrane length L11 from the suture part 113B to the coupling part 133 in the bag main body 16 approximately by 50 mm.

The outer slip member 135 is installed in the region from the surface side of the oblique collision restriction face 42 to the surface side of the outer wall portion (left wall 45) that becomes the oblique collision restriction face 42 side in the restriction recessed portion 43 in the airbag 15B (bag main body 16) when the inflation is completed. The outer slip member 135 is configured of the belt-like sheet body, both of terminals 135a and 135b are linked to the tip end side (front end 43a side) of the recess of the restriction recessed portion 43, and have a substantially loop shape in a state where the airbag 15B when inflation is completed is viewed from the upward-and-downward direction side. The outer slip member 135 includes an outer part 136 disposed on the oblique collision restriction face 42 side, and an inner part 137 disposed on the occupant MP side. The outer part 136 links (couples) the area around a rear end 136a to oblique collision restriction face 42 by a coupling part 138. Even in the outer slip member 135, when the inflation of the airbag 15B is completed, the rear end 136a of the outer part 136 is disposed at a position which is slightly more to the front side than the rear edge in the right wall portion 35d of the protrusion inflation portion 35. In addition, when manufacturing the bag main body 16, the outer slip member 135 is configured to sew the terminals 135a and 135b together when forming the restriction recessed portion 43 (when forming the suture part 113B), and to link the terminals 135a and 135b to the tip end side (front end 43a side) of the recess of the restriction recessed portion 43 (refer to FIG. 27). In addition, the suture part 113B configures the outer front linking part which links the terminals 135a and 135b of the outer slip member 135 to the restriction recessed portion 43 side. The coupling part 138 which serves as the outer rear linking part that links the rear end 136a of the outer part 136 to the oblique collision restriction face 42 side in the outer slip member 135 is formed to be substantially along the upward-and-downward direction across the entire region in the upward-and-downward direction of the rear end 136a of the outer part 136 (refer to FIG. 26). In addition, the outer part 136 of the outer slip member 135 is configured such that a width dimension (a separation distance L13 between the suture part 113B and the coupling part 138, refer to FIG. 28) on the forward-and-rearward direction side in a state of having developed to be flat is set to be substantially the same as a membrane length L14 (refer to FIG. 28) from the suture part 113B to the coupling part 138 in the base material of the airbag 15B (bag main body 16) when the inflation is completed. At the inner part 137 of the outer slip member 135, a width dimension (a separation distance L15 between the suture part 113B and the coupling part 138, refer to FIG. 28) on the forward-and-rearward direction side in a state of having developed to be flat is set to be greater than the membrane length L14 from the suture part 113B to the coupling part 138 in the base material of the airbag 15B (bag main body 16) when the inflation is completed. The inner part 137 includes a loosened portion 137a between the suture part 113B and the coupling part 138. Even in the airbag 15B, similar to the outer slip member 127 in the above-described airbag 15A, the separation distance L15 between the suture part 113B and the coupling part 138 at the inner part 137 of the outer slip member 135 is set to be greater than the membrane length L14 from the suture part 113B to the coupling part 138 in the bag main body 16 approximately by 50 mm.

Even in the airbag 15B having such a configuration, the rear part 132 disposed on the occupant MP side in the slip member 130 is configured such that the separation distance L12 between the suture part 113B which serves as the front linking part linked to the restriction recessed portion 43 side and the coupling part 133 which serves as the rear linking part linked to the frontal collision restriction face 41 side is set to be greater than the membrane length L11 from the suture part 113B to the coupling part 133 in the base material of the airbag 15B (bag main body 16) when the inflation is completed, and the loosened portion 132a is provided.

Similarly, the inner part 137 disposed on the occupant MP side in the outer slip member 135 is also configured such that the separation distance L15 between the suture part 113B which serves as the outer front linking part linked to the restriction recessed portion 43 side and the coupling part 138 which serves as the outer rear linking part linked to the oblique collision restriction face 42 side is set to be greater than the membrane length L14 from the suture part 113B to the coupling part 138 in the base material of the airbag 15B (bag main body 16) when the inflation is completed, and the loosened portion 137a is provided. Therefore, the rear part 132 of the slip member 130 and the inner part 137 of the outer slip member 135 can allow the loosened portions 132a and 135a to slide with respect to the front part 131 and the outer part 136 when receiving the head MH of the occupant MP, and to smoothly move the head MH of the occupant MP. Therefore, it is possible to allow the head MH of the occupant MP to smoothly slide by the rear part 132 of the slip member 130 and the inner part 137 of the outer slip member 135, and to guide the head MH to the inside of the restriction recessed portion 43. Additionally, in the airbag 15B having the configuration, in the slip member 130, the rear part 132 which has received the head MH of the occupant MP moves to slide with respect to the front part 131 of which the friction resistance of the surface is set to be smaller than that of the base material that configures the airbag 15B (bag main body 16). Therefore, by allowing the rear part 132 of the slip member 130 which has received the head MH of the occupant MP to slide with respect to the front part 131, it is possible to smoothly move the rear part 132 with respect to the airbag 15B, and further, the rear part 132 itself can also allow the head MH of the occupant MP to slide. Therefore, compared to a case where the slip member received the head moves to slide with respect to the base material that configures the airbag as the above-described airbag 15A, it is possible to allow the head portion MH of the occupant MP to more smoothly slide by the rear part 132. In addition, even in the outer slip member 135, the inner part 137 which has received the head MH of the occupant MP moves to slide with respect to the outer part 136 of which the friction resistance of the surface is set to be smaller than that of the base material that configures the airbag 15B (bag main body 16). Therefore, it is possible to allow the inner part 137 of the outer slip member 135 which has received the head MH of the occupant MP to slide with respect to the outer part 136, and to smoothly move the inner part 137 with respect to the airbag 15B, and further, the inner part 137 itself can also allow the head MH of the occupant MP to slide. As a result, compared to a case where the outer slip member received the head moves to slide with respect to the base material that configures the airbag as the above-described airbag 15A, it is possible to allow the head MH of the occupant MP to more smoothly slide by the outer slip member 135.

In addition, in the airbags 15, 15A, and 15B of the embodiment, the slip members 79, 125, and 130 and the outer slip members 82, 127, and 135 are respectively bodies separated from the bag main body 16, and by using the woven fabric formed by weaving the yarn having a lower fineness than that of the base fabric which configures the bag main body 16 (airbags 15, 15A, and 15B), the friction resistance of the surface is set to be smaller than that of the base material that configures the bag main body 16 (airbags 15, 15A, and 15B). A forming material of the slip member and the outer slip member is not limited thereto. For example, the slip member and the outer slip member may be configured not only of the woven fabric but also of a film made of a synthetic resin of which the friction resistance of the surface is set to be smaller than that of the base material that configures the bag main body. In addition, the slip member and the outer slip member may be configured of the woven fabric of which the surface of the woven fabric which is the same as the base material that configures the bag main body is coated with a coating agent having improved sliding properties. Furthermore, the slip portion and the outer slip portion may not be a body separated from the airbag, and in the airbag, a configuration in which the slip portion or the outer slip portion is provided by coating the region from the surface side of the region on the restriction recessed portion side on the frontal collision restriction face to the surface side of the inner wall portion that becomes the frontal collision restriction face in the restriction recessed portion, or the region from the surface side of the oblique collision restriction face to the surface side of the outer wall portion that becomes the oblique collision restriction face in the restriction recessed portion, with the coating agent having improved sliding properties, may be employed. Furthermore, the airbags 15, 15A, and 15B of the embodiment are configured to include the outer slip members 82, 127, and 135 (outer slip portions), but as the airbag, a configuration in which the outer slip portion is not provided and only the slip portion is provided may be employed. In addition, in a case where the airbag is configured to include the slip portion and the outer slip portion, in each of the airbags of the above-described embodiment, a case where the slip portion and the outer slip portion are configured in the same manner is used, but a configuration in which each of the slip portion and the outer slip portion is configured in a different manner (different combinations) may be employed.

In addition, the airbag device M for a passenger seat of the embodiment is loaded in the vehicle V having the instrument panel 1 in which the monitor 3 protrudes, the airbag 15 is configured to include the detour recessed portion 27 that can detour the monitor 3 which serves as a protrusion that protrudes upward from the instrument panel 1. However, in the invention, the airbag device M for a passenger seat can also be loaded in the vehicle having a configuration in which the monitor does not protrude, and in this case, as the airbag, a configuration in which the detour recessed portion is not provided is employed.

In addition, in the airbag device M for a passenger seat of the embodiment, the oblique collision restriction face 42 and the restriction recessed portion 43 are disposed on the driver seat DS side of the frontal collision restriction face 41. Therefore, when the oblique collision or the offset collision of the vehicle V occurs, in a case where the occupant MP seated in the passenger seat PS moves obliquely forward on the center side and at the front part in the leftward-and-rightward direction, it is possible to accurately protect the head MH of the occupant MP. In addition, in the embodiment, the occupant protection portion 40 of the airbag 15 is configured to dispose the oblique collision restriction face 42 and the restriction recessed portion 43 only on the driver seat DS side (left side which is the center side in the leftward-and-rightward direction) of the frontal collision restriction face 41. When considering the above-described points, it is needless to say that a configuration in which the oblique collision restriction face and the restriction recessed portion are not provided on the driver seat side and are disposed only on the right side that becomes the outside of the vehicle of the frontal collision restriction face may be employed, and further, a configuration in which the oblique collision restriction face and the restriction recessed portion are disposed on both of the left and right sides of the frontal collision restriction face may be employed.

What is claimed is:

1. An airbag device for a passenger seat, comprising:
   an airbag which is configured to be folded and stored at a storage part provided in an instrument panel disposed in front of an occupant seated in a passenger seat, to inflate and protrude toward a rear side of a vehicle by allowing inflation gas to flow to the inside thereof, and thereby protecting the occupant,
   wherein a rear face of the airbag when inflation is completed is an occupant protection portion which is capable of protecting the occupant,
   wherein the occupant protection portion includes a frontal collision restriction face which is capable of protecting a head of the occupant who moves forward when frontal collision of a vehicle occurs, an oblique collision restriction face which is formed to protrude rearward from the frontal collision restriction face on at least one of the left and right sides of the frontal collision restriction face to be capable of protecting the head of the occupant who moves obliquely forward when oblique collision or offset collision of the vehicle occurs, and a restriction recessed portion which is formed to be recessed forward for allowing the head of the occupant to enter and to be restricted between the frontal collision restriction face and the oblique collision restriction face,
   wherein a slip portion having excellent sliding properties compared to those of other regions of the frontal collision restriction face is disposed in a region from a surface side of the frontal collision restriction face in a region on the restriction recessed portion side to a surface side that becomes the frontal collision restriction face side in an inner wall portion of the restriction recessed portion, in the airbag when the inflation is completed, and
   wherein the slip portion has sliding properties capable of guiding the received head toward the inside of the restriction recessed portion when the head of the occupant who moves obliquely forward comes into contact with the frontal collision restriction face at the time of the oblique collision or the offset collision of the vehicle.

2. The airbag device for a passenger seat according to claim 1,
   wherein the slip portion is configured of a sheet body of which a friction resistance of the surface is set to be smaller than that of a base material that configures the airbag, includes a front end side that is linked to a tip end side of a recess of the restriction recessed portion, and includes a rear end side that is temporarily coupled to the frontal collision restriction face by temporary coupling means, and
   wherein the temporary coupling means is configured to be capable of releasing a coupled state with the frontal collision restriction face when the head of the occupant who moves to the restriction recessed portion side is brought into contact with the surface of the slip portion.

3. The airbag device for a passenger seat according to claim 1,
   wherein the slip portion is configured of a sheet body of which a friction resistance of the surface is set to be smaller than that of a base material which configures the airbag, includes a front end side that is linked to a tip end side of a recess of the restriction recessed portion and a rear end side that is linked to the frontal collision restriction face, and a separation distance between a front linking part linked to the restriction recessed portion side and a rear linking part linked to the frontal collision restriction face side is set to be greater than a membrane length from the front linking part to the rear linking part in the base material of the airbag when inflation is completed.

4. The airbag device for a passenger seat according to claim 1,
wherein the slip portion is configured of a sheet body of which a friction resistance of the surface is set to be smaller than that of a base material that configures the airbag, includes both terminals that are linked to a tip end side of a recess of the restriction recessed portion, so that an airbag when inflation is completed forms in a substantially loop shape in a state of being viewed from an upward-and-downward direction side, and includes a front part disposed on the frontal collision restriction face side and a rear part disposed on the occupant side,
wherein the front part includes a rear end side that is linked to the frontal collision restriction face, and is configured such that a separation distance between a front linking part linked to the restriction recessed portion side and a rear linking part linked to the frontal collision restriction face side is set to be substantially the same as a membrane length from the front linking part to the rear linking part in the base material of the airbag when the inflation is completed, and
wherein the rear part is configured such that a separation distance between the front linking part and the rear linking part is set to be greater than a membrane length from the front linking part to the rear linking part in the base material of the airbag when inflation is completed.

5. The airbag device for a passenger seat according to claim 1,
wherein an outer slip portion having excellent sliding properties compared to those of other regions of the frontal collision restriction face is disposed in a region from a surface side of the oblique collision restriction face to a surface side of an outer wall portion that becomes the oblique collision restriction face side in the restriction recessed portion in the airbag when inflation is completed, and
wherein the outer slip portion is configured to have sliding properties by which the received head is guided toward the inside of the restriction recessed portion when the head of the occupant who moves obliquely forward comes into contact with the oblique collision restriction face at the time of oblique collision or offset collision of the vehicle.

6. The airbag device for a passenger seat according to claim 5,
wherein the outer slip portion is configured of a sheet body of which a friction resistance of the surface is set to be smaller than that of a base material that configures the airbag, includes a front end side that is linked to a tip end side of a recess of the restriction recessed portion and a rear end side that is temporarily coupled to the oblique collision restriction face by outer temporary coupling means, and
wherein the outer temporary coupling means is configured to be capable of releasing a coupled state with the oblique collision restriction face when the head of the occupant who moves to the restriction recessed portion side is brought into contact with the surface of the outer slip portion.

7. The airbag device for a passenger seat according to claim 5,
wherein the outer slip portion is configured of a sheet body of which a friction resistance of the surface is set to be smaller than that of a base material that configures the airbag, includes a front end side that is linked to a tip end side of a recess of the restriction recessed portion and a rear end side that is linked to the oblique collision restriction face, and a separation distance between an outer front linking part linked to the restriction recessed portion side and an outer rear linking part linked to the frontal collision restriction face side is set to be greater than a membrane length from the outer front linking part to the outer rear linking part in the base material of the airbag when inflation is completed.

8. The airbag device for a passenger seat according to claim 5,
wherein the outer slip portion is configured of a sheet body of which a friction resistance of the surface is set to be smaller than that of a base material that configures the airbag, includes both terminals that are linked to a tip end side of a recess of the restriction recessed portion, so that an airbag when inflation is completed forms in a substantially loop shape in a state of being viewed from an upward-and-downward direction side, and includes an outer part disposed on the oblique collision restriction face side and an inner part disposed on the occupant side,
wherein the outer part includes a rear end side that is linked to the oblique collision restriction face, and is configured such that a separation distance between an outer front linking part linked to the restriction recessed portion side and an outer rear linking part linked to the oblique collision restriction face side is set to be substantially the same as a membrane length from the outer front linking part to the outer rear linking part in the base material of the airbag when the inflation is completed, and
wherein the inner part is configured such that a separation distance between the outer front linking part and the outer rear linking part is set to be greater than a membrane length from the outer front linking part to the outer rear linking part in the base material of the airbag when inflation is completed.

9. The airbag device for a passenger seat according to claim 5,
wherein the restriction recessed portion is disposed to be substantially along a moving direction of the head of the occupant who moves obliquely forward when inflation of the airbag is completed.

10. The airbag device for a passenger seat according to claim 5,
wherein the oblique collision restriction face is disposed on a driver seat side of the frontal collision restriction face.

11. The airbag device for a passenger seat according to claim 1,
wherein a rear end side of the restriction recessed portion is configured to be widened and open to the frontal collision restriction face side.

12. The airbag device for a passenger seat according to claim 1,
wherein the restriction recessed portion is disposed to be substantially along a moving direction of the head of the occupant who moves obliquely forward when inflation of the airbag is completed.

13. The airbag device for a passenger seat according to claim 1,
   wherein the oblique collision restriction face is disposed on a driver seat side of the frontal collision restriction face.

* * * * *